United States Patent [19]

Yamaguchi et al.

[11] 4,422,146

[45] Dec. 20, 1983

[54] RECONSTRUCTION METHOD OF A COMPUTED TOMOGRAPHIC IMAGE FROM A FEW X-RAY PROJECTIONS

[75] Inventors: Shoichiro Yamaguchi; Fujio Kobayashi, both of Tokyo, Japan

[73] Assignee: The President of Tokyo Institute of Technology, Tokyo, Japan

[21] Appl. No.: 205,909

[22] Filed: Nov. 12, 1980

[30] Foreign Application Priority Data

| Nov. 22, 1979 | [JP] | Japan | 54-151461 |
| Jan. 14, 1980 | [JP] | Japan | 55-002893 |
| Jan. 14, 1980 | [JP] | Japan | 55-002894 |
| Feb. 6, 1980 | [JP] | Japan | 55-013237 |

[51] Int. Cl.³ ............................................. G06F 15/42
[52] U.S. Cl. ..................................... 364/414; 378/901
[58] Field of Search ............................. 364/414, 515; 250/445 T, 445 R, 363 S, 363 R; 378/4, 901

[56] References Cited

U.S. PATENT DOCUMENTS

| 4,064,393 | 12/1977 | Pasedach et al. | 364/414 |
| 4,189,775 | 2/1980 | Inouye et al. | 364/515 |
| 4,205,375 | 5/1980 | Inouye et al. | 364/414 |
| 4,219,876 | 8/1980 | Mizutani et al. | 364/414 |
| 4,274,140 | 6/1981 | Watson | 364/414 |
| 4,275,444 | 6/1981 | Ryan | 364/414 |

OTHER PUBLICATIONS

"Computerized Tomography" Published in the International Journal of Radiological Diagnosis Using CT Scanners, vol. 2, No. 3, 1978, Pergamon Press.

*Primary Examiner*—Gary Chin
*Attorney, Agent, or Firm*—Robert E. Burns; Emmanuel J. Lobato; Bruce L. Adams

[57] ABSTRACT

A tomographic image of X-ray tested tissue of body is reconstructed by calculating X-ray absorption coefficients of picture elements constituting a tomographic plane in reference to measured values produced by the first and second projectional distributions of X-ray produced by projecting X-ray. Accordingly, it becomes possible to reconstruct a clear tomographic image of a moving X-ray tested tissue and to make an X-ray exposure level very low by extremely shortening the time of the reconstruction of computed tomographic image. Moreover, a resolving power of measuring is substantially improved, resulting in that an accuracy of reconstructing the tomographic image may also be improved.

11 Claims, 12 Drawing Figures

RECONSTRUCTION METHOD OF A COMPUTED TOMOGRAPHIC IMAGE FROM A FEW X-RAY PROJECTIONS

DETAILED DESCRIPTION OF THE INVENTION

This invention relates to a reconstruction method of X-ray computed tomographic image, and more particularly to such a method as X-ray computed tomographic image may be reconstructed by performing a desired calculation.

In general, there has been widely performed a testing procedure by X-ray for checking internal structure of a product or a human body in the field of industry and medicine. In view of this fact, X-ray computed tomography (hereinafter abbreviated as "CT") has been excessively developed as realizing such a device as being capable of inspecting the internal structure of products or human body.

BACKGROUND OF THE INVENTION

In this type of a conventional X-ray computed tomography, as shown in FIG. 1 by a solid line, a projectional distribution of X-ray is measured by X-ray detector c in such a way as X-ray beam is projected from X-ray source a toward a X-ray tested tissue b of body b. Then, as shown in FIG. 1 by a dotted line, X-ray source a and X-ray detector c are rotated by a desired angle of α (for example 1°), and at this position X-ray beam is projected again toward X-ray tested tissue b of body, a projectional distribution of X-ray under the rotation of an angle of α is measured again, and several 60 to 360 times of similar operations are performed. Thereafter, data provided by these many projectional distributions of X-ray are calculated by Fourier transform or a convolution method, and a tomography of the X-ray tested tissue b of body is reproduced on the basis of a result of the processing.

However, in this type of a conventional X-ray computed tomography, it is necessary to have many projectional distributions of X-ray in order to reproduce a tomographic image of X-ray tested tissue b of body, resulting in providing such some problems as follows:

(1) Since a long period of time is needed (several seconds to several minutes) for sampling data, it is not possible to reproduce a tomographic image of a moving tested tissue b of a body.

(2) Exposure of X-ray shows a high value, resulting in that some bad effects might be applied to the tested tissue of body when the tested tissue b is a living thing such as a human body.

The present invention is provided to overcome these disadvantages and its object is to provide a reconstruction method of X-ray computed tomographic image in which a reconstruction image having a high accuracy or precision may be produced by using two projectional distributions of X-ray as data for reconstructing a tomographic image of the tested tissue.

SUMMARY OF THE INVENTION

According to the method of the present invention, an X-ray tomographic image is reconstructed by using only a few X-ray projectional distributions which are produced by projecting X-rays from two desired directions toward tissue of a body to be tested. First, a plurality of X-ray density values are measured along the two X-ray projectional distributions. It is then assumed that the tomographic plane of the tested tissue to be reconstructed is expressed by a pseudo-tomographic plane which is constituted collectively by mn pieces of picture elements, which are formed by dividing the tomographic plane of the tested tissue into small sections and each of which has a single piece of X-ray density information, that the pseudo-tomographic plane is divided into a first part having less than all of the picture elements and a second part having the remainder of the picture elements, and that the picture elements within the pseudo-tomographic plane are consecutively numbered in a regular pattern and that the plurality of positions along the two X-ray projectional distributions at which the X-ray density values are measured correspond to the positions on the two X-ray projectional distributions which have X-ray density information to be obtained by passing the X-ray beams through the pseudo-tomographic plane.

The values of the X-ray density are measured by an apparatus comprised of a microdensitometer and an analog-digital converter. Alternatively, the X-ray density measuring apparatus may be comprised of a scintillation detector and an analog-digital converter.

Next, the measured values of X-ray density are applied to the digital computing circuitry. The total number of measured values of X-ray density from the two projectional distributions is equal to, or greater than, the number mn of picture elements, defined above. The X-ray absorption coefficients of each of the mn picture elements which constitute the first and second parts of the pseudo-tomographic plane are calculated, based on the measured values of X-ray density and the length of the X-ray beams passing through each of the picture elements. Then, the necessary X-ray absorption coefficients for the mn pieces of picture elements are calculated together, or some of the X-ray absorption coefficients for part of the total of mn pieces of picture elements are calculated at a time, and the step of calculation is repeated several times until all of the X-ray absorption coefficients are computed.

The X-ray absorption coefficients are calculated according to the following equation (1) in the case that the number of measured values of X-ray density is equal to the number of picture elements, and the X-ray absorption coefficients are calculated according to equation (2) in the case that the number of measured values of X-ray density is greater than the number of picture elements:

$$L\mu = D$$

$$L^T L \mu = L^T D$$

In these equations D is a matrix containing the X-ray density information, L is a matrix giving the information of the length of the X-ray beams passing through each of the picture elements, and $\mu$ is a matrix of the X-ray absorption coefficients. The symbol $T$ indicates transposition.

After the X-ray absorption coefficients have all been calculated, in either of the above-described manners, each picture element which has a respective X-ray absorption coefficient $\mu_1, \ldots \mu_{mn}$ is positioned at the corresponding location in the m =n array of picture elements on the pseudo-tomographic plane. The complete array of picture elements corresponds to the reconstructed X-ray tomographic plane. The reconstruction may be graphic so as to display the internal structure of the tested tissue. Alternatively, the reconstruction may be electronic, and the method according to the invention will then include the subsequent step of visually displaying the m =n array of picture elements in order to display the internal structure of the tested tissue.

Therefore, the following effects and advantages may be provided by the reconstruction method of X-ray computed tomography of the present invention.

(1) Since it is possible to reconstruct a tomography of X-ray tested tissue B of body in reference to the two projectional distributions of X-ray made by projecting X-ray from the specified two directions, an extremely short period of time is needed for sampling data, and further a tomography of the moving X-ray tested tissue B of body (e.g. heart) may clearly be produced with a high accuracy.

(2) Exposure of X-ray shows an excessively low value (several tenths to several hundredths compared with that of a conventional method), resulting in that some bad effects might not be applied to the tested tissue of body when the tested tissue B is a living thing such as a human body.

(3) Since it is possible to calculate X-ray absorption coefficient of each of the picture elements for each of the groups of picture elements applied as the constituent elements for X-ray computed tomographic plane of a tested tissue, a volume of data required for one processing may substantially be decreased and thereby a substantial simplified data processing may be performed as well as a miniaturization and cheap cost for the data processing device may sufficiently be accomplished.

(4) Since a X-ray computed tomography may be reproduced on the basis of data more than u of picture elements constituting a group of picture elements formed as a partial plane of the surface of tomography S including a X-ray tested tissue B of body, it is possible to provide a highly improved accuracy in a reconstruction of the tomography.

BRIEF DESCRIPTION OF THE DRAWINGS

In reference to the drawings, preferred embodiments of the present invention will be described below.

DESCRIPTION OF THE PREFERRED EMBODIMENTS OF THE INVENTION

Figure 1:
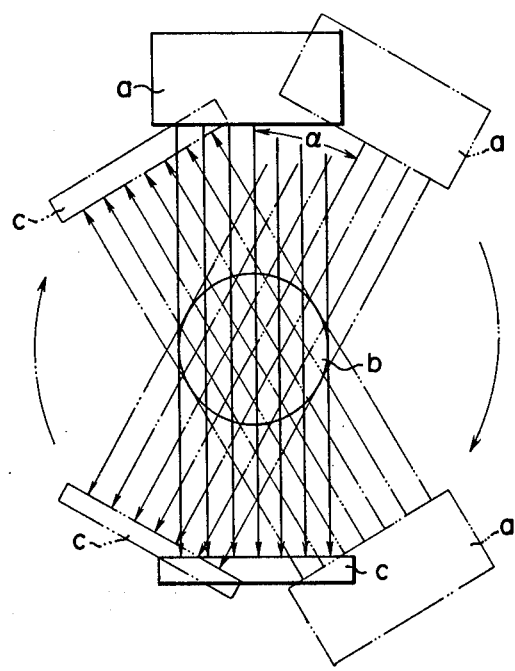
FIG. 1 illustrates a tomographic reconstruction method according to the prior art.
Figure 2:
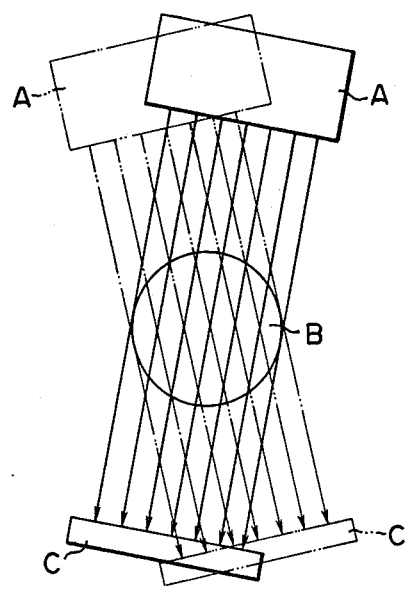
FIG. 2 is a schematic illustration for showing means for measuring a projectional distribution of X-ray.

In the first preferred embodiment of the present invention illustrated in FIGS. 2 to 5, X-ray tested tissue B of a body is positioned between X-ray source A and X-ray detector C, and thereby as shown by a solid line and a dotted line in FIG. 2, X-ray projected from two desired directions toward X-ray tested tissue B of the body, results in the first and second projectional X-ray distributions $D_1$ and $D_2$ (see FIGS. 4 and 5) which are produced by X-rays passed through X-ray tested tissue B of body.

This X-ray source A is a device capable of producing X-rays having a quality (a transmittance power) and a dose which are suitable for X-ray tested tissue B of body forming an object to be inspected. The X-ray source A is provided with a driving mechanism for enabling the source to be rotated by a specified angle around the X-ray tested tissue B of the body.

A wavelength of the produced X-ray is proportional to a voltage applied, and a dose of the X-ray is determined in reference to a wavelength of the X-ray, the applied voltage is varied in accordance with the actual application and has a range of 50,000 to 120,000 volts for medical diagnosis and a range of 100,000 to 300,000 volts for non-destructive testing.

X-ray tissue B of body is tissue which is to be radiated by X-rays and its distribution of transmitted dose (projectional distribution of X-ray) is measured and thereby the image at a desired plane of tomography is to be reconstructed. For example, in a medical diagnosis the tissue is a human body (in general a living thing) and in case of a non-destructive test, the object being irradiated is a so-called industrial product.

Further, as a X-ray detector C, there are used items such as a X-ray film, a scintillation detector, a semiconductor sensor or a xeon gas sensor etc., and X-ray detector C is also provided with a driving mechanism for enabling the detector to be rotated around the X-ray tested tissue B of body by a desired angle.

Figure 5:
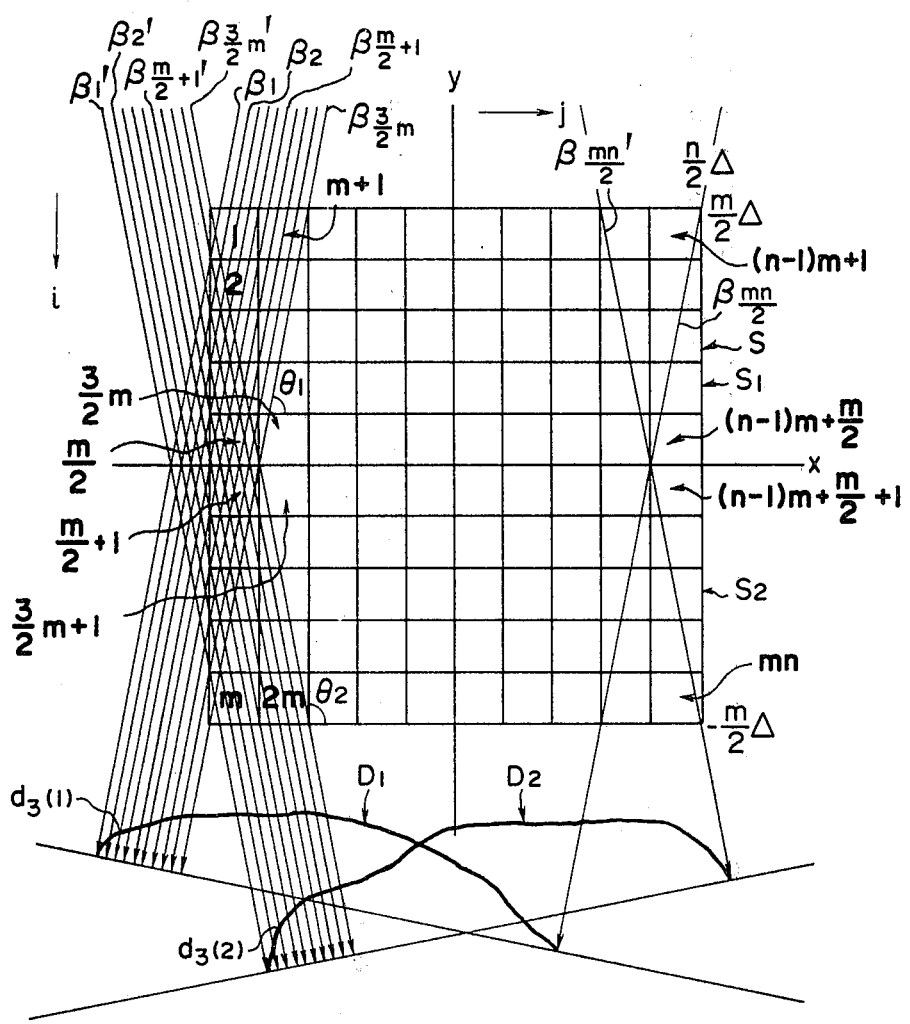

Then, the first X-ray projectional distribution $D_1$ data detected by X-ray detector C are constructed such that $mn/2$ ($=N/2$) positions equally spaced apart with each other by a distance w is calculated by a measuring apparatus for projectional distribution of X-ray E from one end of the first X-ray projectional distribution $D_1$ to the other end thereof, and in turn the second X-ray projectional distribution $D_2$ data produced by X-ray detector C upon moving of the X-ray generator A and the X-ray detector C from the position above are constructed such that each of the values $d_k(2)$ at the $mn/2$ ($=n/2$) positions equally spaced apart with each other by a distance w is a calculated by a measuring apparatus E for projectional distribution of X-ray from one end of second X-ray projectional distribution $D_2$ to the other end thereof (see FIG. 5).

The measuring apparatus E for measuring the X-ray projectional distribution when X-ray detector C is a X-ray film, is a microdensitometer capable of measuring a plurality of values on a distribution of density of X-ray (so-called roentgenograph) which is obtained on X-ray film as a dark or light pattern of contrast. In the present invention, it is necessary to apply two X-ray films in response to the actual requirement of two types of distribution of density of X-ray.

In this way, as apparatus for measuring each of the values $d_k(1)$ and $d_k(2)$ at a plurality of positions equally spaced apart by a distance w with each other starting from one end of the first and second X-ray projectional distributions of X-ray $D_1$ and $D_2$ to the other end thereof, a scintillation detector is used in addition to the examples described above for producing X-ray signal corresponding to a density in which X-ray detector C receives X-rays transmitted through X-ray tested tissue B, and in this case, one unit of a scintillation detector and a mechanism for moving the detector from one end of the first and second X-ray projectional distributions $D_1$ and $D_2$ to the other end thereof are combined with each other or a number of scintillator detectors are arranged over the entire width of the X-ray projectional distribution.

Also if the X-ray detector C is made of a semiconductor type detector which will produce a signal corresponding to X-ray density after receiving X-rays transmitted through X-ray tested tissue B, one semiconductor detector and a mechanism for moving the detector are combined with each other or a number of semiconductor detectors are arranged in the same manner as the case in which the scintillation detector described above is applied as apparatus for measuring each of the values $d_k(1)$ and $d_k(2)$.

If the X-ray detector C is made of a xeon gas detector, one xeon gas detector and a mechanism for moving the detector are combined with each other, or a number of xeon gas detectors are arranged in the same manner as that of the above described scintillation detector or semiconductor detector, is applied as apparatus for measuring each of the values $d_k(1)$ and $d_k(2)$.

If the X-ray detector C is made of one scintillator detector, one semiconductor detector or a combined unit of one xeon gas detector and a moving drive mechanism, each of the detectors is usually scanned two times, and to the contrary if a number of scintillator detectors, semiconductor detectors or a number of xeon gas detectors are arranged, two times of measurement operation are performed by these many detectors.

The signal produced by the measuring apparatus E for measuring the X-ray projectional distribution in this way is an analogue signal, so that this signal is transformed to a digital signal by an analogue-digital converter E' (hereinafter called "A/D converter") in order to apply the signal to a digital computer, and then the signal is stored in a disk or other memory device.

Thereby, a plurality of values $d_k(1)$ and $d_k(2)$ on the first and second projectional distributions $D_1$ and $D_2$ of X-ray produced by projecting X-ray from desired two directions toward X-ray tested tissue B of body may be measured by the measuring apparatus E for measuring the X-ray projectional distribution or A/D converter E' etc.

Then, the data outputs $d_k(1)$ and $d_k(2)$ (digital signals) produced from the X-ray density measuring apparatus are fed to a dimensional transformer of projectional data F constituting the apparatus for calculating X-ray absorption coefficient, respectively.

The dimensional transformer F of projectional data comprises an address control 10, to which the outputs $d_k(1)$ and $d_k(2)$ from the analogue-digital converter E' are fed, a projection data memory 11 memorizing the outputs $d_k(1)$ and $d_k(2)$ from the address control 10, a coefficient generator 12 generating the necessary coefficient (this coefficient corresponds to the length of the object which has the X-ray absorption coefficient $\mu_k$) for calculating the X-ray absorption coefficient $\mu_k$, a multiplier 13 multiplying the output from the projection data memory 11 by the output from the coefficient generator 12, an accumulator 14 summing up the output from the multiplier 13, and a reconstruction data memory 15 memorizing X-ray absorption coefficient $\mu_k$ for reconstruction of X-ray computed tomography based on the output from the accumulator 14. By the above-described dimensional transformer F of projectional data, data outputs $d_k(1)$ and $d_k(2)$ from the analogue-digital converter E' are memorized in the projection data memory 11 through the address control 10 while an address signal is fed to the projection data memory 11, the coefficient generator 12, and the reconstruction data memory 15. Therefore X-ray absorption coefficient $\mu_k$ is calculated based on the data in the corresponding addresses in the projection data memory 11 and the coefficient generator 12, and it is stored in the corresponding address in the reconstruction data memory 15.

This dimensional transformer F of projectional data may produce upon calculation a signal corresponding to each of X-ray absorption coefficients $\mu_k$ (two dimensional data) of mn picture elements constituting a pseudo-tomographic plane S containing a plane of tomography of X-ray tested tissue B of body on the basis of mn/2 (=N/2) first digital data output $d_k(1)$ (one dimensional data) and mn/2 (=N/2) second digital data output $d_k(2)$ (one dimensional data) produced from the X-ray density measuring apparatus, respectively.

As its practical embodiment, a digital computer storing a desired program may be used.

Then, a calculation method will be described as follows in which each of X-ray absorption coefficients $\mu_k$ (two dimensional data) of mn picture elements as a constituting component of the pseudo-tomographic plane S containing a tomographic plane of X-ray tested tissue B is calculated in reference to each of mn/2 measured value $d_k(1)$ (one dimensional data) on the first X-ray projectional distribution $D_1$ produced by the X-ray density measuring apparatus and mn/2 measured value $d_k(2)$ (one dimensional data) on the second X-ray projectional distribution $D_2$.

As shown in FIG. 5, assuming that the number of mn/2 beams of the first unit X-ray beam projected from a specified direction $\theta_1$ (=$\tan^{-1} m/2$) and mn/2 beams of the second unit X-ray beam projected from another specified direction $\theta_2$(=$-\tan^{-1} m/2$) are provided in reference to the upper half plane of a pseudo-tomographic plane $S_1$ and the lower half plane of a pseudo-tomographic plane $S_2$ with respect to X-axis.

Further, assuming that the mn picture elements constituting a pseudo-tomographic plane S has, as shown in FIG. 5, the numbers 1 to mn in sequence, a pseudo-tomographic half plane $S_1$ is defined such that a position of each of mn picture elements is determined in such a way as the mn/2 beams of the first unit X-ray beams projected from the direction $\theta_1$ are passed through a left lower corner of the mn/2 picture elements 1 to mn/2, m+1 to 3/2 m, ..., (n−1)·m+1 to mn−m/2 up to X-ray detector C, respectively, and similarly in sequence mn/2 second unit X-ray beams number mn/2 projected from the direction $\theta_2$ are passed through a left upper corner of the mn/2 picture elements m to m/2+1, 2m to 3/2m+1, ..., mn to (n−1)·m+m/2+1 up to X-ray detector C.

In this way, a pseudo-tomographic plane S is also determined after each of the half pseudo-tomographic planes $S_1$ and $S_2$ is defined.

Further, in this case, each of the unit X-ray beams is assumed in such a way as a relative space w between the first and the second unit X-ray beams (a space between the sampling points) shows the same value for each of the unit X-ray beams.

In turn, since the first beam $B_1$ of the first unit X-ray beam is passed through only the picture element 1, it is possible to calculate a X-ray absorption coefficient $\mu_1$ if a relation between X-ray density $d_1(1)$ produced by the first beam of the first unit X-ray beam $\beta_1$ and X-ray absorption coefficient $\mu_1$ of the picture element 1 is apparent.

Further, since the second beam $B_2$ of the first unit X-ray beam is passed through only the picture elements 1 and 2, X-ray density $d_2(1)$ produced by the second beam $B_2$ of the first unit X-ray beam has information of both of the X-ray absorption coefficients $\mu_1$ and $\mu_2$ of the picture elements 1 and 2. However, as described above, since the X-ray absorption coefficient $\mu_1$ of the picture element 1 is already known, the X-ray adsorption coefficient $\mu_2$ of the picture element 2 is also known.

It is performed to make a calculation up to X-ray absorption coefficient $\mu_{m/2}$ of a picture element m/2 by providing a repetition of the similar operation in sequence.

Since the first beam $\beta'_1$ of the second unit X-ray beam $\beta'_1$ is passed only through the picture element m, it is possible to calculate the X-ray absorption coefficient $\mu_m$ if a relation between the X-ray density $d_1(2)$ produced by the first beam $\beta'_1$ of the second unit X-ray beam $\beta'_1$ and the X-ray absorption coefficient $\mu_m$ of the picture element m is already apparent or known.

Further, since the second beam $\beta'_2$ of the second unit X-ray beam $\beta'_2$ is passed only through the picture elements m and (m−1), the X-ray density $d_2(2)$ produced by the second beam $\beta'_2$ of the second unit X-ray beam $\beta'_2$ has both information of each of the X-ray absorption coefficients $\mu_m$ and $\mu_{m-1}$ for the picture elements m and (m−1). However, as described above, the X-ray absorption coefficient $\mu_m$ at the picture element m is already known, so that the X-ray absorption coefficient $\mu_{m-1}$ at the picture element (m−1) also becomes apparent.

Further, calclations are made in sequence up to the X-ray absorption coefficient $\mu_{m/2+1}$ at the picture element m/2+1 by providing a repetition of substantially the same operation.

In this way, the X-ray absorption coefficients $\mu_1$ to $\mu_m$ at the picture elements 1 to m constituting the most leftward column of the pseudo-tomographic plane S are calculated. When it is desired to calculate the X-ray absorption coefficients $\mu_{m+1}$ to $\mu_{2m}$ at the picture elements m+1 to 2m constituting the second column, the X-ray absorption coefficients $\mu_{m+1}$ to $\mu_{3/2m}$ at the picture elements m+1 to 3/2m constituting the upper half of the second column counted from the first unit X-ray beams $\beta_{m/2+1}$ to $\beta_{32m}$ ranging from m/2+1 to 3/2m are calculated in sequence substantially in the same manner as that for the above described upper half of the first column. Then the X-ray absorption coefficients $\mu_{2m}$ to $\mu_{3/2m+1}$ at the picture elements 2m to 3/2m+1 constituting the lower half of the second column from the second unit X-ray beams $\beta_{m/2+1}'$ to $\beta_{3/2m}'$ ranging from m/2+1 to 3/2m are calculated in sequence substantially in the same manner as that for the above described lower half of the first column, on the basis of the already calculated X-ray absorption coefficients $\mu_1$ to $\mu_m$.

Further, the X-ray absorption coefficients for the picture elements constituting the third column to the most right column of n are calculated in such a way as the upper half of the column is calculated in reference to the already calculated X-ray absorption coefficient and then the lower half part is calculated, and subsequently as for the adjacent right column its upper and lower half portions are alternately calculated.

In this way, when the X-ray absorption coefficients of the mn picture element are apparent, a tomography of the X-ray tested tissue B may be reconstructed a once.

In this way, it is possible to reconstruct the tomography of X-ray tested tissue B, and the dimensional transforming method of a quantitative one will be described in detail in reference to some mathematical equations etc. in addition to a qualitive description of said dimensional transforming of projectional data.

At first, it is assumed that a pseudo-tomographic plane S of a reconstructional plane of the tomography of X-ray tested tissue B of body (this pseudo-tomographic plane S is constituted by the half pseudo-tomographic planes $S_1$ and $S_2$) is constituted by mn pieces of divided small picture elements, as shown in FIG. 5, and a center of the plane S is placed at an origin of x–y coordinates.

Further, it is assumed that the numbers m and n are even number, and a size of one picture element is a square of $\Delta \times \Delta$ for a convenience of description.

Further, it is assumed that X-ray beams passing through the pseudo-tomographic plane S are projected in parallel from two directions fulfilling a relation of $\theta_1 = \tan^{-1} m/2$ and $\theta_2 = -\tan^{-1} m/2$, and a diameter of each of the unit X-ray beams is sufficiently small compared with that of each of the picture elements.

If it is assumed that each of the picture elements is provided with a number in accordance with the order as shown in FIG. 5, the absorption coefficient is defined by $\mu_k$, the X-ray beam is projected from a direction of $\theta_1$, a projection density made by the first unit X-ray beam passing through a point $(x_j, y_i)$ in x−y coordinates is defined as $d_k(1)$ and the following equation may be provided.

$$x_i = \left(-\frac{n}{2} + j - 1\right) \cdot \Delta, \; y_i = \left(\frac{m}{2} - i\right) \cdot \Delta,$$

$$k = (j-1) \cdot m + i, \left(i = 1, 2, \ldots, \frac{m}{2}; j = 1, 2, \ldots, n\right),$$

where, i is a row and j is a column.

And further if it is assumed that the projectional density produced by the second unit X-ray beam in a direction from $\theta_2$ is expressed by $d_k(2)$, the following equation may be provided. And it is assumed that the X-ray beam projected from a direction $\theta_2$ is passed throught the points.

$$x_i = \left(-\frac{n}{2} + j - 1\right) \cdot \Delta,$$

$$y_i = \left(-\frac{m}{2} + i\right) \cdot \Delta,$$

$$k = (j - 1) \cdot m + i.$$

$$\left(i = 1, 2, \ldots, \frac{m}{2}; j = 1, 2, \ldots, n\right)$$

$$\mathbb{L} \, \underline{\mu} = \mathbb{D} \tag{1}$$

where, $\mathbb{L} =$

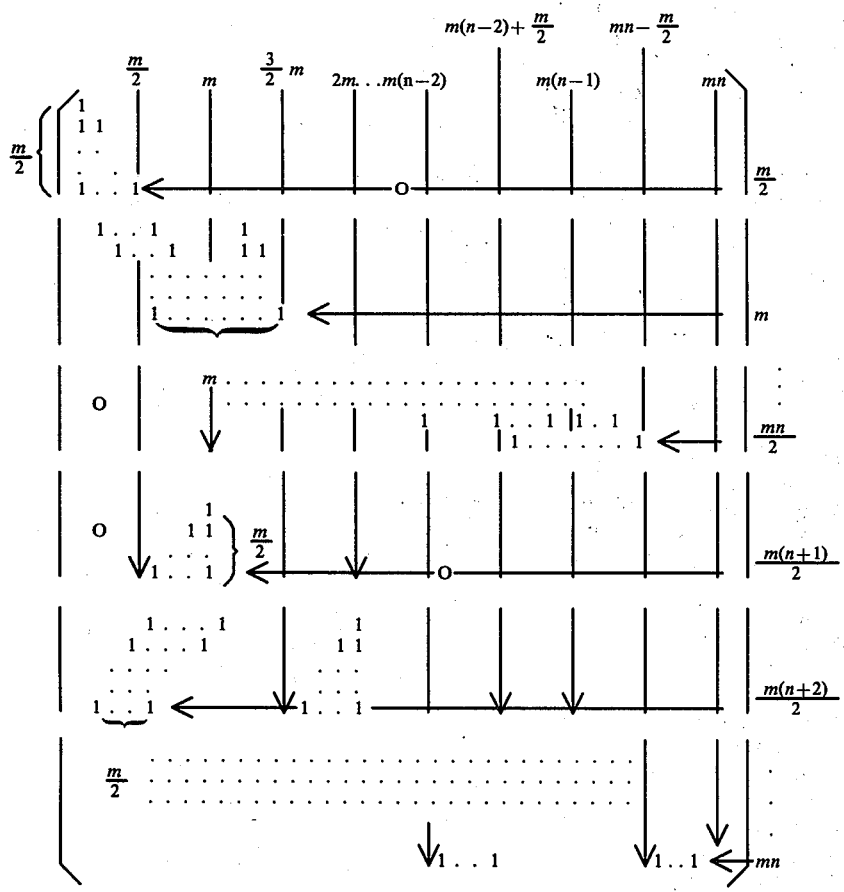

(2)

and where, $$\underline{\mu} = (\mu_1, \mu_2, \mu_3, \ldots, \mu_{mn})^T$$

$$\mathbb{D} = \Big(d_1(1), d_2(1), \ldots, d_{\frac{mn}{2}}(1),$$
$$d_1(2), d_2(2), \ldots, d_{\frac{mn}{2}}(2)\Big)^T / \alpha$$

$\mathbb{L}$ is a square matrix of $mn \times mn$.

A value of $\alpha$ is a length of X-ray beam passing through one picture element from directions of $\theta_1$ and $\theta_2$, and fulfills an equation of $$\alpha = \Delta \sqrt{1 + \cot^2\theta_1} = \Delta \sqrt{1 + \cot^2\theta_2}$$

and the symbol represents a transpose.

As described above, it is assumed that an equation of $mn = N$ is fulfilled.

Resolving the equation (1) shows two dimensional tomographic data $\mu_k$ of the X-ray tested tissue B. The data in general have some measuring errors.

Thus, in order to apply a mathematical programming, non-negative correction values of $r_1, r_2, r_3 \ldots r_N$ are applied. Since an absorption coefficient of X-ray beam passing through an object is generally a non-negative value and does not exceed a positive upper limit value U, the equation (1) will be expressed as follows by applying these limiting conditions $$
\left.\begin{array}{l}
l_{1\cdot 1}\mu_1 + l_{1\cdot 2}\mu_2 + \ldots + l_{1\cdot N}\mu_N - r_1 \leq p_1 \\
l_{1\cdot 1}\mu_1 + l_{1\cdot 2}\mu_2 + \ldots + l_{1\cdot N}\mu_N + r_1 \geq p_1 \\
l_{2\cdot 1}\mu_1 + l_{2\cdot 2}\mu_2 + \ldots + l_{2\cdot N}\mu_N - r_2 \leq p_2 \\
l_{2\cdot 1}\mu_1 + l_{2\cdot 2}\mu_2 + \ldots + l_{2\cdot N}\mu_N + r_2 \geq p_2 \\
\ldots \\
\ldots \\
l_{N\cdot 1}\mu_1 + l_{N\cdot 2}\mu_2 + \ldots + l_{N\cdot N}\mu_N - r_N \leq p_N \\
l_{N\cdot 1}\mu_1 + l_{N\cdot 2}\mu_2 + \ldots + l_{N\cdot N}\mu_N + r_N \geq p_N \\
\mu_1 \leq U, \mu_2 \leq U, \ldots, \mu_N \leq U \\
\mu_1 \geq 0, \mu_2 \geq 0, \ldots, \mu_N \geq 0 \\
r_1 \geq 0, r_2 \geq 0, \ldots, r_N \geq 0
\end{array}\right\} \quad (3)
$$

where, $p_1 = d_1(1)/\alpha, p_2 = d_2(1)/\alpha, \ldots, p\frac{N}{2} = d\frac{N}{2}(1)/\alpha,$ $p\frac{N}{2} + 1 = d_1(2)/\alpha, p\frac{N}{2} + 2 = d_2(2)/\alpha, \ldots, p_N = d\frac{N}{2}(2)/\alpha$ Solution having the minimum value of the object function of $$F = \sum_{k=1}^{N} r_k \quad (4)$$

is calculated by a mathematical programming under an equation (3) of restrictive condition, resulting in showing the two dimensional data $\mu_k$ after the calculation of limited times.

In the above example, the two dimensional data $\mu_k$ has been calculated under an object function for making the minimum sum of an absolute value of the correction in the equation of restrictive condition, there is also another method in which the object function of the equation (6) is made to be the minimum one under the equation of restrictive condition of the following equation (5).

$$
\left.\begin{array}{l}
l_{1\cdot 1}\mu_1 + l_{1\cdot 2}\mu_2 + \ldots + l_{1\cdot N}\mu_N - r \leq p_1 \\
l_{1\cdot 1}\mu_1 + l_{1\cdot 2}\mu_2 + \ldots + l_{1\cdot N}\mu_N + r \geq p_1 \\
l_{2\cdot 1}\mu_1 + l_{2\cdot 2}\mu_2 + \ldots + l_{2\cdot N}\mu_N - r \leq p_2 \\
l_{2\cdot 1}\mu_1 + l_{2\cdot 2}\mu_2 + \ldots + l_{2\cdot N}\mu_N + r \geq p_2 \\
\ldots \ldots \ldots \ldots \ldots \ldots \ldots \ldots \\
\ldots \ldots \ldots \ldots \ldots \ldots \ldots \ldots \\
l_{N\cdot 1}\mu_1 + l_{N\cdot 2}\mu_2 + \ldots + l_{N\cdot N}\mu_N - r \leq p_N \\
l_{N\cdot 1}\mu_1 + l_{N\cdot 2}\mu_2 + \ldots + l_{N\cdot N}\mu_N + r \geq p_N \\
\mu_1 \leq U, \mu_2 \leq U, \ldots, \mu_N \leq U \\
\mu_1 \geq 0, \mu_2 \geq 0, \ldots, \mu_N \geq 0, r \geq 0
\end{array}\right\} \quad (5)
$$

$$F = r \ldots (6)$$

Upon solving the above equation, the tomographic two dimensional data $\mu_k$ of the X-ray tested tissue B is calculated under such conditions as the maximum corrected value of the absolute value under the equation of the restrictive condition is made to be minimum.

Further, the calculation may also be made by a method in which an object function of $$F = \sum_{k=1}^{N} r_k^2 \quad (7)$$

is made to be minimum under the equation of the restrictive condition of the equation (3), or a method in which an object function of $$F = r^2 \quad (8)$$

is made to be minimum under an equation of the restrictive condition of the equation (5).

Figure 4:
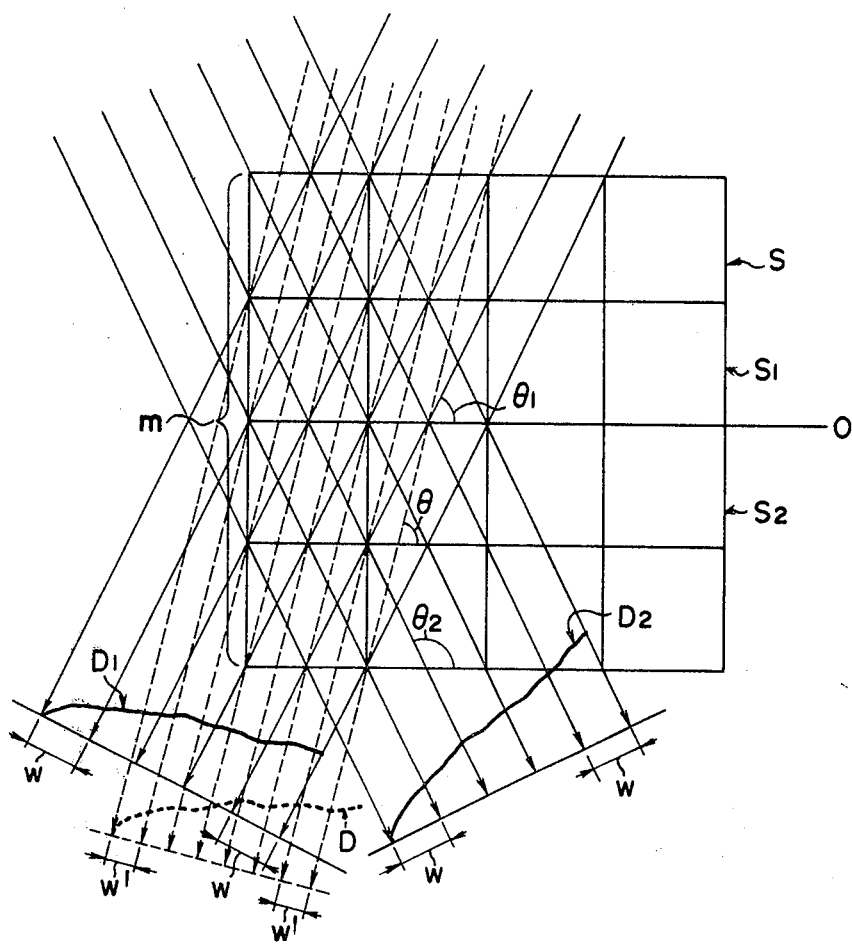
FIGS. 4 and 5 are schematic illustrations for showing the operations of the system, respectively.

In turn, as shown in FIG. 4, if it is assumed that there is a pseudo-tomographic plane S containing the X-ray tested tissue B and the number of mn of the unit X-ray beams projected from the direction $\theta$ ($=\tan^{-1}m$) are passed through the lower left corner of each of the picture elements constituting the plane S up to X-ray detector C, it is possible to calculate X-ray absorption coefficient of each of the picture elements as two dimensional data by applying the above described mathematical equation based on a single X-ray projectional distribution (shown by a dotted line in FIG. 4). However, in case of such a calculation as based on a single X-ray projectional distribution of X-ray D, a space w' between the sampling points is narrower than a space w between the sampling points based on the two projectional distributions $D_1$ and $D_2$ (shown by a solid line in FIG. 4) as in the present invention.

In case of such a calculation based on a single X-ray projectional distribution D, a space w' between the sampling points becomes excessively small as the number of picture elements constituting a pseudo-tomographic plane increases, resulting in that some problems of resolving power will be caused for a measurement of one-dimensional data.

In reference to the foregoing, in accordance with the present invention, the space w between the sampling points is wider than space w' between the sampling points, so that a resolving power of one-dimensional data is substantially improved when measured, resulting in that a reconstruction accuracy for the X-ray computed tomography is also improved.

Figure 3:
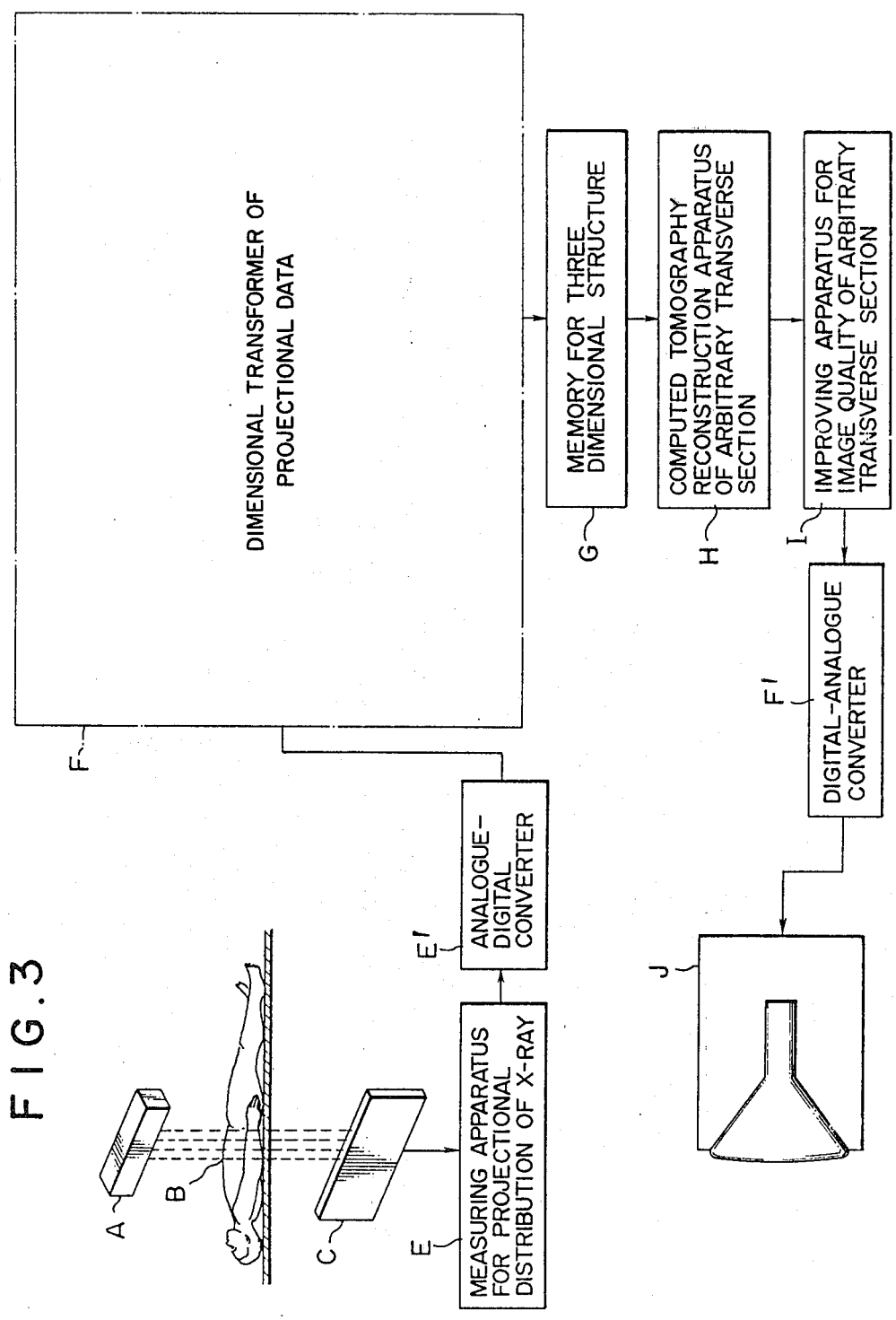
FIG. 3 is a block diagram to show the interconnections among the functional elements within the system.

The two dimensional data $\mu_k$ made in this way are transmitted to the memory for three dimensional structure G shown in FIG. 3, respectively.

This memory for three dimensional structure G is such a memory as the two dimensional data $\mu_k$ for use in making the tomography transmitted from the dimensional transformer F of projectional data F are stored in time sequence and the data of the three dimensional structure of the X-ray tested tissue B are calculated.

Thus, the two dimensional data $\mu_k$ transmitted at first from the dimensional transformer F of projectional data are related to a certain transverse section of X-ray tested tissue B, other X-ray projectional distributions $D_1'$, $D_2'$ may be made by changing a measuring point with the measuring apparatus E for X-ray projectional distribution, and the two dimensional data $\mu_k'$ relating to other sections may easily be obtained, and so it will become possible to store the three dimensional structure of X-ray tested tissue B by accumulating two dimensional data $\mu_k$, $\mu_k'$, $\mu_k''$ .... relating to different sections. However, in order to make a complete three dimensional structure, an interpolation etc. between each of the section data will be required, so that the present memory G may be applied as a memory device holding a calculation function.

To this memory G is connected a computed tomography reconstruction apparatus H of arbitrary transverse section. This computed tomography reconstruction apparatus H of arbitrary transverse section is such a device as the two dimensional data relating to the specified arbitrary transverse section of the X-ray tested tissue B are selectively retrieved from the data of three dimensional structure of X-ray tested tissue B stored in the memory G and thereby a tomography is reconstructed.

In this paragraph, the term of arbitrary transverse section is defined as a section which is horizontal, vertical or inclined to the X-ray tested tissue B of body.

The two dimensional data relating to the arbitrary tomography made by the computed tomography reconstruction apparatus H of arbitrary transverse section are mathematically calculated in response to the X-ray projectional distribution produced by the measuring apparatus E for X-ray projectional distribution, so that if the data are transmitted to and displayed on a display J of computed tomography of arbitrary transverse section for displaying data via suitable digital-analogue converter F' (hereinafer called as "D/A converter"), it is possible to reconstruct a tomography of X-ray tested tissue B. However, this tomography has such bad inferior components as noise or vague picture, so that no guarantee is made for getting a proper picture image.

Therefore, in order to correct data obtained from the computed tomography reconstruction apparatus H of arbitrary transverse section, the data are fed or transmitted to an improving apparatus I for image quality of arbitrary transverse section.

This improving apparatus I for image quality of arbitrary transverse section is made such that an image quality is improved by removing some noises, making a smoothness and a sharpness of the data of tomography of arbitrary transverse section transmitted from the computed tomography reconstruction apparatus H of arbitrary transverse section. A digital filter is used for eliminating the noise, a smoothing circuit is used for smoothing operation, and a differentiation circuit is used for amplifying a sharpness of the image.

The signal of which image quality has been improved is transmitted to said display J of computed tomography of arbitrary transverse section via D/A converter F'.

The display J of computed tomography of arbitrary transverse section is such a device as it receives a signal transmitted from the improving apparatus I for image quality of arbitrary transverse section and displays the arbitrary tomography of X-ray tested tissue B as a visible image upon a monitor of a color or monochromatic cathode-ray tube (Braun tube), and in general the Braun tube is used as described above.

In order to reconstruct a tomography of X-ray tested tissue B by an arrangement described above, the first one-dimensional data $d_k(1)$ is calculated by measuring each of the values $d_k(1)$ at the mn/2 positions equally spaced apart by a distance w with each other from one end of said first X-ray projectional distribution $D_1$ up to the other end thereof with the measuring apparatus E projectional distribution of X-ray in reference to the first X-ray projectional distribution $D_1$ produced by X-ray detector C by projecting X-ray in a desired direction $\theta_1$ from X-ray source A toward X-ray tested tissue B, and the second one-dimensional data $d_k(2)$ is calculated by measuring each of the values $d_k(2)$ at the mn/2 positions equally spaced apart by a distance w with each other from one end of said second X-ray projectional distribution $D_2$ up to the other end thereof with the measuring apparatus E for X-ray projectional distribution in reference to the second X-ray projectional distribution $D_2$ produced by X-ray detector C by projecting X-ray in the other desired direction $\theta_2$ from X-ray source A toward X-ray tested tissue B.

Then, these one-dimensional data $d_k(1)$ and $d_k(2)$ are properly converted from their analogue form to digital data, and thereby each of X-ray absorption coefficients $\mu_k$ (two-dimensional data) for the mn picture elements in the pseudo-tomographic plane S constituted by the half pseudo-tomographic planes $S_1$ and $S_2$ is calculated by the above mentioned method at the dimensional transformer F of projectional data.

Then, the two dimensional data $\mu_k$ are reconstructed through the memory G, the computed tomography reconstruction apparatus H of arbitrary transverse section, the improving apparatus I for image quality of arbitrary transverse section and D/A converter F' and displayed J by the display of computed tomography of arbitrary transverse section as the tomography of the X-ray tested tissue B of body.

Figure 6:
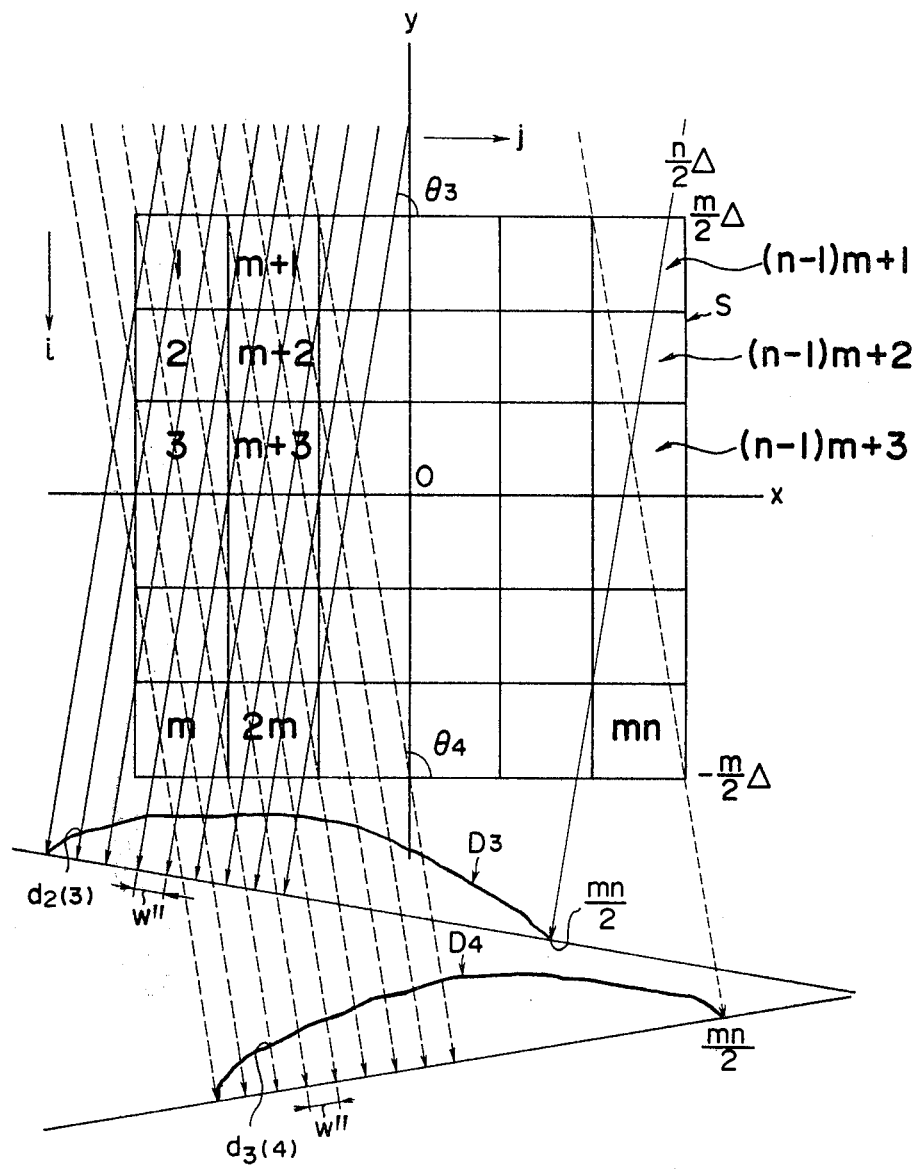
FIG. 6 is a schematic illustration for indicating an operation of the reconstruction method of X-ray computed tomography in a second preferred embodiment of the present invention.

FIG. 6 is a schematic view for illustrating a reconstruction method for X-ray computed tomography of a second preferred embodiment of the present invention wherein the similar numbers in FIG. 6 substantially correspond to that of FIGS. 2 to 5.

Also in the second preferred embodiment of the present invention, it is assumed that the pseudo-tomographic plane S of a reconstructional plane of the tomography of X-ray tested tissue B is constituted by the mn pieces of divided small picture elements 1 to mn, as shown in FIG. 6, and a center of the plane S is placed at an origin of x-y coordinates, and further it is assumed that the numbers m and n are even number, and a size of one picture element is a square of $\Delta \times \Delta$ for convinience of description.

Further, it is assumed that X-ray beams passing through the pseudo-tomographic plane S are projected in parallel by mn/2 beams from two directions fulfilling a relation of $\theta_3 = \tan^{-1}m$ and $\theta_4 = -\tan^{-1}m$ as different from that of the above mentioned preferred embodiment.

Further, it is assumed that a diameter of each of the unit X-ray beams is sufficiently small compared with that of each of the picture elements.

In this way, if it is assumed that the specified two directions for projecting X-ray beam are $\theta_3$ and $\theta_4$, respectively, the foregoing equation (1) may be expressed as follows.

$$L'\mu = D' \qquad (9)$$

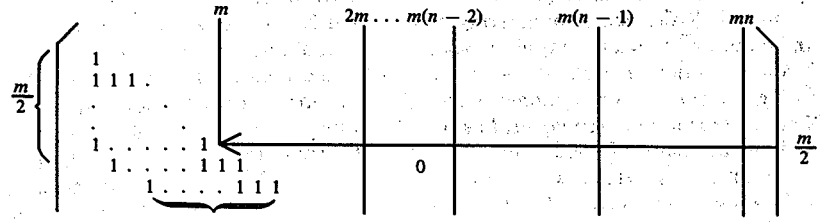

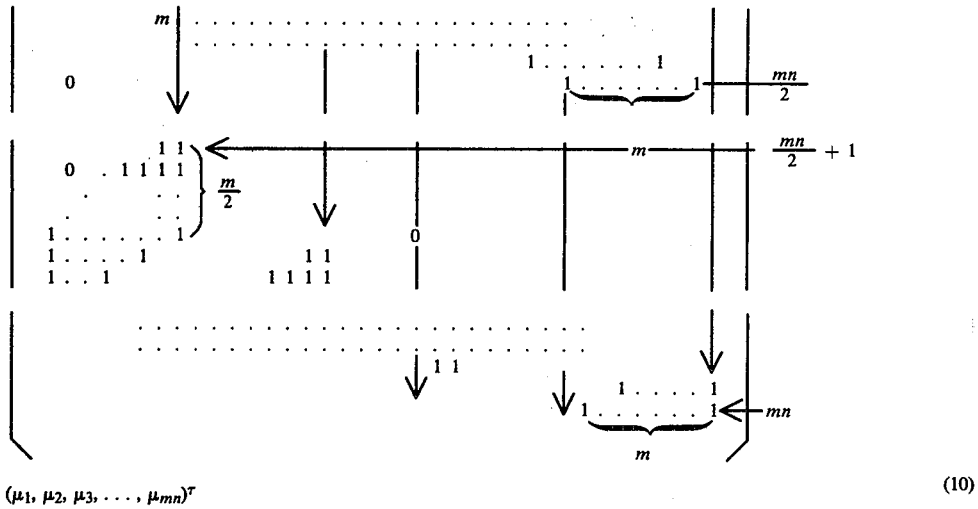

$$\boldsymbol{\mu} = (\mu_1, \mu_2, \mu_3, \ldots, \mu_{mn})^T \qquad (10)$$

$$\mathbf{D}' = \left( d_1(3), d_2(3), \ldots, d_{\frac{mn}{2}}(3), d_1(4), d_2(4), \ldots, d_{\frac{mn}{2}}(4) \right)^T / \alpha$$

And $d_k(3)$ shows the measured value produced by projecting X-ray beam from the direction $\theta_3$ and $d_k(4)$ shows the measured value produced by projecting X-ray beam from the direction $\theta_4$ respectively.

A value of $\alpha$ is a length of X-ray beams passing through one picture element in the directions $\theta_3$ and $\theta_4$ and fulfills a relation $$\alpha = \Delta \sqrt{1 + \cot^2 \theta_3} = \Delta \sqrt{1 + \cot^2 \theta_4}$$

and a symbol represents a transposition.

Resolving the equation (9) may enable a calculation of the two dimensional data $\mu_k$ of a tomography of the X-ray tested tissue B substantially in the same manner as that of the above mentioned preferred embodiment. However, in general, the data contain some measuring errors, so that the measuring errors are minimized by a mathematical programming substantially in the same manner as that of the above mentioned preferred embodiment.

Then, the signals corresponding to the X-ray absorption coefficient $\mu_k$ as the two dimensional data obtained in this way are reconstructed through the memory G, the computed tomography reconstruction apparatus H of arbitrary transverse section, the improving apparatus I for image quality of arbitrary transverse section and D/A converter F' and displayed by the display J of computed tomography of arbitrary transverse section as the tomography of the X-ray tested tissue B.

To the contrary, as described above in reference to FIG. 4, it has been assumed that it would be possible to calculate the X-ray absorption coefficient for each of the picture elements as the two dimensional data from a single X-ray projectional distribution D (a broken line in FIG. 4) if the mn unit X-ray beams numbering Mn projected from the direction $\theta$ (=tan$^{-1}$m) were passed through the left lower corner of each of the picture elements constituting the pseudo-tomographic plane S containing the X-ray tested tissue B. However, this type of means operated on the basis of such single X-ray projectional distribution D has a space w' between the sampling points showing a half value of a space w" between the sampling points produced in reference to the two X-ray projectional distributions D3 and D4 (see FIG. 6) as illustrated in the second preferred embodiment of the invention.

This is due to the fact that the X-ray beam indicated by a solid line in FIG. 6 in case of the second preferred embodiment coincides with a projectional direction of the X-ray beam generated in reference to a single X-ray projectional distribution and further a space between the unit X-ray beams is two times the space between the unit X-ray beams in reference in the single X-ray projectional distribution D. Further, the X-ray beams shown by the dotted line in FIG. 6 have the projecting direction $\theta_4$, i.e. $-\theta_3$, and have the same projection space as that of the X-ray beam shown by a solid line in FIG. 6, so that a similar situation as that described above may be applied to the X-ray beam illustrated by the dotted lines in FIG. 6.

Therefore, in case of the second preferred embodiment of the present invention, similar to that of the first preferred embodiment described above, a resolving power in measuring one-dimensional data is substantially improved, resulting in that an accuracy of reconstruction of the tomography may also be improved.

Figure 7:
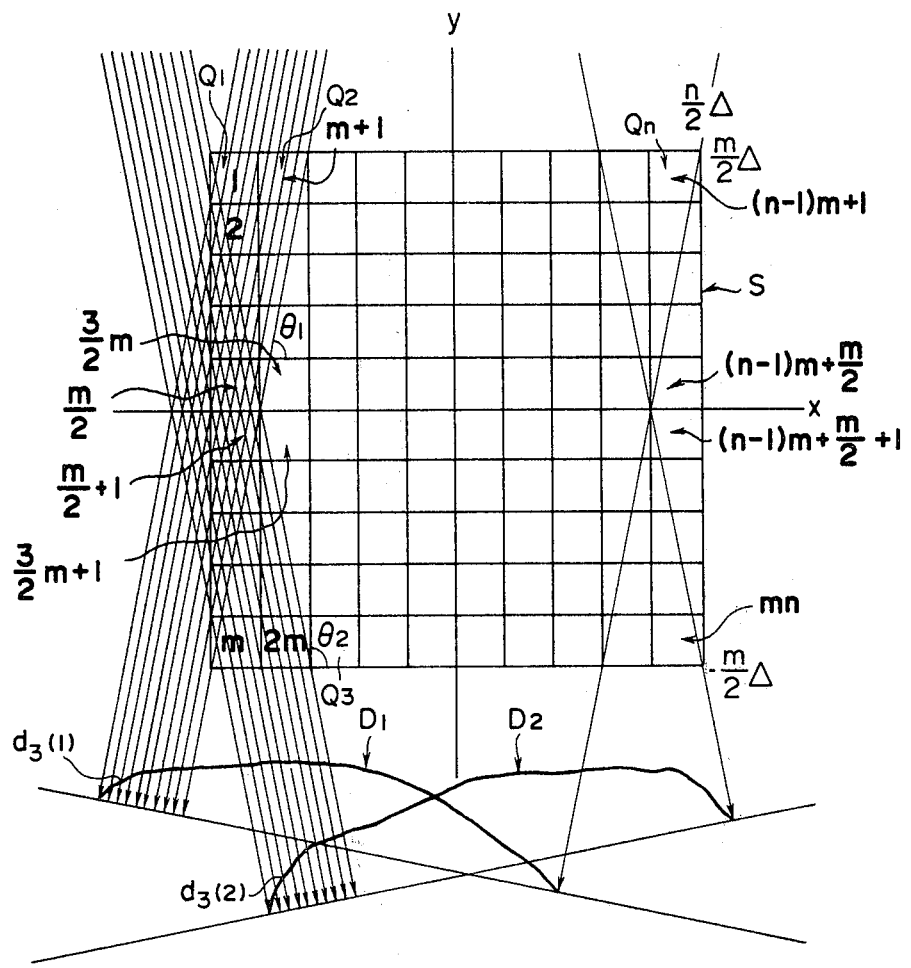
FIG. 7 is a schematic illustration for showing a reconstruction method of X-ray computed tomography in a third preferred embodiment of the present invention.

FIG. 7 is a schematic illustration for showing a reconstruction method of X-ray computed tomography in a third preferred embodiment of the present invention wherein the same reference numbers as those shown in FIGS. 2 to 6 represent substantially the similar parts.

In the third preferred embodiment, it is possible to get n groups (mn/2 values in all) of the measured values produced at [$\mu$/2(=m/2)] positions properly spaced apart in sequence with each other from one end of the first X-ray projectional distribution D1 to the other end thereof and further to get II groups mn/2 values in all) of the measured values produced at a [u/2(=m/2)] positions properly spaced apart in sequence with each other from one end of the second X-ray projectional distribution D2 to the other end thereof in reference to the first and second X-ray projectional distributions D1 and D2 produced by projecting X-ray from the desired two directions toward the X-ray tested tissue B through the X-ray density measuring apparatus constituted by said measuring apparatus E for projectional distribution of X-ray and A/D converter E' etc., and further the data output (digital signals) for each of the groups of the measured values from this the X-ray density measuring apparatus are fed in sequence to the dimensional transformer of projectional data F constituting the apparatus for calculating X-ray absorption coefficient.

This dimensional transformer F of projectional data is constructed such that it may use M signals corresponding to each of the X-ray absorption coefficients (two-dimensional data) for each of the picture elements in n groups of picture elements constituted by the u (=m) picture elements, and calculate them in sequence and produce them in reference to the data output for each of the groups of the measured values from the X-ray density measuring apparatus i.e. the output of the first X-ray projectional distribution (one-dimensional data) and the output of the second X-ray projectional distribution corresponding to the data output of this first X-ray projectional distribution, and as its practical embodiment, similar to each of said preferred embodiments, the digital computer storing the desired programs therein may be applied.

Then, a method will be described in which each of the X-ray absorption coefficients (two-dimensional data) for the number of mn of the picture elements as the constituent component elements of the pseudo-tomographic plane S containing a tomographic plane of the X-ray tested tissue (this plane S is constituted by groups of the picture elements) is calculated in reference to each of the groups of the measured values constituted by the m/2 measured values $d_k(1)$ (one-dimensional data) on the first X-ray projectional distribution $D_1$ produced by the X-ray density measuring apparatus and each of the groups of the measured values constituted by the m/2 measured values $d_k(2)$ (one-dimensional data) on the second X-ray projectional distribution of X-ray produced by the X-ray density measuring apparatus substantially in the same manner as above.

A shown in FIG. 7, it is assumed that there are the mn/2 X-ray beams in the first unit X-ray beam projected from the desired direction $\theta_1$ (=tan$^{-1}$m/2) and also mn/2 X-ray beams in the second unit X-ray beam projected from the other desired direction $\theta_2$ (=−tan$^{-1}$m/2).

Further, a first group of picture elements $Q_1$ is defined such that a position of each of the picture elements is defined in such a way as the first beam of the first unit X-ray beam is passed through a left lower corner of the first picture element up to X-ray detector C, then in sequence similarly the second to m/2-th means of the first unit X-ray beams are passed through the left lower corner of the second m/2-th picture elements up to X-ray detector C, and at the same time the first beam of the second unit X-ray beam is passed through the m-th left upper corner the picture element up to X-ray detector C, then in sequence similarly the second to m/2-th beams order of the second unit X-ray beams are passed through the left upper corner of (m−1)-th to (m/2+1)-th picture elements up to X-ray detector C, respectively.

Then, a second group of picture elements $Q_2$ is defined such that a position of each of the picture elements is defined in such a way as (m/2+1)-th to m-th beams of the first unit X-ray beams are passed through the left lower corners of the (m+1)-th to 3/2m-th picture elements up to X-ray detector C, respectively, and a position of each of the picture elements is defined in such a way as the (m/2+1)-th to m-th beams of the second unit X-ray beams are passed through the left upper corner of the 2m-th to (3/2m+1)-th picture elements up to X-ray detector C.

Similarly in sequence the third to n-th picture elements of the groups $Q_3$ to $Q_n$ of each of the picture elements are defined such that each of (m+1)-th to 3/2m-th, (3/2m+1)-th to 2m-th, . . .

$$\left\{ \frac{m(n-1)}{2} + 1 \right\} - th$$

to mn/2-th is passed through the left lower corners of the first unit X-ray beams (2m+1)-th to 5/2m-th, (3m+1)-th to 7/2m-th, . . . , {m(n−1)+1}-th to (mn−m/2) picture elements up to X-ray detector C, and at the same time a position of each of the picture elements is defined in such a way as each of the (m+1)-th to 3/2m-th, (3/2m+1)-th to 2m-th, . . . , $$\left\{ \frac{m(n-1)}{2} + 1 \right\} - th$$

to mn/2-th of the second unit X-ray beams is passed through the left upper corners of the 3m-th to (5/2m+1)-th, 4m-th to (7/2m+1)-th, . . . , mn-th to {m(n−1)+mb 2+1}-th, picture elements respectively.

In this way, the pseudo-tomographic plane S will be defined by determining each of the groups of picture elements $Q_1$ to $Q_n$.

And in this cse, it is assumed that each of the unit X-ray beams is defined in such a way as a relative space w (a space between the sampling points) of the first and second unit X-ray beam shows the same value.

Since the first beam of the first unit X-ray beam is passed only through the picture element 1, if a relation between the X-ray density $d_1(1)$ produced by this first beam of the first unit X-ray beam and the X-ray absorption coefficient $\mu_1$ for the picture element 1 is apparent, this X-ray absorption coefficient $\mu_1$ may simply be calculated.

Further, since the second beam of the first unit X-ray beam is passed only through the picture elements 1 and 2, the X-ray density $d_2(1)$ produced by the second beam of the first unit X-ray beam has both information of each of the X-ray absorption coefficients $\mu_1$ and $\mu_2$ for the picture elements 1 and 2. However, as described above, since the X-ray absorption coefficient $\mu_1$ at the picture element 1 already known, the X-ray absorption coefficient $\mu_2$ at the picture element 2 will also become apparent.

Then, similarly in sequence, a calculation will be performed up to the X-ray absorption coefficient $\mu_{m/2}$ at the picture element m/2 by providing a repetitive operation substantially in the same manner as above.

Further, since the first beam of the second unit X-ray beam is passed through only the picture element m, if a relation between the X-ray density $d_1(2)$ produced by the first beam of the second unit X-ray beam and the X-ray absorption coefficient $\mu_m$ of the picture element m is apparent, it is possible to calculate the X-ray absorption coefficient $\mu_m$.

Further, since the second beam of the second unit X-ray beam is passed through only the picture elements m and (m−1), the X-ray density d₂(2) produced by the second beam of the second unit X-ray beam has both information of each of the X-ray absorption coefficients $\mu_m$ and $\mu_{m-1}$ at the picture elements m and (m−1). However, as described above, the X-ray absorption coefficient $\mu_m$ at the picture element m is already known, so that the X-ray absorption coefficient $\mu_{m-1}$ at the picture element (m−1) will also be apparent.

Similarly in sequence, a calculation is performed up to the X-ray absorption coefficient $\mu_{m/2+1}$ at the picture element (m/2+1) by providing a repetition of the above described operation.

In this way, the X-ray absorption coefficients $\mu_1$ to $\mu_m$ at the first group of picture elements q₁ constituting the most leftward column of the pseudo-tomographic plane S are calculated. The X-ray absorption coefficients $\mu_1$ to $\mu_m$ produced by this calculation are transmitted to the memory G.

In order to calculate the X-ray absorption coefficients $\mu_{m+1}$ to $\mu_{2m}$ at the second group of the picture elements Q₂ constituting the second column, information of the X-ray absorption coefficients $\mu_1$ to $\mu_m$ which have already been stored in the memory G are properly called out, the X-ray absorption coefficients $\mu_{m+1}$ to $\mu_{3/2\,m}$ at the picture elements tm+1) to 3/2m constituting the upper half of the second column from (m/2+1)-th to m-th of the first unit X-ray beams are calculated in sequence substantially in the same manner as that of the above mentioned upper half of the first column and the X-ray absorption coefficients $\mu_{2m}$ to $\mu_{3/2m+1}$ at the picture elements 2m to (3/2m+1) constituting the lower half part of the second column from (m/2+1)-th to m-th of the second unit X-ray beam are calculated in sequence substantially in the same manner as that of the above mentioned lower half part of the first column.

Thus, the X-ray absorption coefficients $\mu_{m+1}$ to $\mu_{2m}$ produced are also transmitted to the memory G.

In sequence, the X-ray absorption coefficient of the picture elements constituted by the third group Q₃ of picture elements to the n - th (most rightward end) group Q$_n$ of picture elements is calculated such that the already calculated X-ray absorption coefficients are properly read out of the memory G, thereby the upper half part of the group of the picture elements is calculated, the lower half part thereof is calculated, and the results of the calculations are transmitted to the memory G. Then the upper half and lower half of the right adjacent group of picture elements are calculated, the result of the calculation is transmitted to the memory G, and in this way, and alternative calculation of the picture elements and transmittance of them to the memory G are performed.

In this way, it is possible to calculate the X-ray absorption coefficient for each of the groups of the picture elements, and in addition to the above mentioned qualitive description for the dimensional transformation of X-ray projectional distribution, a quantitive transformation of the X-ray projectional distribution under an application of mathematical equations will be described in detail.

At first, it is assumed that the pseudo-tomographic plane S applied as a reconstruction plane for a tomography of the X-ray tested tissue B is, as shown in FIG. 5, made by n groups of picture elements arranged as a partial plane of columns of said reconstruction plane of tomography constituted by m pieces of small divided picture elements, and a center of the plane S is placed at an origin of x - y coordinates.

Further, for a convenience of description, the numbers m and n are even number and a size of one picture element is a square of $\Delta \times \Delta$.

Further, it is assumed that X-ray beams passing through the pseudo-tomographic plane S are projected in parallel from such two directions as fulfilling $\theta_1 = \tan^{-1} m/2$ and $\theta_2 = -\tan^{-1} m/2$, and a diameter of each of the unit X-ray beams is sufficiently small compared with that of each of the picture elements.

In order to calculate the X-ray absorption coefficients $\mu_1$ to $\mu_m$ for each of the picture elements 1 to m in the first group of the picture elements Q₁, both first densities of X-ray projection d₁(1) to d$_{m/2}$(1) numbering m/2 and the second densities of X-ray projection d₂(1) to d$_{m/2}$(2) numbering m/2 are applied, resulting in the following equation.

$$\mathbb{L}\,\pmb{\mu} = \mathbb{D}_{Q1} \qquad (11)$$

$$\mathbb{L} = \left( \begin{array}{cc} \left[\begin{array}{c} 1 \\ 1\ 1 \\ 1\ 1\ 1 \\ \cdots \\ \vdots \\ 1 \cdots\cdots 1 \end{array}\right]_{m/2} & 0 \\ 0 & \left[\begin{array}{c} m/2 \qquad 1 \\ 1\ 1 \\ 1\ 1\ 1 \\ \cdots \\ \vdots \\ 1\cdots\cdots 1 \end{array}\right]_{m/2} \end{array} \right) \qquad (12)$$

$$\pmb{\mu} = (\mu_1, \mu_2, \mu_3, \ldots, \mu_m)^T$$

$$\mathbb{D}_{64} = (d_1(1), d_2(1), \ldots, d_{\frac{m}{2}}(1), d_1(2), d_2(2), \ldots, d_{\frac{m}{2}}(2))^T/\alpha$$

where, $\mathbb{L}$ is a square matrix of m x m, and a value of $\alpha$ is a length of the X-ray beams passing through one picture element in the directions $\theta_1$ and $\theta_2$, fulfills a relation of $$\alpha = \Delta\sqrt{1 + \cot^2\theta_1} = \Delta\sqrt{1 + \cot^2\theta_2}$$

and the symbol T shows a transposition.

Solving the equation (11) results in that the X-ray absorption coefficients $\mu_1$ to $\mu_m$ for each of the picture elements 1 to m in the first group of picture elements Q₁ are calculated. However, in general, the calculated result contains some measuring errors.

In view of this fact, when a solution for making an object function of $$F = \sum_{k=1}^{m} r_k \qquad (13)$$

minimum by applying the non-negative correction values $r_1, r_2, r_3, \ldots, r_m$ and by applying substantially the same restrictive conditions as that of equation (3) is calculated by a mathematical programming, and the two dimensional optimum data $\mu_1$ to $\mu_m$ are produced after a limited times of calculation. Provided that the suffixes i, j for 1 $_{i,j}$, $\mu_j$, $r_i$, $P_i$ in equation (3) are 1, 2, 3, ..., m, respectively.

In the above example, the two dimensional data $\mu_1$ to $\mu_m$ have been calculated on the basis of the object function for making a sum of the absolute values of the correction values minimum under the equations of restrictive conditions and there is also another way of making the object function of the above described equation (6) minimum under the equation which is substantially the same as that of the above mentioned equation (5).

Provided that also in this case, the suffixes i, j of 1 $_{i,j}$, $\mu_j$, $p_i$ in said equation (5) are 1, 2, 3, ..., m, respectively.

Thereby, tomographic two dimensional data $\mu_1$ to $\mu_m$ of the X-ray tested tissue B are calculated under such a condition as the maximum correction value of the absolute values in said equations of restrictive conditions becomes minimum.

Further, it is also possible to calculate the relation eithere by a method for making an object function of $$F = \sum_{k=1}^{m} r_k^2 \qquad (14)$$

minimum under the equation of restrictive condition of the preferred embodiment corresponding to said equation (3) or by a method for making an object function of $$F = r^2 \qquad (15)$$

minimum under the equation of restrictive condition of the preferred embodiment corresponding to said equation (5).

Thus obtained two dimensional data $\mu_1$ to $\mu_m$ are transmitted to the memory for three dimensional structure G.

In order to calculate the X-ray absorption coefficients $\mu_{m+1}$ to $\mu_{2m}$ of each of the picture elements (m+1) to 2m in the second group of the picture elements $Q_2$, when the first projectional densities $d_{m/2+1}(1)$ to $d_m(1)$, number m/2 the second projectional densities $d_{m/2+1}(2)$ to $d_m(2)$ numbering m/2 and the X-ray absorption coefficient just calculated are applied, it is possible to calculate m X-ray absorption coefficients $\mu_{m+1}$ to $\mu_{2m}$ substantially in the same manner as above mentioned method.

Two dimensional data $\mu_{m+1}$ to $\mu_{2m}$ are calculated in a manner described above, then these two dimensional data $\mu_{m+1}$ to $\mu_{2m}$ are transmitted to the memory G.

Similar operations are repeated in sequence to calculate the X-ray absorption coefficients of each of the picture elements in the subsequent third to n-th groups $Q_3$ to $Q_n$ of the picture elements.

Then, the memory for three dimensional structure G is made such that, as described above, each of the groups $Q_1$ to $Q_n$ of the picture elements are assembled in accordance with their relative orders after receiving a set of m/2 signals from the dimensional transformer F of projectional data, that is, the first to N-th groups of picture element are assembled from the left side thereof in accordance with their order and thereby the signals from the dimensional transformer F of projectional data may be stored, and also the data of three dimensional structure of the X-ray tested tissue B are calculated.

That is, the two dimensional data $\mu_k$ (K=1, 2, 3 ..., mn) transmitted in sequence in n sets, where each set comprises m data, from the dimensional transformer F of projectional data are related to that B a section of the X-ray tested tissue of another X-ray projectional distributions $D_1'$, $D_2'$, may be produced by changing a measuring point by the measuring apparatus E for X-ray projectional distribution of X-ray E, and thereby the two dimensional data $\mu_k'$ relating to other sections may easily be produced substantially in the same manner as that described above, so that it is possible to store the three dimensional structure of the X-ray tested tissue B by accumulating the two dimensional data $\mu_k$, $\mu_k'$, $\mu_k''$ relating to several different sections. However, in order to construct a complete three dimensional structure, it becomes necessary to have an interpolation between each of the section data, so that the memory G may be used in the same manner as that described above as a memory device having a calculation function for it.

Also in the third preferred embodiment, since a space w between the sampling points is wider than said space w' between the sampling points similarly to that of said first preferred embodiment, a resolving power in measuring one-dimensional data is substantially improved and an accuracy of reconstructing the tomography is improved.

Further, it is also the same as that of each of the preferred embodiments that to the memory G are connected the display J of computed tomography of arbitrary transverse section via the computed tomography reconstruction apparatus H of arbitrary transverse section, the improving apparatus I for image quality of arbirary transverse section and D/A converter F'.

In order to produce a tomography of the X-ray tested tissue B by applying the above described arrangement, the first one-dimensional data $d_k(1)$ of the first X-ray projectional distribution $D_1$ detected by X-ray detector C by projecting at first X-ray from X-ray source A in a desired direction $\theta_1$ to the X-ray tested tissue B is calculated by measuring each of the values $d_k(1)$ at mn/2 positions equally spaced apart with each other by a space w' from one end of first X-ray projectional distribution $D_1$ up to the other end of the first X-ray projectional distribution $D_1$ by using the measuring apparatus E for projectional distribution of X-ray, and at the same time the second one-dimensional data $d_k(2)$ of the second X-ray projectional distribution $D_2$ detected by X-ray detector C by projecting X-ray from X-ray source A in a desired direction $\theta_2$ to the X-ray tested tissue B is calculated by measuring each of the values $d_k(2)$ at the mn/2 positions equally spaced apart with each other by a space w from one end of said second X-ray projectional distribution $D_2$ up to the other end of said second X-ray projectional distribution $D_2$ by using the measuring apparatus E for projectional distribution of X-ray.

Then, these one-dimensional data $d_k(1)$, $d_k(2)$ are properly converted from their analogue form to digital form, the X-ray absorption coefficient of each of the picture elements is calculated for each of the groups, where each group consists of m picture elements, by the dimensional transformer F of projectional data with the above described method. The X-ray absorption coefficients data for each of the groups of the picture elements are transmitted in sequence to the memory G and thereby each of the X-ray absorption coefficients $\mu_k$ (two-dimensional data) of the mn picture elements in the pseudo-tomographic plane S is calculated, and these X-ray absorption coefficients are stored in a specified sequence in the memory G.

Then, these two-dimensional data $\mu_k$ are reconstructed and displayed from the memory G as the tomography of the X-ray tested tissue B by the display J of computed tomography of an arbitrary transverse section via the computed tomography reconstruction apparatus M of arbitrary transverse section, the improving apparatus I for image quality of arbitrary transverse section and D/A converter F'.

Figure 8:
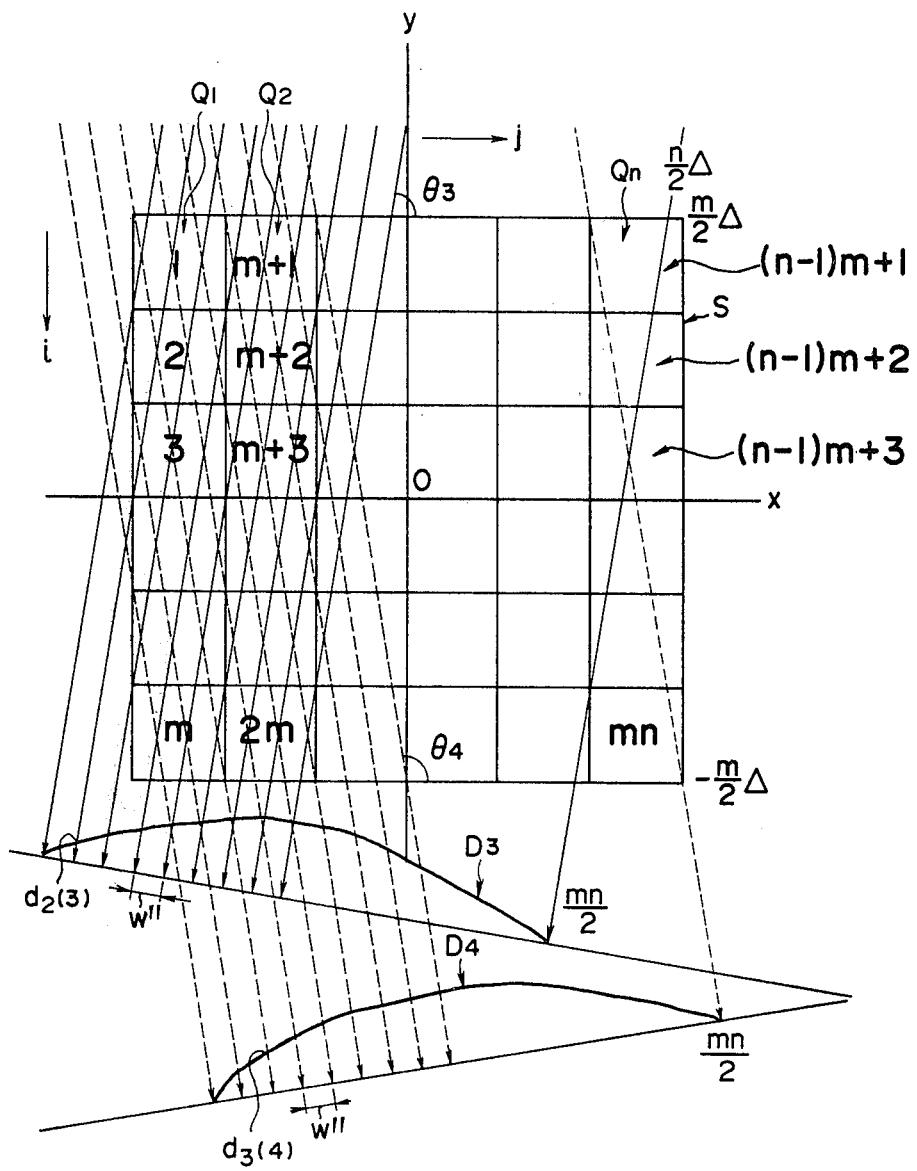
FIG. 8 is a schematic illustration for showing an operation of the reconstruction means for X-ray computed tomography applied as the fourth preferred embodiment of the present invention.

FIG. 8 is a schematic view for illustrating a reconstruction method of X-ray computed tomography of a fourth preferred embodiment of the present invention wherein the similar numbers in FIG. 8 substantially correspond to those of FIGS. 2 to 7.

Also in the fourth preferred embodiment, similar to the above mentioned second preferred embodiment, it is assumed that the pseudo-tomographic plane S as a reconstruction plane of the tomography of the X-ray tested tissue B (this plane S is made of n of groups of picture elements, where each group consists of m picture elements, is constituted by mn small divided picture elements 1 to mn, as illustrated in FIG. 8, a center of the plane S is placed at an origin of x - y coordinates, the number m and n are even number for convenience of description, and a size of one picture element is a square of $\Delta \times \Delta$.

Further, it is assumed that X-ray beams passing through the pseudo-tomographic plane S, similar to that of the above mentioned second preferred embodiment, are projected in parallel by mn/2 X-ray beams from two directions fulfilling the relation of $\theta_3 = \tan^{-1} m$ and $\theta_4 = -\tan^{-1} m$.

Further, it is assumed that a diameter of each of the unit X-ray beams is sufficiently small compared with that of each of the picture elements.

The following equation may be provided when both the m/2 projectional densities $d_1(3)$ to $d_{m/2}(3)$ X-ray projected from the direction $\theta_3$ and the m/2 projectional densities $d_1(4)$ to $d_{m/2}(4)$ of the X-ray projected from the direction $\theta_4$ are applied in order to calculate the X-ray absorption coefficients $\mu_1$ to $\mu_m$ for each of the picture elements 1 to m in the first group of picture elements $Q_1$.

$$\mathbb{L}' \boldsymbol{\mu} = \mathbb{D}'_{Q1} \quad (16)$$

where,

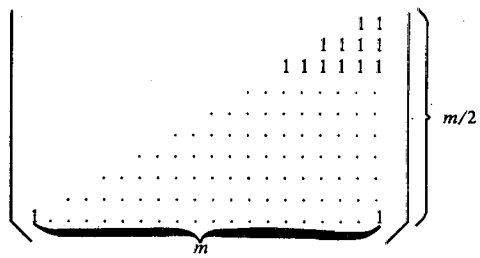

$$\boldsymbol{\mu} = (\mu_1, \mu_2, \mu_3, \ldots, \mu_m)^\tau \quad (17)$$

$$\mathbb{D}'_{Q1} = \left( d_1(3), d_2(3), \ldots, d\tfrac{m}{2}(3), \right.$$

$$\left. d_1(4), d_2(4), \ldots, d\tfrac{m}{2}(4) \right)^\tau / a'$$

And a value of $a'$ shows a length of X-ray beams passing through one picture element in the directions $\theta_3$ and $\theta_4$ and fulfills a relation of $$a' = \Delta \sqrt{1 + \cot^2 \theta_3} = \Delta \sqrt{1 + \cot^2 \theta_4}$$

and symbol shows a transposition.

Solving this equation (16) enables calculation of the two-dimensional tomographic data $\mu_1$ to $\mu_m$ of the X-ray tested tissue B substantially in the same manner as that of each of said preferred embodiments. However, in general, the data contain some measuring errors, so that the errors are minimized case of reconstruction by applying a mathematical programming substantially in the same manner as that of the above mentioned preferred embodiment.

The signals corresponding to the X-ray absorption coefficients $\mu_1$ to $\mu_m$ of the two-dimensional data thus obtained are transmitted to the memory G.

In sequence substantially in the same manner, the X-ray absorption coefficient of each of the picture elements for the second to n of the groups of picture elements $Q_2$ to $Q_n$ is calculated, and further these X-ray absorption coefficients are transmitted to the memory G, and said X-ray absorption coefficients are stored in the memory G under the specified order.

Thereafter, these two-dimensional data $\mu_k(k=1, 2, \ldots, mn)$ are reconstructed and displayed as a tomography of the X-ray tested tissue B by the display J of computed tomography of arbitrary transverse section from the memory G via computed tomography reconstruction apparatus H of arbitrary transverse section, the improving apparatus J for image quality of arbitrary transverse section and D/A converter F'.

Further, also in the case of the fourth preferred embodiment, it is possible to expand a space between the sampling points substantially in the same manner as that of said second preferred embodiment, so that a resolving power in measuring one-dimensional data is substantially improved, resulting in that an accuracy of reconstruction for the reconstructed tomography is improved.

Further, as shown in each of said preferred embodiments, in place of constructing a partial plane of columns of the tomography of the X-ray tested tissue B by each of the groups of the picture elements constituted by the m picture elements, it may be performed such that the groups of picture elements constituted by the 2 m to m (n−1) picture elements are properly combined with each other to construct the partial plane of columns of the tomography of the X-ray tested B.

Further, these groups of picture elements may be constituted by the m to m (n−1) picture elements in order to form a partical plane of columns of the tomography of the X-ray tested tissue $B_1$ and in addition to this, the group of picture elements may be constituted by the n to (m−1)n picture elements in order to make a partial plane of rows of the tomograpy of the X-ray tested tissue B.

Each of the groups of picture elements may be constituted by the picture elements of which numbers are less than m and n.

Further, that is, one group of picture elements may be constituted by any number of picture elements if they are less than the number mn but it is preferable that the number of picture elements constituting one group of picture elements is defined or set to the most suitable number in reference to a capacity of the data processing device and a data processing time.

Figure 9:
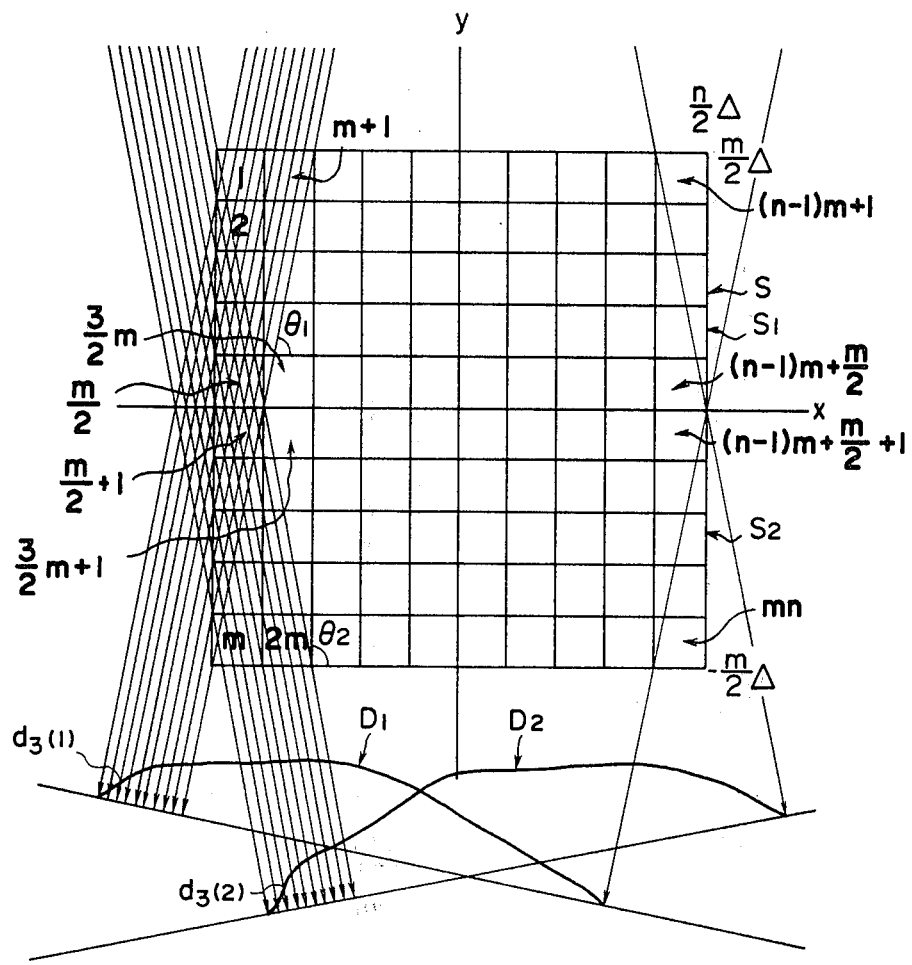
FIG. 9 is a schematic illustration for showing a reconstruction method of X-ray computed tomographic image applied as the fifth preferred embodiment of the present invention.

FIG. 9 is a schematic view for illustrating a reconstruction method of X-ray computed tomography of a fifth preferred embodiment of the present invention wherein the similar numbers in FIG. 9 substantially correspond to those of FIGS. 2 to 8.

In the fifth preferred embodiment of the present invention, values of $d_k(1)$, $d_k(2)$ numbering $$\frac{m(n+1)}{2}$$

(=M/2) on the first and second X-ray projectional distributions $D_1$, $D_2$ produced by projecting X-ray from desired two-directions to the X-ray tested tissue B is measured by a first means constituted by measuring apparatus E for projectional distribution of X-ray and A/D converter E' etc. Then the data outputs $d_k(1)$, $d_k(2)$ (digital signals) from are fed to the dimensional transformer F of projectional data constituting the apparatus for calculating X-ray absorption coefficient, respectively.

This dimensional transformer F of projectional data may calculate and feed the signal corresponding to each of the X-ray absorption coefficients $\mu_t$ (two-dimensional data) of the mn (=N+M) pieces of picture elements constituting a pseudo-tomographic plane S containing a tomography of the X-ray tested tissue B in reference to a digital data output $d_k(1)$ (one-dimensional data) of the $$\frac{m(n+1)}{2}$$

(=M/2) of the first projectional distribution from the apparatus for measuring density of X-ray and a digital data output $d_k(2)$ (one-dimensional data) of the $$\frac{m(n+1)}{2}$$

(=M/2) second projectional distribution.

Provided that $t=(j-1)\cdot m+i$ ($i=1, 2, \ldots m$; $j=1, 2, \ldots, n$), and i represents a row and j represents a column, respectively. As a practical example, a digital computer storing some desired programs therein may also be applied in the same manner as each of the first to fourth preferred embodiments.

It will be described as follows a method in which each of the X-ray absorption coefficients $\mu_t$ (two-dimensional data) of the N picture elements constituting a pseudo-tomographic plane S containing a tomographic image of the X-ray tested tissue B is calculated in reference to each of the values $d_k(1)$ (one-dimensional data) of the M/2 on the first X-ray projectional distribution of $D_1$ produced by the apparatus for measuring density of X-ray and the M values $d_k(2)$ (one-dimensional data) on the second X-ray projectional distribution $D_2$ produced by the apparatus for measuring density of X-ray.

At first, it is assumed that the pseudo-tomographic plane S (this pseudo-tomographic plane S is constituted by the half pseudo-tomographic planes $S_1$, $S_2$) applied as a tomography reconstruction plane of the X-ray tested tissue B is constituted by the mn (=N) picture elements divided into some small sections as shown in FIG. 9 and a center of the plane S is set at an origin of x - y coordinates.

Also, it is assumed that for the sake of convenience of description, m and n are even numbers and a size of one picture element is a square of $\Delta \times \Delta$.

Further, it is assumed that X-ray beams passing through the pseudo-tomographic plane S are projected in parallel from two-directions fulfilling a relation of $\theta_1 = \tan^{-1} m/2$ and $\theta_2 = -\tan^{-1} m/2$ and a beam diameter of each of the unit X-ray beams is sufficiently small compared to that of each of the picture elements.

The following equation may be provided when each of the picture elements has a number in accordance with the order as shown in FIG. 9, the absorption coefficient is expressed by $\mu_t$ and the projectional density produced by the first unit X-ray beam projected from a direction of $\theta_1$ and passing through the point $(x_j, y_i)$ in x - y coordinates is expressed by $d_k(1)$. where, $$x_j = \left(-\frac{n}{2} + j - 1\right)\Delta, \quad y_i = \left(\frac{m}{2} - i\right)\Delta,$$

$$k = (j-1)m + i, \left(i = 1, 2, \ldots, \frac{m}{2}; j = 1, 2, \ldots, n+1\right).$$

i indicates a row and j indicates a column, respectively.

The following equation may be provided when the projectional density produced by the second unit X-ray beam passed in a direction $\theta_2$ is $d_k(2)$. Provided that the X-ray beam in a direction $\theta_2$ is passed through the following points.

$$x_i = \left(-\frac{n}{2} + j - 1\right)\cdot \Delta,$$

$$y_i = \left(-\frac{m}{2} + i\right) \cdot \Delta,$$

$$k = (j - 1) \cdot m + i,$$

$$\left(i = 1, 2, \ldots, \frac{m}{2}; j = 1, 2, \ldots, n + 1\right)$$

$$\mathbb{L}\,\mu = \mathbb{D} \tag{18}$$

Where, $\mathbb{L} =$

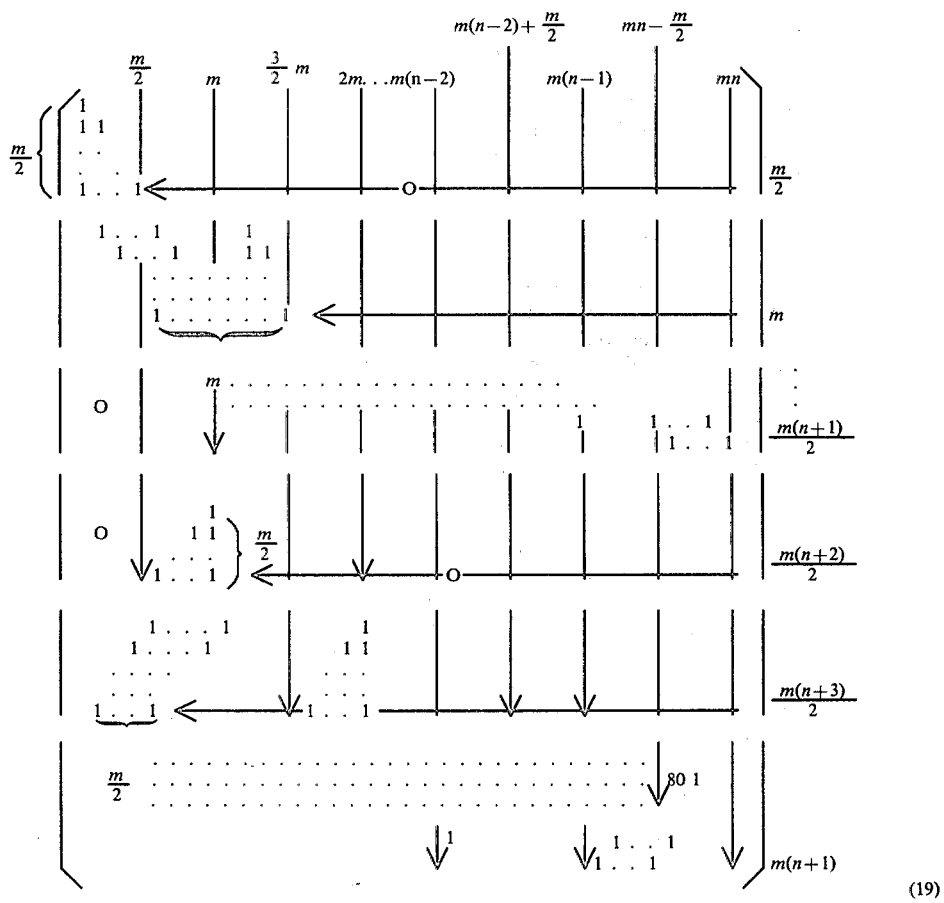

$$\mu = (\mu_1, \mu_2, \mu_3, \ldots \mu_{mn})^T$$

$$\mathbb{D} = \left(d_1(1), d_2(1), \ldots d_{\frac{m(n+1)}{2}}(1), d_1(2), d_2(2), \ldots d_{\frac{m(n+1)}{2}}(2)\right)^T / \alpha \tag{19}$$

and $\mathbb{L}$ is a matrix of m (n+1)×mn.

$\alpha$ is a length of X-ray beams passing through the picture elements in the directions $\theta_1$ and $\theta_2$ and fulfills a relation of $$\alpha = \Delta \sqrt{1 + \cot^2\theta_1} = \Delta \sqrt{1 + \cot^2\theta_2}$$

and the symbol T is a transposition.

As described above it is assumed that a relation of mn=N, m (n+1)=M is provided.

In the equation (18), since the number M of the equality is higher than the number N of the X-ray absorption coefficient $\mu_t$ as an unknown value, the optimum value of the X-ray absorption coefficient $\mu_t$ as the unknown value is calculated. Accomplishing the calculation will require a method of least squares.

Therefore, when the method of least squares is applied to the equation (18), the following relation may be provided by multiplying transposed matrix L to both sides of the equation (18):

$$\mathbb{L}^T \mathbb{L}\,\mu = \mathbb{L}^T \mathbb{D} \tag{20}$$

Since thus obtained equation (20) shows the same number of unknown values as that of the equality, it is possible to calculate the tomographic two-dimensional data $\mu_t$ of the X-ray tested tissue B in reference to the equation (20).

Solving the equation (20) may enable a calculation of the two-dimensional tomographic data $\mu_t$ of the X-ray tested tissue B. However, in general, the data contain some measuring errors.

Thus, when an answer for making an object function of $$F = \sum_{k=1}^{M} r_k \quad (21)$$

minimum is calculated by a mathematical programming under an equation of restrictive condition substantially the same as that of said equation (3) by introducing the non-negative correction values $r_1, r_2, r_3, \ldots, r_M$, resulting in that the most suitable two-dimensional data $\mu_t$ may be calculated after a limited times of calculation.

Provided that the suffix i of $l_{i,j}, \mu_j, r_i, p_i$ in said equation (3) is $1, 2, 3, \ldots, M$, and the suffix j is $1, 2, 3 \ldots, N$.

In the above example, the two-dimensional data $\mu_t$ have been calculated in reference to the object function for making a sum of absolute values of correction values in the equation of restrictive conditions minimum, there is also another method in which the object function of the above described equation (6) is made to be minimum on the basis of the equation of restrictive condition being substantially the same as that of equation (5).

Also provided in this case that the suffix i of $l_{i,j}, \mu_j, p_i$ in equation (5) is $1, 2, 3, \ldots, M$, and the suffix j is $1, 2, 3, \ldots N$.

In reference to this, two-dimensional tomographic data $\mu_t$ of the X-ray tested tissue B are calculated under such conditions as the maximum correction value of the absolute value in the equation of restrictive conditions being substantially the same as equation (5) where the suffix i of $l_{i,j}, \mu_j, p_i$ is $1, 2, 3, \ldots, M$, and the suffix j is $1, 2, 2, \ldots N$ is minimum.

Further, it is possible to perform a calculation either by a method for making an object function of $$F = \sum_{k=1}^{M} r_k^2 \quad (22)$$

minimum under an equation of restrictive condition of the preferred embodiment corresponding to said equation (3) or by a method for making an object function of $$F = r^2 \quad (23)$$

minimum under an equation of restrictive condition of the preferred embodiment corresponding to said equation (5).

Also in this case of the fifth preferred embodiment, similar to that of the above described first and third preferred embodiments, a space w between the sampling points is wider than w' between sampling points, so that the resolving power for measuring one-dimensional data is substantially improved, resulting in that an accuracy of reconstruction of the tomographic image is also improved.

Two-dimensional data $\mu_t$ thus obtained are transmitted to the memory for three-dimensional structure G shown in FIG. 3, respectively.

The two-dimensional data $\mu_t$ transmitted at first from the dimensional transformer F of projectional data show that of a certain tomographic plane of the X-ray tested tissue B, and it is possible to calculate other X-ray projectional distributions $D_1'$ and $D_2'$ by changing a measuring point with the measuring apparatus E for X-ray projectional distribution and also to facilitate a calculation of the two-dimensional data $\mu_t'$ concerning other tomographic planes, so that three-dimensional internal structure of the X-ray tested tissue B may be stored by accumulating the two-dimensional data $\mu_t, \mu_t', \mu_t'' \ldots$ concerning some different tomographic planes. However, in order to make a complete three-dimensional structure, it will become necessary to have an interpolation etc. between each of the tomographic data and in view of this fact, the present memory G is used as a memory device having a calculation function for performing the interpolation etc.

It is the same as that of each of the preferred embodiments that to this memory G is connected the display J of computed tomography of arbitrary transverse section via the computed tomography reconstruction apparatus H of arbitrary transverse section, the improving apparatus I for image quality of arbitrary transverse section I and D/A converter F'.

In order to reconstruct a tomography of the X-ray tested tissue B in reference to the above described arrangement, the first one-dimensional data $d_k(1)$ in the first X-ray projectional distribution $D_1$ produced by X-ray detector C by projecting at first X-ray from X-ray source A toward the X-ray tested tissue B in a desired direction $\theta_1$ is calculated by measuring each of the values $d_k(1)$ at the $$\frac{m(n+1)}{2}$$

(=M/2) positions equally spaced apart by a space w from one end of the first X-ray projectional distribution $D_1$ to the other end of the first X-ray projectional distribution $D_1$ by using the measuring apparatus E for the X-ray projectional distribution, and the second X-ray one-dimensional data $d_k(2)$ in the second projectional distribution $D_2$ produced by X-ray detector C by projecting X-ray from X-ray source A toward the X-ray tested tissue B in another desired direction $\theta_2$ is calculated by measuring each of the values $d_k(2)$ at the $$\frac{m(n+1)}{2}$$

(=M/2) positions equally spaced apart by a space w from one end of second projectional distribution $D_2$ to the other end of second projectional distribution $D_2$ by using the measuring apparatus E for the projectional distribution of X-ray.

Then, these one-dimensional data $d_k(1), d_k(2)$ are properly converted from their analogue form to digital form, and the X-ray absorption coefficient $\mu_t$ (two-dimensional data) of each of the mn (=N) picture elements is calculated in the pseudo-tomographic plane S constituted by one and the other half pseudo-tomographic planes $S_1$ and $S_2$ by the dimensional transformer F of projectional data F with the above described method.

Then, these two-dimensional data $\mu_t$ are reconstructed and displayed as a tomography B the X-ray tested tissue of B by the display J of computed tomography of arbitrary transverse section via memory G, the computed tomography reconstruction apparatus H of arbitrary transverse section, the improving apparatus I for image quality of arbitrary transverse section and D/A converter F'.

Figure 10:
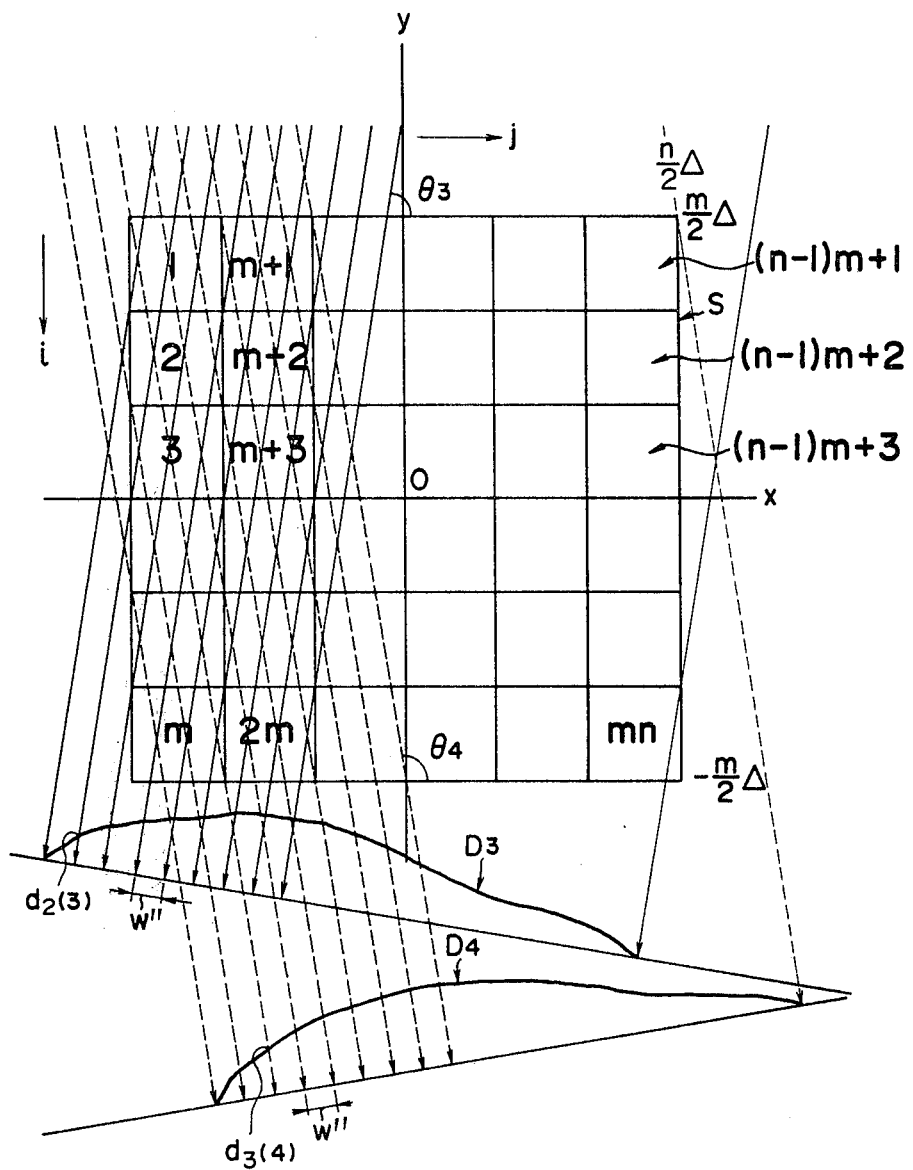
FIG. 10 is a schematic illustration for showing a reconstruction method of X-ray computed tomographic image applied as the sixth preferred embodiment of the present invention.

FIG. 10 is a schematic view for illustrating a reconstruction method of X-ray computed tomography of a sixth preferred embodiment of the present invention, In this way, the above mentioned equation (1) may be expressed as follows when the specified two directions for use in projecting the X-ray are set at $\theta_3$ and $\theta_4$.

$$L'\mu = D' \tag{24}$$

where $L' =$

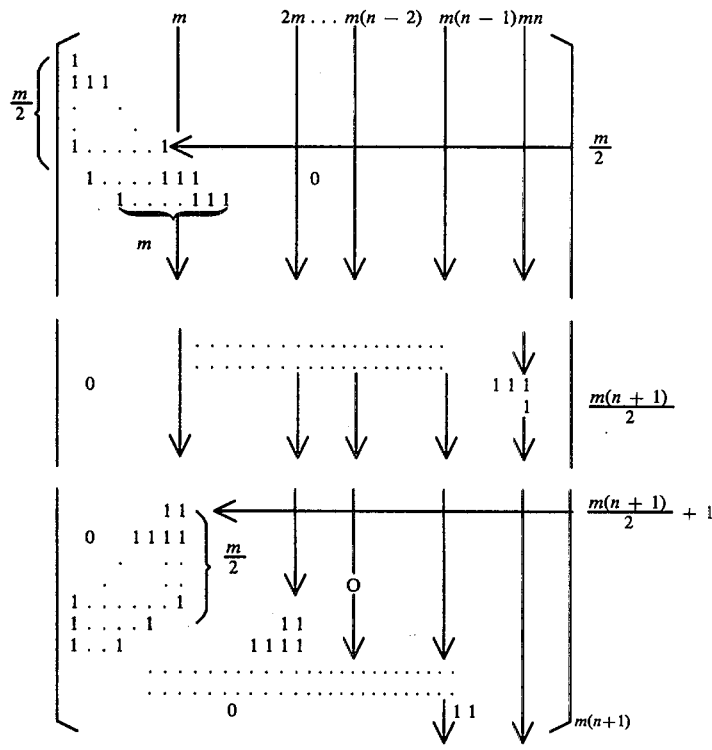

(25)

$$\mu = (\mu_1, \mu_2, \mu_3, \ldots, \mu_{mn})^T$$

$$D' = (d_1(3), d_2(3), \ldots, d_{\frac{m(n+1)}{2}}(3), d_1(4), d_2(4), \ldots, d_{\frac{m(n+1)}{2}}(4))^T/a'$$

wherein the similar numbers in FIG. 10 substantially correspond to that of FIGS. 2 to 9.

The sixth preferred embodiment is the same as that of the above described second and fourth preferred embodiments. In this case, it is assumed that, as shown in FIG. 10, the pseudo-tomographic plane S applied as a reconstruction plane of the tomography of the X-ray tested tissue B is constituted by the mn pieces of small divided picture elements 1 to mn, a center of the plane S is placed at an origin of x - y coordinates, and for convenience of description, the numbers m and n are even number, and the size of one picture element is a square of $\Delta \times \Delta$.

Further, it is assumed that the X-ray beams passing through the pseudo-tomographic plane S are projected in parallel by the $$\frac{m(n+1)}{2}$$

(=M/2) from two directions fulfilling a relation of $\theta_3 = \tan^{-1}m$ and $\theta_4 = -\tan^{-1}m$ in the same manner as that of the second and fourth preferred embodiments.

It is assumed that a diameter of each of the unit X-ray beams is sufficiently small compared with that of each of the picture elements.

In this equation, $d_k(3)$ is a measured value produced by projecting X-ray in a direction $\theta_3$, and $d_k(4)$ is a measured value produced by projecting X-ray in a direction $\theta_4$, respectively.

And a value of $\alpha'$ shows a length of X-ray beams passing through one picture element in the directions $\theta_3$ and $\theta_4$ and fulfills a relation of $$\alpha' = \Delta\sqrt{1 + \cot^2\theta_3} = \Delta\sqrt{1 + \cot^2\theta_4}$$

and the symbol T shows a transposition.

Solving this equation (24) may enable a calculation of the two-dimensional tomographic data $\mu_t$ of the X-ray tested tissue B substantially in the same manner as that of each of the first to fifth preferred embodiments. However, in general, the data contain some measuring errors, so that an operation is performed to make the errors in case of reconstruction minimum by applying a mathematical programming substantially in the same manner as that of each of the above mentioned preferred embodiments.

The signals corresponding to the X-ray absorption coefficients $\mu_t$ of the two-dimensional data thus obtained are reconstructed and displayed as a tomography of the X-ray tested tissue B by the display J of computed tomography of arbitrary transverse section from the memory G via computed tomography reconstruction apparatus H of arbitrary transverse section, the improving apparatus I for image quality of arbitrary transverse section and D/A converter F'.

Further, also in case of the sixth preferred embodiment, it is possible to expand a space between the sampling points substantially in the same manner as that of the second and fourth preferred embodiments, so that a resolving power in measuring one-dimensional data is substantially improved, resulting in that an accuracy of reconstruction for the reconstructed tomographic image is also improved.

Figure 11:
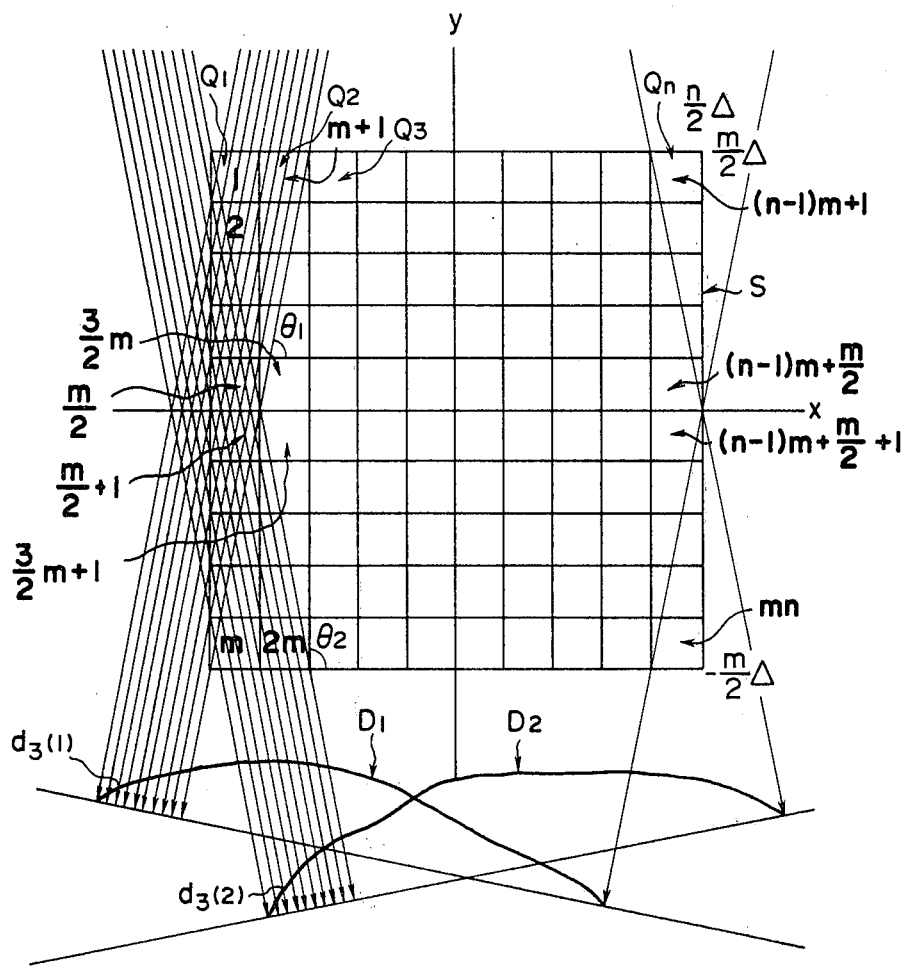
FIG. 11 is a schematic illustration for showing a reconstruction method of X-ray computed tomographic image applied as the seventh preferred embodiment of the present invention.

FIG. 11 is a schematic view for illustrating a reconstruction method of an X-ray computed tomographic image of a seventh preferred embodiment of the present invention wherein the similar numbers in FIG. 11 substantially correspond to those of FIGS. 2 to 10.

In the seventh preferred embodiment, it is possible to produce n groups of the measured values, each of which is constituted by the measured values produced at each of the m positions properly spaced apart with each other in sequence from one end of the first X-ray projectional distribution $D_1$ to the other end thereof and to produce n groups of the measured values each of which is constituted by the measured values produced at each of the m positions properly spaced apart with each other in sequence from one end of the second X-ray projectional distribution $D_2$ to the other end thereof in reference to first and second X-ray projectional distributions $D_1$ and $D_2$ produced by projecting X-ray to the X-ray tested tissue B in the desired two directions by the the X-ray density measuring apparatus constituted by said measuring apparatus E for X-ray projectional distribution and A/D converter E' etc. Further, data output (digital signal) for each of the groups of the measured values obtained from the X-ray density measuring apparatus is fed in sequence to the transformer F for the projectional distribution F constituting F the apparatus for calculating X-ray absorption coefficient, respectively.

This transformer F for the projectional distribution is operated such that the m signals corresponding to each of the X-ray absorption coefficients (two-dimensional data) for each of the picture elements in the n groups of picture elements constituted by the u (=m) picture elements fewer than a sum 2 m of the m measured values in the groups of the measured values produced by the first X-ray projectional distribution $D_1$ and the m measured values in the groups of the measured values produced by the second X-ray projectional distribution $D_2$ corresponding to the group of the measured values are calculated in sequence and produced in reference to the data output for each of the groups of the measured values from the X-ray density measuring apparatus, i.e. the first data output of X-ray projectional distribution (one-dimensional data) and the second data output of X-ray projectional distribution (one-dimensional data).

As a practical example, similar to each of the preferred embodiments, a digital computer storing the desired programming may be applied.

A method will be described in which each of the X-ray absorption coefficients $\mu_t$ (two-dimensional data) of the mn picture elements constituting a pseudo-tomographic plane S (this plane S is constituted by n groups of picture elements) containing a tomographic image of the X-ray tested tissue B is calculated in reference to each of the groups of the measured values constituted by each of the measured values $d_k(1)$ (one-dimensional data) numbering of m on the first X-rays projectional distribution $D_1$ produced by the X-ray density measuring apparatus and each of the groups of the measured values constituted by each of the measured values $d_k(2)$ (one-dimensional data) numbering m on the second X-ray projectional distribution $D_2$ produced by the X-ray density measuring apparatus.

At first, it is assumed that the pseudo-tomographic plane S applied as a reconstructed tomographic plane of the X-ray tested tissue B is constituted such that the groups of picture elements applied as a partial plane of columns for the reconstructed tomographic plane constituted by the m small divided picture elements, as shown in FIG. 11, are collected to form n groups and a center of the plane S is set at an origin of x - y coordinates.

Also, it is assumed that for the sake of convenience of description, m and n are even numbers and a size of one picture element is a square of $\Delta \times \Delta$.

Further, it is assumed that x-ray beams passing through the pseudo-tomographic plane S are projected in parallel from two directions fulfilling a relation of $\theta_1 = \tan^{-1} m/2$ and $\theta_2 = -\tan^{-1} m/2$ and a beam diameter of each of the unit X-ray beams is sufficiently small compared to that of each of the picture elements.

At first, the X-ray absorption coefficients $\mu_1$ to $\mu_m$ for each of the picture elements 1 to m in the first group of picture elements $Q_1$ are calculated. In the preferred embodiment, the following equation may be provided if the first projectional densities $d_1(1)$ to $d_m(1)$ numbering $v_1/2(=m)$ more than m/2 the second projectional densities $d_2(1)$ to $d_m(2)$ numbering $v_1/2$ (=m) more than m/2 are employed.

$$\mathbb{L} \, \mu = \mathbb{D}_{Q_1} \tag{26}$$

Where,

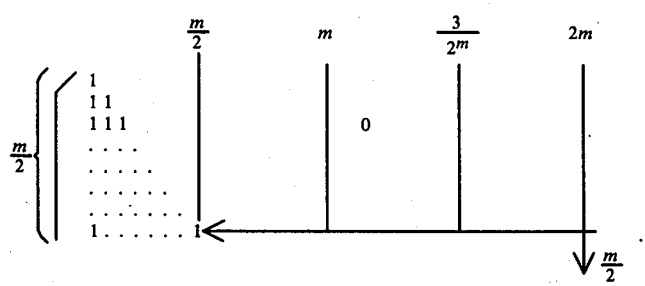

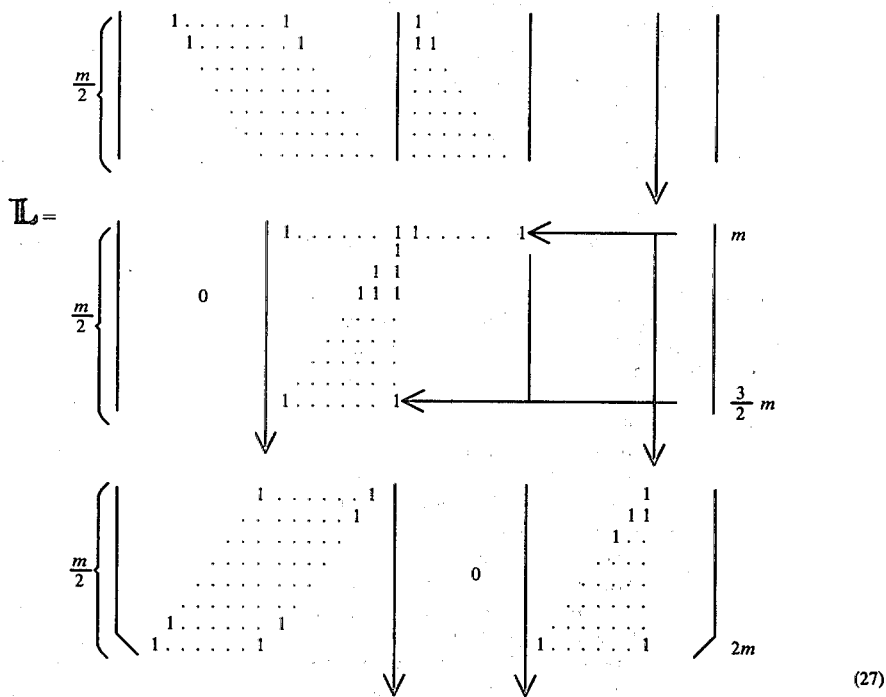

(27)

and where, $\mu = (\mu_1, \mu_2, \mu_3, \ldots, \mu_{2m})^T$ $D_{Qi} = (d_1(1), d_2(1), \ldots, d_m(1), d_1(2), d_2(2), \ldots, d_m(2))^T/\alpha$ $\mathbb{L}$ is a square matrix of 2 m×2 m.

A value of $\alpha$ is a length of X-ray beams passing through one picture element in the directions $\theta_1$ and $\theta_2$, and fulfills a relation of $$\alpha = \Delta\sqrt{1 + \cot^2\theta_1} = \Delta\sqrt{1 + \cot^2\theta_2}$$

and the symbol T shows a transposition.

However, when the relation is applied to the practical X-ray tested tissue B, the density $D$ contains in general the measuring errors, so that it is hard to expect that the two-dimensional data $\mu_1$ to $\mu_{2m}$ calculated by the equation (26) show a better result.

Thus, when an answer for making an object function of $$F = \sum_{k=1}^{2m} r_k \qquad (28)$$

minimum is calculated by a mathematical programming under an equation of restrictive condition substantially the same as that of equation (3) by introducing the non-negative correction values $r_1, r_2, r_3 \ldots, r_{2m}$, resulting in that the most suitable two-dimensional data $\mu_{2m}$ may be calculated after a limited times of calculation.

Provided that the suffixes i, j of $l_{i,j}$, $\mu_j$, $r_i$, $p_i$ in equation (3) are 1, 2, 3, ..., 2m, respectively.

In the above example, the two-dimensional data $\mu_1$ to $\mu_{2m}$ for the tomography have been calculated in reference to the object function for making minimum a sum of absolute values of correction values in the equation of restrictive conditions, there is also another method in which the object function of the above described equation (6) is made to be minimum on the basis of the equation of restrictive condition being substantially the same as that of equation (5).

Also provided in this case that the suffixes i, j of $l_{i,j}$, $\mu_j$, $p_i$ in said equation (5) are 1, 2, 3, ..., 2 m respectively.

In reference to this, two-dimensional tomographic data $\mu_1$ to $\mu_{2m}$ of the X-ray tested tissue B are calculated under such conditions as the maximum correction value of the absolute value in the equation of restrictive conditions being substantially the same as equation (5), where suffixes i, j of $l_{i,j}$, $\mu_j$, $p_i$ are 1, 2, 3, ..., 2m respectively is minimum.

Further, it is possible to perform a calculation either by a method for making an object function of $$F = \sum_{k=1}^{2m} r_k^2 \qquad (29)$$

minimum under an equation of restrictive condition of the preferred embodiment corresponding to equation (3) or by a method for making an object function of $$F = r^2 \qquad (30)$$

minimum under an equation of restrictive condition of the preferred embodiment corresponding to equation (5).

Only the first m two-dimensional data $\mu_1$ to $\mu_{2m}$ i.e. only $\mu_1$ to $\mu_m$ are transmitted to the memory device for three-dimensional internal structure G, respectively.

If the $v_2/2$ (=$v_1/2$=m) first projectional densities $d_{(m/2)+1}$ (1) to $d_{(3/2)m}$ (1), the $v_2/2$ (=$v_1/2$=m) of second projectional densities $d_{(m/2)+1}(2)$ to $d_{(3/2)m}(2)$ and the just calculated X-ray absorption coefficient are employed, in order to calculate X-ray absorption coefficients $\mu_{m+1}$ to $\mu_{2m}$ for each of the picture elements (m+1) to 2 m in the second groups of the picture elements $Q_2$, the 2 m X-ray absorption coefficients $\mu_{m+1}$ to $\mu_{3m}$ may be calculated substantially in the same manner as that described above.

Then, the first m two-dimensional data $\mu_{m+1}$ to $\mu_{3m}$, i.e. only $\mu_{m+1}$ to $\mu_{2m}$, are transmitted to the memory G.

X-ray absorption coefficients for each of the picture elements in subsequent orders of 3 to n of the groups of picture elements $Q_3$ to $Q_n$ will be calculated upon repetition of the substantial similar operation, and only the first m two-dimensional data of them will be transmitted in sequence to the memory G.

In turn, the memory device for storing the three-dimensional internal structure G applied is, as described above, constructed such that the signals from the dimensional transformer F for projectional distribution may be stored in order to construct each of the groups of picture elements $Q_1$ to $Q_n$ upon receiving a set of the m signals from the dimensional transformer F for projectional distribution in reference to their relative orders, i.e. to construct the first to n-th of the groups of picture elements from their left side in accordance with their order, and further constructed such that the data for three-dimensional internal structure of the X-ray tested tissue B are calculated.

That is, the two-dimensional data $\mu_t$ (t = 1, 2, 3, ..., mn) transmitted from the dimensional transformer F for projectional distribution in sequence by a set of n of the m are related to the tomography of the X-ray tested tissue B, it is possible to get other X-ray projectional distributions $D_1'$ and $D_2'$ by changing the measuring points with the measuring apparatus E for projectional distribution of X-ray, and thereby the two-dimensional data $\mu_1'$ for other tomographic planes may easily be obtained, so that it becomes possible to store the three-dimensional internal structure of the X-ray tested tissue B by accumulating the two-dimensional data $\mu_t, \mu_t', \mu_t'' \ldots$ for some different tomographic planes. However, in order to construct a complete three-dimensional internal structure, it will be needed to apply an interpolation between each of the tomographic data, so that the present memory G may be applied as a memory device having a calculation function.

Also, in the seventh preferred embodiment similar to that of the first, third and fifth preferred embodiments, a space w between the sampling points is wider than subspace w' between the sampling points, so that a resolving power on the measuring of one-dimensional data is substantially improved, resulting in that an accuracy of reconstructing the tomographic image may also be improved.

It is the same as that of each of the preferred embodiments that to this memory G is connected the display J of computed tomography of arbitrary transverse section via the computed tomography reconstruction apparatus H of arbitrary transverse section, the improving apparatus I for image quality of arbitrary transverse section and D/A converter F'.

In order to reconstruct a tomographic image of the X-ray tested tissue B in reference to the above described arrangement, the first X-ray one-dimensional data $d_k(1)$ in the first projectional distribution $D_1$ produced by X-ray detector C by first projecting X-ray from X-ray source A toward the X-ray tested tissue B in a desired direction $\theta_1$ is calculated by measuring each of the values $d_k(1)$ at the $$\frac{m(n+1)}{2}$$

(=M/2) positions equally spaced apart by a space w from one end of the first X-ray projectional distribution $D_1$ to the other end of the first X-ray projectional distribution $D_1$ by using the measuring apparatus E for the projectional distribution of X-ray, and the second one-dimensional data $d_k(2)$ in the second X-ray projectional distribution $D_2$ produced by X-ray detector C by projecting X-ray from X-ray source A toward the X-ray tested tissue B in another desired direction $\theta_2$ is calculated by measuring each of the values $d_k(2)$ at the $$\frac{m(n+1)}{2}$$

(=M/2) positions equally spaced apart by a space w from one end of the second X-ray projectional distribution $D_2$ to the other end of the second X-ray projectional distribution $D_2$ by using the measuring apparatus E for the projectional distribution of X-ray.

Then, these one-dimensional data $d_k(1)$, $d_k(2)$ are properly converted from their analogue form to digital form, and the X-ray absorption coefficient of each of 2 m groups of the picture elements is calculated by the above described method in the dimensional transformer of X-ray, and only the first X-ray absorption coefficients numbering M are transmitted in sequence to the memory G, thereby each of the X-ray absorption coefficients $\mu_1$ to $\mu_{mn}$ (two-dimensional data) of the mn pieces of picture elements in the pseudo-tomographic plane S is calculated, and these X-ray absorption coefficients are stored in the memory G in the specified order.

Then, these two-dimensional data $\mu_1$ to $\mu_{mn}$ are re-constructed and displayed as a tomographic plane of the X-ray tested tissue B by the display J of computed tomography of arbitrary transverse section via memory G, the computed tomography reconstruction apparatus M of arbitrary transverse section, the improving apparatus I for image quality of arbitrary transverse section and D/A converter F'.

Figure 12:
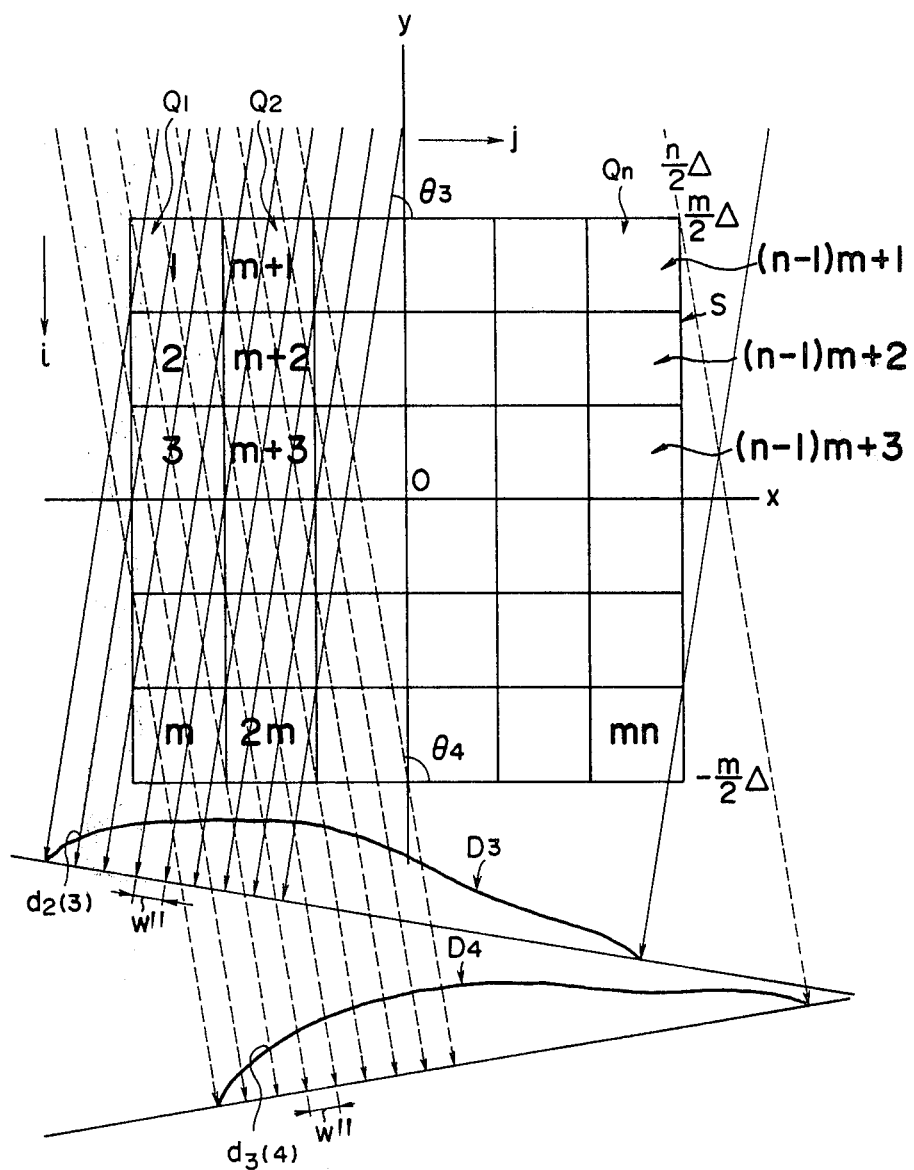
FIG. 12 is a schematic illustration for showing a reconstruction method of X-ray computed tomographic image applied as the eighth preferred embodiment of the present invention.

FIG. 12 is a schematic view of illustrating a reconstruction method of X-ray computed tomographic image of an eighth preferred embodiment of the present invention, wherein the similar numbers in FIG. 12 substantially correspond to those of FIGS. 2 to 11.

In the eighth preferred embodiment of the present invention, similar to that of the second, fourth and sixth preferred embodiments, it is assumed that the pseudo-tomographic plane S applied as a reconstruction plane for the tomographic image of the X-ray tested tissue B (the plane S is constituted by n of the groups of picture elements constituted by the m of picture elements) is constituted by the mn small divided picture elements 1 to mn, as shown in FIG. 12, a center of the plane S is set at an origin of x-y coordinates, and the numbers m and n are, for convenience of description, an even number, respectively, and a size of one picture element is a square of $\Delta \times \Delta$.

Further, it is assumed that the X-ray beams passing through the pseudo-tomographic plane S are, similar to that of the second, fourth and sixth preferred embodiments, projected in parallel by the X-ray beams from two directions fulfilling a relation of $\theta_3 = \tan^{-1} m$ and $\theta_4 = -\tan^{-1} m$.

Further, it is assumed that a diameter of each of the unit X-ray beams is sufficiently small compared with that of each of the picture elements.

The following equation may be provided when the m projectional densities $d_1(3)$ to $d_m(3)$ projected from a direction $\theta_3$ and the m projectional densities $d_1(4)$ to $d_m(4)$ projected from a direction $\theta_4$ are applied in order to calculate the X-ray absorption coefficients $\mu_1$ to $\mu_m$ for each of the picture elements 1 to m in the first groups of picture elements $Q_1$.

$$\mathbb{L}' \boldsymbol{\mu} = \mathbb{D}'_{Q_1} \tag{31}$$

where, $$\mathbb{L}' = \text{(matrix shown)} \tag{32}$$

$$\boldsymbol{\mu} = (\mu_1, \mu_2, \mu_3, \ldots, \mu_{2m})^T$$

$$\mathbb{D}'_{Q_1} = (d_1(3), d_2(3), \ldots, d_m(3), d_1(4), d_2(4), \ldots, d_m(4))^T / \alpha'$$

A value of $\alpha'$ is a length of X-ray beams passing through one picture element in the directions $\theta_3$ and $\theta_4$, and fulfills a relation of $$\frac{m(n+1)}{2}$$

$$\alpha' = \Delta \sqrt{1 + \cot^2 \theta_3} = \Delta \sqrt{1 + \cot^2 \theta_4}$$

and a symbol indicates the transposition.

Solving the equation (31) may enable a calculation for the two-dimensional tomographic data $\mu_1$ to $\mu_{2m}$ of the X-ray tested tissue B substantially in the same manner as that of the seventh preferred embodiment. However, in general, the data have some measuring errors, so that the errors found in case of performing a reconstruction are made to be minimum by applying a mathematical programming in the same manner as that of the first preferred embodiment.

The signals corresponding to the first of m of the X-ray absorption coefficients $\mu_1$ to $\mu_m$ of the X-ray absorption coefficients $\mu_1$ to $\mu_{2m}$ applied as the two-dimensional data thus obtained are transmitted to the memory G.

In sequence, substantially in the same manner as above, the 2 m of X-ray absorption coefficients are calculated for the second to n-th of the groups of picture elements Q₂ to Qₙ, and further only the first m X-ray absorption coefficients are transmitted to the memory G, said X-ray absorption coefficients are stored in the memory G under the specified order.

Then, these two-dimensional data $\mu_t$(t=1, 2, ..., mn) are reconstructed and displayed as a tomography of the X-ray tested tissue B by the display J of computed tomography of arbitrary transverse section from the memory G via computed tomography reconstruction apparatus M of arbitrary transverse section, the improving apparatus I for image quality of arbitrary transverse section and D/A converter F'.

Further, also in case of the eighth preferred embodiment, a resolving power in the measuring of one-dimensional data is substantially improved, resulting in that an accuracy of reconstruction for the tomographic image is also improved substantially in the same manner as that of tfhe second, fourth and sixth preferred embodiments.

As in the case of the seventh and eighth preferred embodiments, it is also possible to construct a partial plane of columns for the tomographic plane of the X-ray tested tissue by combining properly the groups of picture elements constituted by the number of 2 m to m (n−1) pieces of picture elements in place of constructing a partial plane of columns of the tomographic plane of the X-ray tested tissue B by each of the groups of picture elements constituted by the m picture elements.

And further, as in the seventh and eighth preferred embodiments, it is also possible to calculate the X-ray absorption coefficient for each of the picture elements in each of the groups of picture elements starting from the most left side column of the groups of picture elements to the most right side columns of the groups of picture elements in sequence, to calculate the X-ray absorption coefficient for each of the picture elements in each of the groups of picture elements starting from the right side column of the groups of picture elements to the most left side column of the groups of picture elements, to calculate the X-ray absorption coefficient for each of the picture elements in each of the groups of picture elements starting from the most left side column of the groups of the picture elements to the proper number of the groups of picture elements in sequence, and further to calculate the X-ray absorption coefficient for each of the picture elements in each of the groups of picture elements in sequence starting from the most right side column of the groups of picture elements to the left side remaining number of groups of picture elements.

Further, it may be possible to construct the groups of picture elements by the m to m (n−1) pieces of picture elements in order to cause each of said groups of picture elements to form a partial plane of columns of the tomographic plane of the X-ray tested tissue and it may be possible to construct the groups of picture elements by the n to (m−1)n to form a partial plane of rows for the tomographic plane of the X-ray tested tissue.

And even in the case that a tomographic plane is to be constructed on the basis of a partial plane of the rows for the tomography under the X-ray absorption coefficient, it is also possible to calculate the X-ray absorption coefficient for each of the picture elements starting from the upper groups of picture elements to the lower groups of picture elements or in turn from the lower groups of picture elements to the upper groups of picture elements in sequence, to calculate the X-ray absorption coefficient for each of the picture elements in each of the groups of picture elements in sequence starting from the upper-most row of the groups of picture elements to the lower proper number of groups of the picture elements and further to calculate the X-ray absorption coefficient for each of the picture elements in each of the groups of picture elements in sequence starting from the lower-most row of the groups of picture elements to the upper remaining number of the groups of picture elements.

Further, it is possible to construct each of the groups of picture elements by the picture elements numbering fewer than the m and n.

That is, one group of picture elements may be constructed by any number of picture elements if it is fewer than the number of mn. However, it is preferable that the number of picture elements constituting one group of picture elements is defined to the proper number in reference to a capacity of the processing device for use in data processing and to the data processing time.

Further it is also possible to apply one-dimensional data more than the (m/2+1) data produced in reference to the first X-ray projectional distribution and one-dimensional data more than the (m/2+1) data produced in reference to the second X-ray projectional distribution in place of processing in which as one-dimensional data, each of both the m of one-dimensional data produced in reference to the first X-ray projectional distribution and the m one-dimensional data produced in reference to the second X-ray projectional distribution.

What is claimed is:

1. A reconstructions method of a computed tomographic image from a few X-ray projections comprising:
   (a) projecting X-rays from two desired directions toward tested tissue of a body for producing first and second X-ray projectional distributions of X-rays which have passed through the tested tissue;
   (b) measuring the values $d_k$ (k is natural number) of X-ray density on said first X-ray projectional distribution at a plurality of positions spaced apart from each other from one end of said first X-ray projectional distribution toward the other end thereof, and at the same time measuring the values $d_{k'}$ (k' is natural number) of X-ray density on said second X-ray projectional distribution at a plurality of positions spaced apart from each other from one end of said second X-ray projectional distribution toward the other end thereof, where said plurality of positions spaced apart from each other on the first and second X-ray projectional distributions for measurement of the values $d_k$ and $d_{k'}$ of X-ray density are selected according to the following three criteria, (i) that the tomographic plane of the tested tissue of a body to be reconstructed is expressed by a pseudo-tomographic plane which is constituted collectively by mn pieces of picture elements, with m pieces of picture elements in a row and n in a column (both m and n are natural numbers), which are formed by dividing said tomographic plane of the tested tissue of a body into small sections and each of which has a single piece of X-ray density information, and that said pseudo-tomographic plane is placed between an X-ray source and said two X-ray projectional distributions, (ii) that said pseudo-tomographic plane is divided into a first part of a plane constructed collectively by said picture elements with i pieces in a row (i is natural number, i< m) and n picture elements in a column and a second part of a plane constituted collectively by said picture elements with (m-i) pieces in a row and n pieces in a column, (iii) that n rows, each of which is constituted by m pieces of picture elements are numbered in order 1,2, ..., n from the left and that said m pieces of picture elements in each row are numbered respectively 1,2, ..., m; m+1, m+2, ..., 2m; ...; (n−1)m+1, (n−1)m+2, ... mn from the side of said x-ray source toward the side of said two X-ray projectional distributions in order and that at least mn X-ray beams passing through said pseudo-tomographic plane from two directions comprise the first group of X-ray beams passing through respectively the left lower corner of each picture element in said first part of a plane and the second group of X-ray beams passing through respectively the left upper corner of each picture element in said second part of a plane, and said plurality of positions spaced apart from each other on said two X-ray projectional distributions for measurement of the values $d_k$ and $d_{k'}$ of X-ray density correspond to the positions on said two X-ray projectional distributions which have X-ray density information to be obtained by passing said X-ray beams through said pseudo-tomographic plane;

(c) calculating the X-ray absorption coefficient $\mu_t$ (t=1,2,..., mn and t is a natural number) of each of mn pieces of picture elements based on the X-ray density values $d_k$ and $d_{k'}$ measured in step (b) and length of the X-ray beams passing through each of the picture elements;

(d) reconstructing the computed tomographic image of said tested tissue of a body, where the picture elements having respective X-ray absorption coefficients $\mu_1, \mu_2, \ldots, \mu_{mn}$ calculated in step (c) are positioned at the locations of said picture elements numbered 1,2,..., mn of the pseudo-tomographic plane and wherein the complete collection of picture elements located in the m×n array constitute the reconstructed computed tomographic plane of the tested tissue of body.

2. A reconstruction method of a computed tomographic image from a few X-ray projections according to claim 1, wherein neighboring measuring positions on said X-ray projectional distributions are equally spaced apart.

3. A reconstruction method of a computed tomographic image according to claim 1, comprising the step of displaying the m×n array of picture elements in order to display the internal structure of said tested tissue of a body.

4. A reconstruction method of a computed tomographic image from a few X-ray projections comprising:

(a) projecting X-rays from two symmetrical desired directions ($\theta_1, \theta_2$) toward tested tissue of a body for producing first and second X-ray projectional distributions $D_1$, $D_2$ of X-rays which have passed through the tested tissue;

(b) measuring the values $d_k(1)$ (k(1) is a natural number) of X-ray density on said first X-ray projectional distribution $D_1$ at mn/2 (m and n are natural numbers and the product of m and n is an even number) positions spaced apart from each other from one end of said first X-ray projectional distribution $D_1$ toward the other end thereof, and at the same time measuring the values $d_k(2)$ (k(2) is a natural number) of X-ray density on said second X-ray projectional distribution $D_2$ at mn/2 positions spaced apart from each other from one end of said second X-ray projectional distribution $D_2$ toward the other end thereof, where said mn/2 positions spaced apart from each other on the first and second X-ray projectional distributions $D_1$, $D_2$ for measurement of the values $d_k(1)$ and $d_k(2)$ of X-ray density are selected according to the following three criteria, (i) that the tomographic plane of the tested tissue of a body to be reconstructed is expressed by a pseudo-tomographic plane which is constituted collectively by mn pieces of square picture elements, with m pieces of picture elements in a row and n in a column (both m and n are natural numbers), which are formed by dividing said tomographic plane of the tested tissue of a body into small sections and each of which has a single piece of X-ray density information, and that said pseudo-tomographic plane is placed between an X-ray source and said two X-ray projectional distributions $D_1$, $D_2$ (ii) that said pseudo-tomographic plane is divided into a first part of a plane and a second part of a plane which are constituted collectively by said picture elements with m/2 pieces in a row and n pieces in a column, respectively, (iii) that n rows, each of which is constituted by m pieces of picture elements are numbered in order 1, 2, ..., n from the left and that said m pieces of picture elements in each row are numbered respectively 1, 2, ..., m; m+1, m+2, ..., 2m ...; (n−1)m+1, (n−1)m+2, ... mn from the side of said X-ray source toward the side of said two X-ray projectional distributions $D_1$, $D_2$ in order and that mn X-ray beams passing through said pseudo-tomographic plane from two directions comprise the first group of X-ray beams which is constituted by mn/2 X-ray beams in a direction of $\theta_1$, passing through respectively the left lower corner of each picture element in said first part of a plane and the second group of X-ray beams which is constituted by mn/2 X-ray beams in a direction of $\theta_2$ passing through respectively the left upper corner of each picture element in said second part of a plane, and said mn/2 positions spaced apart from each other on said two X-ray projectional distributions $D_1$, $D_2$ for measurement of the values $d_k(1)$ and $d_k(2)$ of X-ray density correspond to the positions on said two X-ray projectional distributions $D_1$, $D_2$ which have X-ray density information to be obtained by passing said X-ray beams through said pseudo-tomographic plane, $\theta_1$ indicates the angle at which each X-ray beam of the first group crosses with the base of each picture element in the first part of a plane, and $\theta_1 = \tan^{-1}(m/2)$, and $\theta_2$ indicates the angle at which each X-ray beam of the second group crosses with the base of each picture element in the second part of a plane, and $\theta_2 = -\tan^{-1}(m/2)$;

(c) calculating X-ray absorption coefficient $\mu_t$ (t=1, 2, ..., mn and t is a natural number) of each of mn pieces of picture elements in accordance with the following equations based on the X-ray density values $d_k(1)$ and $d_k(2)$ measured in step (b) and length of the X-ray beams passing through each of the picture elements, $L\mu = D$, where $L =$

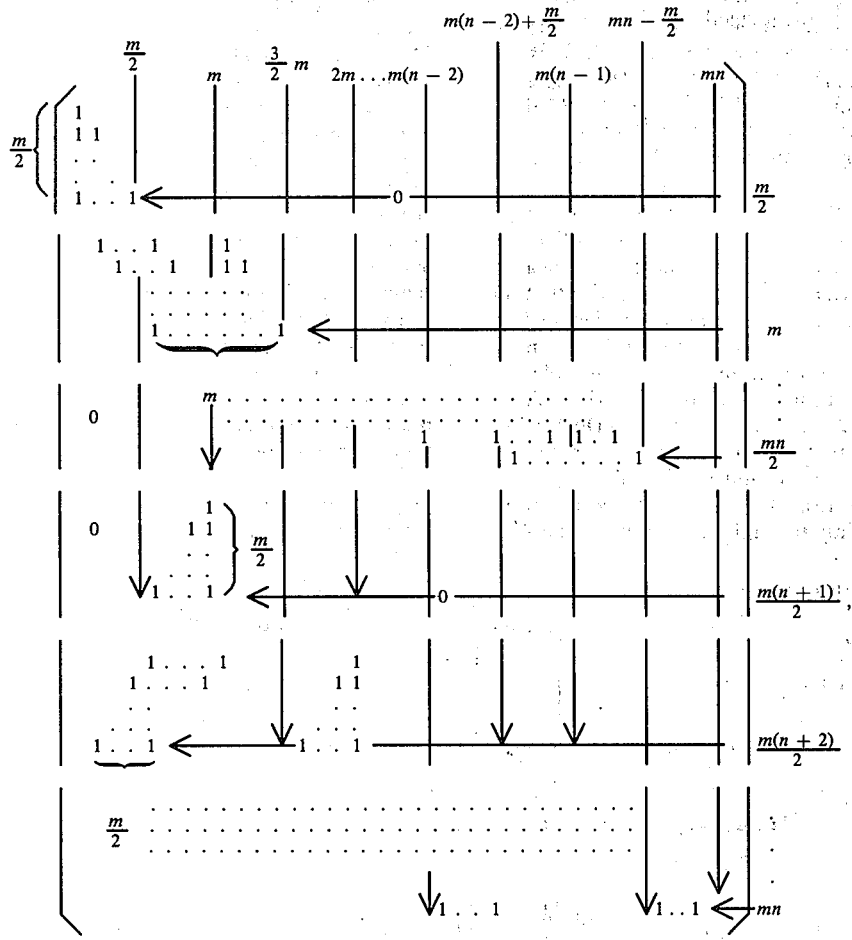

and where $\mu = (\mu_1, \mu_2, \mu_3, \ldots, \mu_{mn})^T$ $D = \left( d_1(1), d_2(1), \ldots, d_{\frac{mn}{2}}(1), d_1(2), d_2(2), \ldots, d_{\frac{mn}{2}}(2) \right)^T /\alpha$ L is a square matrix of dimensions $mn \times mn$, T indicates a matrix transpose and $\alpha$ is a length of an X-ray beam passing through each picture element from directions of $\theta_1$ and $\theta_2$;

(d) reconstructing the computed tomographic image of said tested tissue of a body, where the picture elements having respective X-ray absorption coefficients $\mu_1, \mu_2, \ldots, \mu_{mn}$ calculates in step (c) are positioned at the locations of said picture elements numbered $1, 2, \ldots, mn$ of the pseudo-tomographic plane and wherein the complete collection of picture elements located in the m=n array constitute the reconstructed computed tomographic plane of the tested tissue of a body.

5. A reconstruction method of a computed tomographic image from a few X-ray projections comprising:

(a) projecting X-rays from two symmetrical desired directions ($\theta_3, \theta_4$) toward tested tissue of a body for producing first and second X-ray projectional distributions $D_3$, $D_4$ of X-rays which have passed through the tested tissue;

(b) measuring the values $d_k(3)$ (k(3) is a natural number) of X-ray density on said first X-ray projectional distribution $D_3$ at mn/2 (m and n are natural numbers and the product of m and n is an even number) positions spaced apart from each other from one end of said first X-ray projectional distribution $D_3$ toward the other end thereof, and at the same time measuring the values $d_k(4)$ (k(4) is a natural number) of X-ray density on said second X-ray projectional distribution $D_4$ at mn/2 positions spaced apart from each other from one end of said second X-ray projectional distribution $D_4$ toward the other end thereof, where said mn/2 positions spaced apart from each other on the first and second X-ray projectional distributions $D_3$, $D_4$ for measurement of the valves $d_k(3)$ and $d_k(4)$ of X-ray density are selected according to the following three criteria, (i) that the tomographic plane of the tested tissue of a body to be reconstructed is expressed by a pseudo-tomographic plane which is constituted collectively by mn pieces of square picture elements, with m pieces of picture elements in a row and n in a column (both m and n are natural numbers), which are formed by dividing said tomographic plane of the tested tissue of a body into small sections and each of which has a single piece of X-ray density information, and that said pseudo-tomographic plane is placed between an X-ray source and said two X-ray projectional distributions $D_3$, $D_4$, (ii) that said pseudo-tomographic plane is divided into a first part of a plane and a second part of a plane which are constituted collectively by said picture elements with m/2 pieces in a row and n pieces in a column respectively, (iii) that n rows, each of which is constituted by m pieces of picture elements are numbered in order 1, 2, ..., n from the left and that said m pieces of picture elements in each row are numbered respectively 1, 2, ... m; m+1, m+2, ..., 2 m; ...; (n−1)m+1, (n−1)m+2, ... mn from the side of said X-ray source toward the side of said two X-ray projectional distributions $D_3$, $D_4$ in order and that mn X-ray beams passing through said pseudo-tomographic plane from two directions comprise the first group of X-ray beams which is constituted by mn/2 X-ray beams in a direction of $\theta_3$, passing through respectively the left lower corner of each picture element in said first part of a plane and the second group of X-ray beams which is constituted by mn/2 X-ray beams in a direction of $\theta_4$ passing through respectively the left upper corner of each picture element in said second part of a plane, and said mn/2 positions spaced apart from each other on said two X-ray projectional distributions $D_3$, $D_4$ for measurement of the values $d_k(3)$ and $d_k(4)$ of X-ray density correspond to the positions on said two X-ray projectional distributions which have X-ray density information to be obtained by passing said X-ray beams through said pseudo-tomographic plane, $\theta_3$ indicates the angle at which each X-ray beam of the first group crosses with the base of each picture element in the first part of a plane, and $\theta_3 = \tan^{-1} m$ and $\theta_4$ indicates the angle at which each X-ray beam of the second group crosses with the base of each picture element in the second part of a plane, and $\theta_4 = -\tan^{-1} m$;

(c) calculating X-ray absorption coefficient $\mu_t(t=1, 2, ..., mn$ and t is a natural number) of each of mn pieces of picture elements in accordance with the following equations based of the X-ray density values $d_k(3)$ and $d_k(4)$ measured in step (b) and length of the X-ray beams passing through each of the picture elements, $L\mu = D$, where $L =$

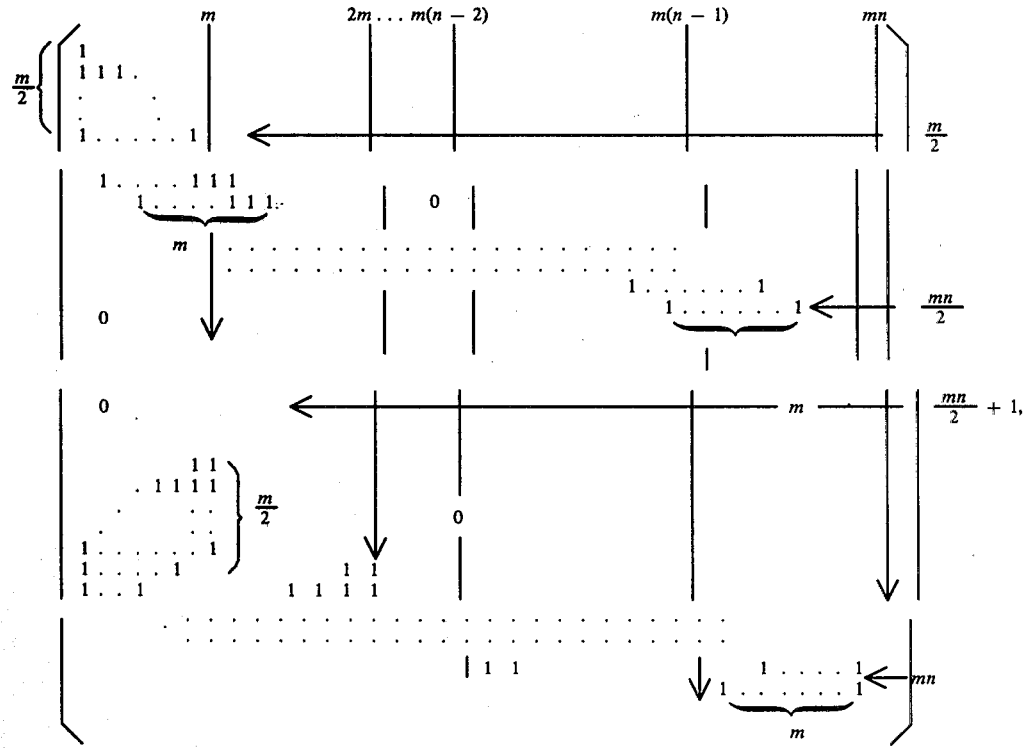

and where
$\mu = (\mu_1, \mu_2, \mu_3, \ldots, \mu_{mn})^T$ $$D = \left( d_1(3), d_2(3), \ldots, d\frac{mn}{2}(3), d_1(4), d_2(4), \ldots, d\frac{mn}{2}(4) \right)^T / a$$

L is a square matrix of dimension mn × mn, T indicates a matrix transpose and $a$ is a length of an X-ray beam passing through each picture element from directions of $\theta_3$, and $\theta_4$;

(d) reconstructing the computed tomographic image of said tested tissue of a body, where the picture elements having respective X-ray absorption coefficients $\mu_1, \mu_2, \ldots, \mu_{mn}$ calculated in step (c) are positioned at the locations of said picture elements numbered $1, 2, \ldots, mn$ of the pseudo-tomographic plane and wherein the complete collection of picture elements located in the m×n array constitute the reconstructed computed tomographic plane of the tested tissue of a body.

6. A reconstruction method of a computed tomographic image from a few X-ray projections comprising:

(a) projecting X-rays from two symmetrical desired directions ($\theta_1, \theta_2$) toward tested tissue of a body for producing first and second X-ray projectional distributions $D_1, D_2$ of X-rays which have passed through the tested tissue;

(b) measuring the values $d_k(1)$ (k(1) is a natural number, $k(1)=1, 2, \ldots, m/2$) of X-ray density on said first X-ray projectional distribution $D_1$ at m/2 (m is a natural number) positions spaced apart from each other from one end of said first X-ray projectional distribution $D_1$ toward the other end thereof, and at the same time measuring the values $d_k(2)$ (k(2) is a natural number, $k(2)=1, 2, \ldots, m/2$) of X-ray density on said second X-ray projectional distribution $D_2$ at m/2 positions spaced apart from each other from one end of said second X-ray projectional distribution $D_2$ toward the other end thereof, where said m/2 positions spaced apart from each other on the first and second X-ray projectional distributions $D_1, D_2$ for measurement of the values $d_k(1)$ and $d_k(2)$ of X-ray density are selected according to the following three criteria, (i) that the tomographic plane of the tested tissue of a body to be reconstructed is expressed by a pseudo-tomographic plane which is constituted collectively by mn pieces of square picture elements, with m pieces of picture elements in a row and n in a column (both m and n are natural numbers), which are formed by dividing said tomographic plane of the tested tissue of a body into small sections and each of which has a single piece of X-ray density information, and that said pseudo-tomographic plane is placed between an X-ray source and said two X-ray projectional distributions $D_1, D_2$, (ii) that said pseudo-tomographic plane is divided into a first part of a plane and a second part of a plane which are constituted collectively by said picture elements with m/2 pieces in a row and n pieces in a column, respectively, (iii) that n rows, each of which is constituted by m pieces of picture elements are numbered in order $1, 2, \ldots, n$ from the left and that said m pieces of picture elements in each row are numbered respectively $1, 2, \ldots, m$; $m+1, m+2, \ldots, 2m; \ldots; (n-1)m+1, (n-1)m+2, \ldots mn$ from the side of said X-ray source toward the side of said two X-ray projectional distributions $D_1, D_2$ in order and that mn X-ray beams passing through said pseudo-tomographic plane from two directions comprise the first group of X-ray beams which is constituted by mn/2 X-ray beams in a direction of $\theta_1$, passing through respectively the left lower corner of each picture element in said first part of a plane and the second group of X-ray beams which is constituted by mn/2 X-ray beams in a direction of $\theta_2$ passing through respectively the left upper corner of each picture element in said second part of a plane, and said m/2 positions spaced apart from each other on said two X-ray projectional distributions $D_1, D_2$ for measurement of the values $d_k(1)$ and $d_k(2)$ of X-ray density correspond to the positions on said two X-ray projectional distributions $D_1, D_2$ which have X-ray density information to be obtained by passing first m/2 X-ray beams through said pseudo-tomographic plane based on the abovementioned criteria, $\theta_1$ indicates the angle at whih each X-ray beam of the first group crosses with the base of each picture element in the first part of a plane, and $\theta_1 = \tan^{-1} m/2$, and $\theta_2$ indicates the angle at which each X-ray beam of the second group crosses with the base of each picture element in the second part of a plane, and $\theta_2 = -\tan^{-1} m/2$;

(c) calculating X-ray absorption coefficient $\mu_t$ (t is a natural number, $t=1, 2, \ldots, m/2$) of each of m/2 pieces of picture elements in the first part of a plane in accordance with the following equations based on the values $d_k(1)$ of X-ray density measured in step (b) and length of the X-ray beams in the direction of $\theta_1$ passing through each picture element in the first part of a plane, and at the same time calculating X-ray absorption coefficient $\mu_t$ (t is a natural number, $t=m/2+1, m/2+2, \ldots, m$) of each of m/2 pieces of picture elements in the second part of a plane in accordance with the following equations based on the values $d_k(2)$ of X-ray density measured in step (b) and length of the X-ray beams in the direction of $\theta_2$ passing through each picture element in the second part of plane, $$L\mu = D,$$

where $$L = \begin{pmatrix} \begin{matrix} 1 \\ 1\;1 \\ 1\;1\;1 \\ \cdots \\ \cdots \\ 1 \cdots\cdots 1 \end{matrix} & 0 \\ 0 & \begin{matrix} 1 \\ 1\;1 \\ 1\;1\;1 \\ \cdots \\ \cdots \\ 1 \cdots\cdots 1 \end{matrix} \end{pmatrix}$$

and where $$\mu = (\mu_1, \mu_2, \mu_3, \ldots, \mu_m)^T$$

$$D = \left( d_1(1), d_2(1), \ldots, d_{\frac{m}{2}}(1), \; d_1(2), d_2(2), \ldots, d_{\frac{m}{2}}(2) \right)^T / \alpha$$

L is a square matrix of dimension m×m, T indicates a matrix transpose and $\alpha$ is a length of an X-ray beam passing through each picture element from directions of $\theta_1$, $\theta_2$;

(d) memorizing X-ray absorption coefficients $\mu_1 \sim \mu_m$ calculated in step (c);

(e) measuring each of the values $d_k(1)$ (k(1) is a natural number, k(1)=m/2+1, m/2+2, . . . ,m) of X-ray density on said first X-ray projectional distribution $D_1$ at the positions numbering m/2 spaced apart from each other from the (m/2+1) position from one end of said first X-ray projectional distribution $D_1$ toward the other end thereof, and at the same time measuring each of the values $d_k(2)$ (k(2) is a natural number, k(2)=m/2+1, m/2+2,..., m) of X-ray density on said second X-ray projectional distribution $D_2$ at the positions number m/2 spaced apart from each other from the (m/2+1) position from one end of said second X-ray projectional distribution $D_2$ toward the other end thereof, where said positions numbering m/2 spaced apart from each other on said first X-ray projectional distribution $D_1$ for measurement of the values $d_k(1)$ (k(1)=m/2+1, m/2+2, . . . ,m) of X-ray density are selected such that said positions number m/2 spaced apart from each other on said first X-ray projectional distribution $D_1$ for measurement of the values $d_k(1)$ (k(1)=m/2+1, m/2+2, . . . , m) of X-ray density correspond to the positions on said first X-ray projectional distribution $D_1$ which have X-ray density information obtained as a result of the m/2 X-ray beams passing through the left lower corner of each of the respective picture elements number (m+1) to 3m/2 passing through said first part of a plane based on the three criteria in step (b), and said positions numbering m/2 spaced apart from each other on said second X-ray projectional distribution $D_2$ for measurement of the values $d_k(2)$ (k(2)=m/2+1, m/2+2,..., m) of X-ray density are selected such that said positions number m/2 spaced apart from each other on said second X-ray projectional distribution $D_2$ for measurement of the values $d_k(2)$ (k(2)=m/2+1, m/2, ..., m) of X-ray density correspond to the positions on said second X-ray projectional distribution $D_2$ which have X-ray density information obtained as a result of the m/2 X-ray beams passing through the left upper corner of each of the respective picture elements numbered $$\left(\frac{3m}{2} + 1\right)$$

to 2m passing through said second part of a plane based on the three criteria in step (b);

(f) calculating the X-ray absorption coefficients $\mu_{m+1} \sim \mu_{3m/2}$ based on the X-ray absorption coefficients $\mu_1 \sim \mu_m$ calculated in step (c), the values $d_k(1)$ (k(1)=m/2+1, m/2+2, . . . , m) of X-ray density measured in step (e), and the length of X-ray beams passing through the picture elements numbered (m+1) to 3m/2 from the $\theta_1$ direction, and at the same time, calculating the X-ray absorption coefficients $\mu_{3m/2+1} \sim \mu_{2m}$ based on the X-ray absorption coefficients $\mu_1 \sim \mu_m$ calculated in step (c), the values $d_k(2)$ (k(2)=m/2+1, m/2+2, . . . , m) of X-ray density measured in step (e), and the length of X-ray beams passing through the picture elements numbered (3m/2+1) to 2m from the $\theta_2$ direction, where the method of calculating the X-ray absorption coefficients $\mu_{m+1} \sim \mu_{2m}$ is the same as in step (c) and the X-ray absorption coefficients $\mu_1 \sim \mu_m$ calculated in step (c) are selectively used;

(g) memorizing the X-ray absorption coefficients $\mu_{m+1} \sim \mu_{2m}$ calculated in step (f);

(h) calculating the X-ray absorption coefficients $\mu_{2m+1} \sim \mu_{3m}$, $\mu_{3m+1} \sim \mu_{4m}$, . . ., $\mu_{(n-1)m+1} \sim \mu_{mn}$ repeating substantially the same steps as steps (e), (f) and (g) and memorizing them;

(i) reconstructing the computed tomographic image of said tested tissue of a body based on the X-ray absorption coefficients $\mu_1 \sim \mu_m$, $\mu_{m+1} \sim \mu_{2m}$, . . . , $\mu_{(n-1)m+1} \sim \mu_{mn}$ memorized in steps (d), (g) and (h), where the picture elements having respective X-ray absorption coefficcients $\mu_1$, $\mu_2$, . . . , $\mu_{mn}$ calculated in step (c), (f) and (h) are positioned at the locations of said picture elements number 1, 2, . . . , mn of the pseudo-tomographic plane and wherein the complete collection of picture elements located in the m×n array constitute the reconstructed computed tomographic plane of the tested tissue of body.

7. A reconstruction method of a computed tomographic image from a few X-ray projections comprising:

(a) projecting X-rays from two symmetrical desired directions ($\theta_3$, $\theta_4$) toward tested tissue of a body for producing first and second X-ray projectional distributions $D_3$, $D_4$ of X-rays which have passed through the tested tissue;

(b) measuring the values $d_k(3)$ (k(3) is a natural number, k(3)=1, 2, . . . , m/2) of X-ray density on said first X-ray projectional distribution $Dl_3$ at m/2 (m is a natural number) positions spaced apart from each other from one end of said first X-ray projectional distribution $D_3$ toward the other end thereof, and at the same time measuring the values $d_k(4)$ (k(4) is a natural number, k(4)=1, 2, . . . , m/2) of X-ray density on said second X-ray projectional distribution $D_4$ at m/2 positions spaced apart from each other from one end of said second X-ray projectional distribution $D_4$ toward the other end thereof, where said m/2 positions spaced apart from each other on the first and second X-ray projectional distributions $D_3$, $D_4$ for measurement of the values $d_k(3)$ and $d_k(4)$ of X-ray density are selected according to the following three criteria, (i) that the tomographic plane of the tested tissue of a body to be reconstructed is expressed by a pseudo-tomographic plane which is constituted collectively by mn pieces of square picture elements, with m pieces of picture elements in a row and n in a column (both m and n are natural numbers), which are formed by dividing said tomographic plane of the tested tissue of a body into small sections and each of which has a single piece of X-ray density information, and that said pseudo-tomographic plane is placed between an X-ray source and said two X-ray projectional distributions $D_3$, $D_4$, (ii) that said pseudo-tomographic plane is divided into a first part of a plane and a second part of a plane which are constituted collectively by said picture elements with m/2 pieces in a row and n pieces in a column, respectively, (iii) that n rows, each of which is constituted by m pieces of picture elements are numbered in order 1, 2, ..., n from the left and that said m pieces of picture elements in each row are numbered respectively 1, 2, ..., m; m+1, m+2, ..., 2 m; ...; (n−1)m+1, (n−1)m+2, ... mn from the side of said X-ray source toward the side of said two X-ray projectional distributions $D_3$, $D_4$ in order that mn X-ray beams passing through said pseudo-tomographic plane from two directions comprise the first group of X-ray beams which is constituted by mn/2 X-ray beams in a direction of $\theta_3$, passing through respectively the left lower corner of each picture element in said first part of a plane and the second group of X-ray beams which is constituted by mn/2 X-ray beams in a direction of $\theta_4$ passing through respectively the left upper corner of each picture element in said second part of a plane, and said m/2 positions spaced apart from each other on said two X-ray projectional distributions $D_3$, $D_4$ for measurement of the values $d_k(3)$ and $d_k(4)$ of X-ray density correspond to the positions on said two X-ray projectional distributions $D_3$, $D_4$ which have X-ray density information to be obtained by passing first m/2 X-ray beams through said pseudo-tomographic plane based on the above-mentioned criteria, $\theta_3$ indicates the angle at which each X-ray beam of the first group crosses with the base of each picture element in the first part of a plane, and $\theta_3 = \tan^{-1} m$ and $\theta_4$ indicates the angle at which each X-ray beam of the second group crosses with the base of each picture element in the second part of a plane, and $\theta_4 = -\tan^{-1} m$;

(c) calculating X-ray absorption coefficient $\mu_t$ (t is a natural number, t=1, 2, ..., m/2) of each of m/2 pieces of picture elements in the first part of a plane in accordance with the following equations based on the values $d_k(3)$ of X-ray density measured in step (b) and length of the X-ray beam in the direction of $\theta_3$ passing through each picture element in the first part of a plane, and at the same time calculating X-ray absorption coefficient $\mu_t$ (t is a natural number, t=m/2+1, m/2+2, ..., m) of each of m/2 pieces of picture elements in the second part of a plane in accordance with the following equations based on the values $d_k(4)$ of X-ray density measured in step (b) and length of the X-ray beams in the direction of $\theta_4$ passing through each picture element in the second part of plane, $$L\mu = D,$$
where $$L = \begin{pmatrix} \begin{pmatrix} 1 \\ 1\ 1\ 1 \\ 1\ 1\ 1\ 1\ 1 \\ \vdots \\ 1 \cdots\cdots\cdots 1 \end{pmatrix}_{m/2} \quad 0 \\ \\ 0 \quad \begin{pmatrix} 1 \cdots\cdots\cdots 1 \\ \vdots \\ 1\ 1\ 1\ 1\ 1 \\ 1\ 1\ 1\ 1 \\ 1\ 1 \\ 1 \end{pmatrix}_{m/2} \end{pmatrix} \underbrace{\phantom{xxxxxxxx}}_{m}$$

and where $$\mu = (\mu_1, \mu_2, \mu_3, \ldots, \mu_m)^T$$

$$D = \left( d_1(3), d_2(3), \ldots, d_{\frac{m}{2}}(3), \right.$$

$$\left. d_1(4), d_2(4), \ldots, d_{\frac{m}{2}}(4) \right)^T / \alpha$$

L is a square matrix of dimension m×m, T indicates a matrix transpose and $\alpha$ is a length of an X-ray beam passing through each picture element from directions of $\theta_3$, $\theta_4$;

(d) memorizing X-ray absorption coefficients $\mu_1 \sim \mu_m$ calculated in step (c);

(e) measuring each of the values $d_k(3)$ (k(3) is a natural number, k(3)=m/2+1, m/2+2, ..., m) of X-ray density on said first X-ray projectional distribution $d_3$ at the positions numbering m/2 spaced apart from each other from the (m/2+1)position from one end of said first X-ray projectional distribution $D_3$ toward the other end thereof, and at the same time measuring each of the values $d_k(4)$ (k(4) is a natural number, k(4)=m/2+1, m/2+2, ..., m) of X-ray density on said second X-ray projectional distribution $D_4$ at the positions numbering m/2 spaced apart from each other from the (m/2+1) position from $D_4$ toward the other end thereof, where said positions numbering m/2 spaced apart from each other on said first X-ray projectional distribution $D_3$ for measurement of the values $d_k(3)$ (k(3)=m/2+1, m/2+2, ..., m) of X-ray density are selected such that said positions numbering m/2 spaced apart from each other on said first X-ray projectional distribution $D_3$ for measurement of the values $d_k(3)$ (k(3)=m/2+1, m/2+2, ..., m) of X-ray density correspond to the positions on said first X-ray projectional distribution $D_3$ which have X-ray density information obtained as a result of the m/2 X-ray beams passing through the left lower corner of each of the respective picture elements numbered (m+1) to 3 m/2 passing through said first part of a plane based on the three criteria in step (b), and said positions numbering m/2 spaced apart from each other on said second X-ray projectional distribution $D_4$ for measurement of the values $d_k(4)$ ($k(4)=m/2+1$, $m/2+2$, ..., m) of X-ray density are selected such that said positions numbering m/2 spaced apart from each other on said second X-ray projectional distribution $D_4$ for measurement of the values $d_k(4)$ ($k(4)=m/2+1$, $m/2+2$,..., m) of X-ray density correspond to the positions on said second X-ray projectional distribution $D_2$ which have X-ray density information obtained as a result of the m/2 X-ray beams passing through the left upper corner of each of the respective picture elements numbered ($3m/2+1$) to 2 m passing through said second part of a plane based on the three criteria in step (b);

(f) calculating the X-ray absorption coefficients $\mu_{m+1} \sim \mu_{3m/2}$ based on the X-ray absorption coefficients $\mu_1 \sim \mu_m$ calculated in step (c), the valuess $d_k(3)$ ($k(3)=m/2+1$, $m/2+2$, ..., m) of X-ray density measured in step (e), and the length of X-ray beams passing through the picture elements numbered ($m+1$) to $3m/2$ from the $\theta_3$ direction, and at the same time, calculating the X-ray absorption coefficients $\mu_{3m/2+1}$18 $\mu_{2m}$ based on the X-ray absorption coefficients $\mu_1 \sim \mu_m$ calculated in step (c), the values $d_k(4)$ ($k(4)=m/2+1$, $m/2+2$, ..., m) of X-ray density measured in step (e), and the length of X-ray beams passing through the picture elements numbered ($3m/2+1$) to 2 m from the $\theta_4$ direction, where the method of calculating the X-ray absorption coefficients $\mu_{m+1} \sim \mu_{2m}$ is the same as in step (c) and the X-ray absorption coefficients $\mu_1 \sim \mu_m$ calculated in step (c) are selectively used;

(g) memorizing the X-ray absorption coefficients $\mu_{m+1} \sim \mu_{2m}$ calculated in step (f);

(h) calculating the X-ray absorption coefficient $\mu_{2m+1} \sim \mu_{3m}$, $\mu_{3m+1} \sim \mu_{4m}$, . . . , $\mu_{(n-1)m+1} \sim \mu_{mn}$ repeating substantially the same steps as steps (e), (f) and (g) and memorizing them;

(i) reconstructing the computed tomographic image of said tested tissue of a body based on the X-ray absorption coefficients $\mu_1 \sim \mu_m$, $\mu_{m+1} \sim \mu_{2m}$, . . . , $\mu_{(n-1)m+1} \sim mn$ memorized in steps (d), (g) and (h), where the picture elements having respective X-ray absorption coefficients $\mu_1$, $\mu_2$, . . . , $\mu_{mn}$ calculated in step (c), (f) and (h) are positioned at the locations of said picture elements numbered 1, 2, . . . , mn of the pseudo-tomographic plane and wherein the complete collection of picture elements located in the m×n array constitute the reconstructed computed tomographic plane of the tested tissue of a body.

8. A reconstruction method of a computed tomographic image from a fiew X-ray projections comprising:

(a) projecting X-rays from two symmetrical desired directions ($\theta_1$, $\theta_2$) toward tested tissue of a body for producing first and second X-ray projectional distributions $D_1$, $D_2$ of X-rays which have passed through the tested tissue;

(b) measuring the values $d_k(1)$ ($k(1)$ is a natural number) of X-ray density on said first X-ray projectional distribution $D_1$ at at least $$\frac{m(n+1)}{2}$$

(m and n are natural numbers and the product of m and n is an even number) positions spaced apart from each other from one end of said first X-ray projectional distribution $D_1$ toward the other end thereof, and at the same time measuring the values $d_k(2)$ ($k(2)$ is a natural number) of X-ray density on said second X-ray projectional distribution $D_2$ at at least $$\frac{m(n+1)}{2}$$

positions spaced apart from each other from one end of said second X-ray projectional distribution $D_2$ toward the other end thereof, where each said $$\frac{m(n+1)}{2}$$

positions spaced apart from each other on the first and second X-ray projectional distributions $D_1$, $D_2$ for measurement of the values $d_k(1)$ and $d_k(2)$ are selected according to the three criteria, (i) that the tomographic plane of the tested tissue of a body to be reconstructed is expressed by a pseudo-tomographic plane which is constituted collectively by mn pieces of square picture elements, with m pieces of picture elements in a row and n in a column (both m and n are natural numbers), which are formed by dividing said tomographic plane of the tested tissue of body into small sections and each of which has a single piece of X-ray density information, and that said pseudo-tomographic plane is placed between an X-ray source and said two X-ray projectional distributions $D_1$, $D_2$, (ii) that said pseudo-tomographic plane is divided into a first part of a plane and a second part of a plane which are constituted collectively by said picture elements with m/2 pieces in a row and n pieces in a column, respectively, (iii) that n rows, each of which is constituted by m pieces of picture elements are numbered in order 1, 2, ..., n from the left and that said m pieces of picture elements in each row are numbered respectively 1, 2, ..., m; m+1, m+2, .. ., 2 m; ...; (n−1)m+1, (n−1) m+2, ... mn from the side of said X-ray source toward the side of said two X-ray projectional distributions $D_1$, $D_2$ in order and that at least m(n+1) X-ray beams passing through said pseudo-tomographic plane from two directions ($\theta_1$, $\theta_2$) are constituted by the first group of X-ray beams in a direction of $\theta_1$ and the second group of X-ray beams in a direction of $\theta_2$, wherein the first group of X-ray beams comprise mn/2 X-ray beams, each of which passes through the left lower corner of one of the picture elements in the first part of the plane and at least m/2 X-ray beams passing through the picture elements in the n-th column in the first part of the plane, and the second group of X-ray beams comprises mn/2 X-ray beams, each of which passes through the left upper part of one of the picture elements in the second part of the plane and at least m/2 X-ray beams passing through the picture elements in the n-th column in the second part of the plane, said $$\frac{m(n+1)}{2}$$

positions spaced apart from each other on said two X-ray projectional distributions $D_1$, $D_2$ for measurement of the values $d_k(1)$ and $d_k(2)$ of X-ray density correspond to the positions on said two X-ray projectional distributions $D_1$, $D_2$ which have X-ray density information to be obtained by passing said X-ray beams through said pseudo-tomographic plane, $\theta_1$ indicates the angle at which each X-ray beam of the first group crosses with the base of each picture element in the first part of a plane, and $\theta_1 = \tan^{-1} m/2$, and $\theta_2$ indicates the angle at which each X-ray beam of the second group crosses with the base of each picture element in the second part of a plane, and $\theta_2 = -\tan^{-1} m/2$;

(c) calculating X-ray absorption coefficient $\mu_t$ ($t=1, 2, \ldots,$ mn and t is a natural number) of each of mn pieces of picture elements in accordance with the following equations based on the X-ray density values $d_k(1)$ and $d_k(2)$ measured in step (b) and length of the X-ray beams passing through each of the picture elements,

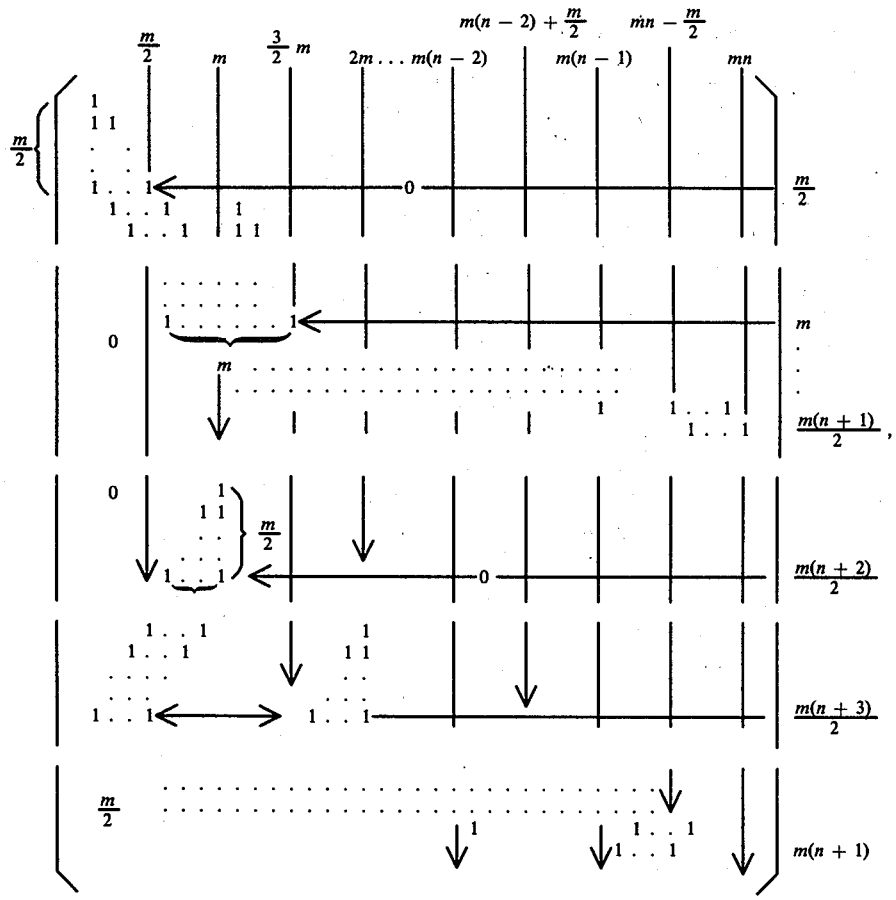

and where
$$\mu = (\mu_1, \mu_2, \mu_3, \ldots, \mu_{mn})^T$$

$$D = \left( d_1(1), d_2(1), \ldots, d\frac{m(n+1)}{2}(1), d_1(2), d_2(2), \ldots, d\frac{m(n+1)}{2}(2) \right)^T / \alpha$$

L is a band matrix of dimension $m(n+1) \times mn$, T indicates a matrix transpose and $\alpha$ is a length of an X-ray beam passing through each picture element from directions of $\theta_1$, and $\theta_2$;

(d) reconstructing the computed tomographic image of said tested tissue of a body where the picture elements having respective X-ray absorption coefficients $\mu_1, \mu_2, \ldots, \mu_{mn}$ calculated in step (c) are positioned at the locations of said picture elements numbered $1, 2, \ldots,$ mn of the pseudo-tomographic plane and wherein the completed collection of picture elements located in the $m \times n$ array constitute the reconstructed computed tomographic plane of the tested tissue of a body.

9. A reconstruction method of a computed tomographic image from a few X-ray projections comprising:

(a) projecting X-rays from two symmetrical desired directions ($\theta_3, \theta_4$) toward tissue of a body for producing first and second X-ray projectional distributions $D_3, D_4$ of X-rays which have passed through the tested tissue;

(b) measuring the values $d_k(3)$ (k(3) is a natural number) of X-ray density on said first X-ray projectional distribution $D_3$ at at least $$\frac{m(n+1)}{2}$$

(m and n are natural numbers and the product of m and n is an even number) positions spaced apart from each other from one end of said first X-ray projectional distribution $D_1$ toward the other end thereof, and at the same time measuring the values $d_k(4)$ ($k(4)$ is a natural number) of X-ray density on said second X-ray projectional distribution $D_4$ at at least $$\frac{m(n+1)}{2}$$

positions spaced apart from each other from one end of said second X-ray projectional distribution $D_4$ toward the other end thereof, where each said $$\frac{m(n+1)}{2}$$

positions spaced apart from each other on the first and second X-ray projectional distributions $d_3$, $D_4$ for measurement of the values $d_k(3)$ and $d_k(4)$ of X-ray density are selected according to the following three criteria, (i) that the tomographic plane of the tested tissue of a body to be reconstructed is expressed by a pseudo-tomographic plane which is constituted collectively by mn pieces of square picture elements, with m pieces of picture elements in a row and n in a column (both m and n are natural numbers), which are formed by dividing said tomographic plane of the tested tissue of a body into small sections and each of which has a single piece of X-ray density information, and that said pseudo-tomographic plane is placed between an X-ray source and said two X-ray projectional distributions $D_3$, $D_4$, (ii) that said pseudo-tomographic plane is divided into a first part of a plane and a second part of a plane which are constituted collectively by said picture elements with m/2 pieces in a row and n pieces in a column, respectively, (iii) that n rows, each of which is constituted by m pieces of picture elements are numbered in order 1, 2, ..., n from the left and that said m pieces of picture elements in each row are numbered respectively 1, 2, ..., m; m+1, m+2, ..., 2 m; ...; (n−b 1)m−1, (n−1)m+2, ... mn from the side of said X-ray source toward the side of said two X-ray projectional distributions $D_3$, $D_4$ in order and that at least m(n+1) X-ray beams passing through said pseudo-tomographic plane from two directions ($\theta_3$, $\theta_4$) are constituted by the first group of X-ray beams in a direction of $\theta_3$ and the second group of X-ray beams in a direction of $\theta_4$, wherein the first group of X-ray beams comprises mn/2 X-ray beams, each of which passes through the left lower corner of one of the picture elements in the first part of a plane and at least m/2 X-ray beams passing through the picture elements in the n-th column in the first part of a plane, and the second group of X-ray beams comprises mn/2 X-ray beams, each of which passes through the left upper part of one of the picture elements in the second part of a plane and at least m/2 X-ray beams passing through the picture elements in the n-th column in the second part of a plane, said $$\frac{m(n+1)}{2}$$

positions spaced apart from each other on said two X-ray projectional distributions $D_3$, $D_4$ for measurement of the values $d_k(3)$ and $d_k(4)$ of X-ray density correspond to the positions on said two X-ray projectional distributions $D_3$, $D_4$ which have X-ray density information to be obtained by passing said X-ray beams through said pseudo-tomographic plane, $\theta_3$ indicates the angle at which each X-ray beam of the first group crosses with the base of each picture element in the first part of a plane, and $\theta_3 = \tan^{-1} m$, and $\theta_4$ indicates the angle at which each X-ray beam of the second group crosses with the base of each picture element in the second part of a plane, and $\theta_4 = -\tan^{-1} m$;

(c) calculating X-ray absorption coefficient $\mu_t$ (t=1, 2, ..., mn and t is a natural number) of each of mn pieces of picture elements in accordance with the following equations based on the X-ray density values $d_k(3)$ and $d_k(4)$ measured in step (b) and length of the X-ray beams passing through each of the picture elements,

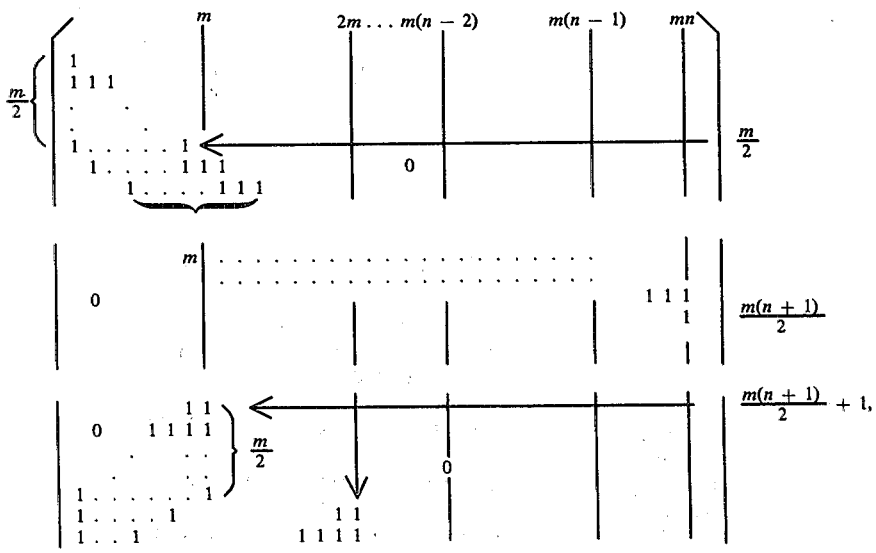

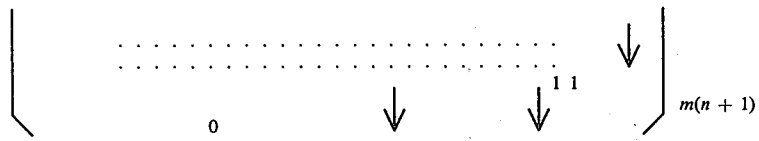

and where $\mu = (\mu_1, \mu_2, \mu_3, \ldots, \mu_{mn})^T$ $D = \left( d_1(3), d_2(3), \ldots, d_{\frac{m(n+1)}{2}}(3), d_1(4), d_2(4), \ldots, d_{\frac{m(n+1)}{2}}(4) \right)^T / \alpha$ L is a band matrix of dimension m(n+1)×mn, T indicates the transpose of a matrix and α is a length of an X-ray beam passing through each picture element from directions of $\theta_3$, $\theta_4$;

(d) reconstructing the computed tomographic image of said tested tissue of a body, where the picture elements having respective X-ray absorption coefficients $\mu_1, \mu_2, \ldots, \mu_{mn}$ calculated in step (c) are positioned at the locations of said picture elements numbered 1, 2, ..., mn of the pseudo-tomographic plane and wherein the complete collection of picture elements located in the m×n array constitute the reconstructed computed tomographic plane of the tested tissue of body.

10. A reconstruction method of a computed tomographic image from a few X-ray projections comprising:

(a) projecting X-rays from two symmetrical desired directions ($\theta_1$, $\theta_2$) toward tested tissue of a body for producing first and second X-ray projectional distributions $D_1$, $D_2$ of X-rays which have passed through the tested tissue;

(b) measuring the values $d_k(1)$ (k(1) is a natural number, k(1)=1, 2, ..., m) of X-ray density on said first X-ray projectional distribution $D_1$ at m (m is a natural number) positions spaced apart from each other from one end of said first projectional X-ray distribution $D_1$ toward the other end thereof, and at the same time measuring the values $d_k(2)$ (k(2) is a natural number, k(2)=1, 2, ..., m) of X-ray density on said second projectional X-ray distribution $D_2$ at m positions spaced apart from each other from one end of said second projectional X-ray distribution $D_2$ toward the other end thereof, where said m positions spaced apart from each other on the first and second X-ray projectional distributions $D_1$, $D_2$ for measurement of the values $d_k(1)$ and $d_k(2)$ of X-ray density are selected according to the following three criteria: (i) that the tomographic plane of the tested tissue of a body to be reconstructed is expressed by a pseudo-tomographic plane which is constituted collectively by mn pieces of square picture elements, with m pieces of picture elements in a row and n in a column (both m and n are natural numbers), which are formed by dividing said tomographic plane of the tested tissue of a body into small sections and each of which has a single piece of X-ray density information, and that said pseudo-tomographic plane is placed between an X-ray source and said two X-ray projectional distributions $D_1$, $D_2$, (ii) that said pseudo-tomographic plane is divided into a first part of a plane and a second part of a plane which are constituted collectively by said picture elements with m/2 pieces in a row and n pieces in a columnc, respectively, (iii) that n rows, each of which is constituted by m pieces of picture elements are numbered in order 1, 2, ..., n from the left and that said m pieces of picture elements in each row are numbered respectively 1,2, ..., m; m+1, m+2, ..., 2m; ...; (n−1)m+1, (n−1)m+2, ...mn from the side of said X-ray source toward the side of said two X-ray projectional distributions $D_1$, $D_2$ in order and that at least m(n+1) X-ray beams passing through said pseudo-tomographic plane from two directions ($\theta_1$, $\theta_2$) are divided into the first group of X-ray beams in a direction of $\theta_1$ and the second group of X-ray beams in a direction of $\theta_2$, where the first group of X-ray beams is constituted by mn/2 X-ray beams passing through respectively the left lower corner of each picture element in said first part of a plane and at least m/2 X-ray beams passing through the picture elements in the n-th column in the first part of a plane, and the second group of X-ray beams is constituted by mn/2 X-ray beams passing through respectively the left upper corner of each picture element in said second part of a plane and at least m/2 X-ray beams passing through the picture elements in the n-th column in the second part of a plane, and said m positions spaced apart from each other on said two X-ray projectional distributions $D_1$, $D_2$ for measurement of the values $d_k(1)$ and $d_k(2)$ of X-ray density correspond to the positions on said two X-ray projectional distribution $D_1$, $D_2$ which have X-ray density information to be obtained by passing first m X-ray beams through said pseudo-tomographic plane based on the above-mentioned criteria, $\theta_1$ indicates the angle at which each X-ray beam of the first group crosses with the base of each picture element in the first part of a plane, and $\theta_1 = \tan^{-1} m/2$, and $\theta_2$ indicates the angle at which each X-ray beam of the second group crosses with the base of each picture element in the second part of a plane, and $\theta_2 = -\tan^{-1} m/2$;

(c) calculating the X-ray absorption coefficients $\mu_1 \sim \mu_{2m}$ of m picture elements in the first part of a plane and m picture elements in the second part of a plane comprising the picture elements in the first and second columns of the pseudo-tomographic plane, in accordance with the following equations based on the values $d_k(1)$, $d_k(2)$ of X-ray density measured in step (b) and the length of the X-ray beams passing through each picture element in the first and second parts of a plane, $L\mu = D$, where $$L = \begin{pmatrix}
\begin{pmatrix} 1 \\ 1\ 1 \\ 1\ 1\ 1 \\ \cdots \\ 1 \cdots \cdots 1 \end{pmatrix}_{\frac{m}{2}} & 0 & & \\
\begin{pmatrix} 1 \cdots \cdots 1 \\ 1 \cdots \cdots 1 \\ \cdots \\ 1 \cdots 1\ 1 \cdots 1 \end{pmatrix}_{\frac{m}{2}} & \begin{pmatrix} 1 \\ 1\ 1 \\ \cdots \end{pmatrix} & & \\
& & \begin{pmatrix} 1 \\ 1\ 1 \\ 1\ 1\ 1 \\ \cdots \\ 1 \cdots \cdots 1 \end{pmatrix}_{\frac{m}{2}} & \\
0 & & & \\
\begin{pmatrix} 1 \cdots 1 \\ 1 \cdots \cdots 1 \end{pmatrix} & & \begin{pmatrix} 1 \cdots 1 \\ 1 \cdots \cdots 1 \\ \cdots \\ 1 \cdots 1 \end{pmatrix}_{\frac{m}{2}} & 0 \quad \begin{pmatrix} 1 \\ 1\ 1 \\ 1 \cdots \\ \cdots \\ 1 \cdots 1 \end{pmatrix}
\end{pmatrix}$$

and where $\mu = (\mu_1, \mu_2, \mu_3, \ldots, \mu_{2m})^T$ $D = (d_1(1), d_2(1), \ldots, d_m(1), d_1(2), d_2(2), \ldots, d_m(2))^T/\alpha$ L is a square matrix of dimension 2m×2m, T indicates a matrix transpose and α is a length of an X-ray beam passing through each picture element from directions of $\theta_1, \theta_2$;

(d) memorizing the X-ray absorption coefficients $\mu_1 \sim \mu_m$ which are the first m of the X-ray absorption coefficients $\mu_1 \sim \mu_{2m}$ calculated in step (c); (e) measuring each of the values $d_k(1)$ and $d_k(2)$ (k(1), k(2)=m/2+1, m/2+2,...,3m/2) of X-ray density on the first and second X-ray projectional distributions D₁ and D₂ respectively at the positions numbering m spaced apart from each other from the $\left(\frac{m}{2}+1\right)$ position from one end of said first and second X-ray projectional distributions D₁, D₂ toward the other end thereof, where said positions numbering m spaced apart from each other on each of said first X-ray projectional distribution D₁ and said second X-ray projectional distribution D₂ for measurement of the values $d_k(1)$, $d_k(2)$ (k(1), k(2)=m/2+1, m/2+2, ..., 3m/2) of X-ray density are selected such that said positions numbering m spaced apart from each other on said first X-ray projectional distribution D₁ for measurement of the values $d_k(1)$ (k(1)=m/2+1, m/2+2, ..., 3m/2) of X-ray density correspond to the positions on said first X-ray projectional distribution D₁ which have X-ray density information obtained as a result of the m X-ray beams passing through the left lower corner of each of the respective picture elements numbered (m+1) to 3m/2 and (2m+1) to 5m/2 passing through said first part of a plane based on the three assumptions in step (b), and said positions numbering m spaced apart from each other on said second X-ray projectional distribution D₂ for measurement of the values $d_k(2)$ (k(2)=m/2+1, m/2+2, ..., 3m/2) of X-ray density are selected such that said positions numbering m spaced apart from each other on said second X-ray projectional distribution D₂ for measurement of the values $d_k(2)$ (k(2)=m/2+1, m/2+2, ..., 3m/2) of X-ray density correspond to the positions on said second X-ray projectional distribution D₂ which have X-ray density information obtained as a result of the m X-ray beams passing through the left upper corner of each of the respective picture elements numbered $$\left(\frac{3m}{2}+1\right)$$

to 2m and $$\left(\frac{5m}{2}+1\right)$$

~3m passing through said second part of a plane based on the three criteria in step (b);

(f) calculating the X-ray absorption coefficients $\mu_{m+1} \sim \mu_{3m/2}$ and $\mu_{2m+1} \sim \mu_{5m/2}$ based on the X-ray absorption coefficients $\mu_1 \sim \mu_{2m}$ calculated in step (c), the values $d_k(1)$ ($k(1) = m/2+1, m/2+2, \ldots, 3m/2$) of X-ray density measured in step (e), and the length of X-ray beams passing through the picture elements numbered $(m+1)$ to $3m/2$ and $(2m+1) \sim 5m/2$ from the $\theta_1$ direction, and at the same time, calculating the X-ray absorption coefficients $\mu_{3m/2+1} \sim \mu_{2m}$ and $\mu_{5m/2} \sim \mu_{3m}$ based on the X-ray absorption coefficients $\mu_1 \sim \mu_{2m}$ calculated in step (c), the values $d_k(2)$ ($k(2) = m/2+1, m/2+2, \ldots, 3m/2$) of X-ray density measured in step (e), and the length of X-ray beams passing through the picture elements numbered $$\left(\frac{3m}{2}+1\right)$$

to 2m and $$\left(\frac{5m}{2}+1\right)$$

to 3m from the $\theta_2$ direction, where the method of calculating the X-ray absorption coefficients $\mu_{m+1} \sim \mu_{3m}$ is the same as in ste (c) and the X-ray absorption coefficients $\mu_1 \sim \mu_{2m}$ calculated in step (c) are selectively used;

(g) memorizing the X-ray absorption coefficients $\mu_{m+1} \sim \mu_{2m}$, comprising the first m of the X-ray absorption coefficients $\mu_{m+1} \sim \mu_{3m}$ calculated in step (f);

(h) calculating the X-ray absorption coefficient $\mu_{2m+1} \sim \mu_{4m}$, $\mu_{3m+1} \sim \mu_{5m}$, $\ldots$, $\mu_{(n-1)m+1} \sim \mu_{(n+1)m}$ repeating substantially the same steps as steps (e), (f) and (g) and memorizing the first m of the X-ray absorption coefficients $\mu_{2m+1} \sim \mu_{3m}$, $\mu_{3m+1} \sim \mu_{4m}$, $\ldots$, $\mu_{(n-1)m+1} \sim \mu_{mn}$;

(i) reconstructing the computed tomographic image of said tested tissue of a body based on the X-ray absorption coefficients $\mu_1 \sim \mu_m$, $\mu_{m+1} \sim \mu_{2m}$, $\ldots$, $\mu_{(n-1)m+1} \sim \mu_{mn}$ memorized in steps (d), (g) and (h), where the picture elements having respective X-ray absorption coefficients $\mu_1, \mu_2, \ldots, \mu_{mn}$ memorized in steps (d), (g) and (h) are positioned at the locations of said picture elements numbered 1, 2, ..., mn of the pseudo-tomographic plane and wherein the complete collection of picture elements located in the m×n array constitute the reconstructed computed tomographic plane of the tested tissue of body.

11. A reconstruction method of a computed tomographic image from a few X-ray projections comprising:

(a) projecting X-rays from two symmetrical desired directions ($\theta_3$, $\theta_4$) toward tested tissue of a body for producing first and second X-ray projectional distributions $D_3$, $D_4$ of X-rays which have passed through the tested tissue;

(b) measuring the values $d_k(3)$ ($k(3)$ is a natural number, $k(3) = 1, 2, \ldots, m$) of X-ray density on said first X-ray projectional distribution $D_3$ Heach other from one end of said second X-ray projectional distribution $D_4$ toward the other end thereof, where said m positions spaced apart from each other on the first and second X-ray projectional distributions $D_3$, $D_4$ for measurement of the values $d_k(3)$ and $d_k(4)$ of X-ray density are selected according to the following three criteria, (i) that the tomographic plane of the tested tissue of a body to be reconstructed is expressed by a pseudo-tomographic plane which is constituted collectively by mn pieces of square picture elements, with m pieces of picture elements in a row and n in a column (both m and n are natural numbers), which are formed by dividing said tomographic plane of the tested tissue of a body into small sections and each of which has a single piece of X-ray density information, and that said pseudo-tomographic plane is placed between an X-ray source and said two X-ray projectional distributions $D_3$, $D_4$, (ii) that said pseudo-tomographic plane is divided into a first part of a plane and a second part of a plane which are constituted collectively by said picture elements with m/2 pieces in a row and n pieces in a column, respectively, (iii) that n rows, each of which is constituted by m pieces of picture elements are numbered in order 1, 2,..., n from the left and that said m pieces of picture elements in each row are numbered respectively $1, 2, \ldots, m$; $m+1$, $m+2, \ldots, 2m$; $\ldots$; $(n-1)m+1, (n-1)m+2, \ldots mn$ from the side of said X-ray source toward the side of said two X-ray projectional distributions $D_3$, $D_4$ in order and that at least $m(n+1)$ X-ray beams passing through said pseudo-tomographic plane from two directions ($\theta_3$, $\theta_4$) are divided into the first group of X-ray beams in a direction of $\theta_3$ and the second group of X-ray beams in a direction of $\theta_4$, wherein the first group of X-ray beams is constituted by mn/2 X-ray beams passing through respectively the left lower corner of each picture element in said first part of the plane and at least m/2 X-ray beams passing through the picture elements in the n-th column in the first part of the plane, and the second group of X-ray beams is constituted by mn/2 X-ray beams passing through respectively the left upper corner of each picture element in said second part of the plane at at least m/2 X-ray beams passing through the picture elements in the n-th column in the second part of the plane, said m positions spaced apart from each other on said two X-ray projectional distributions $D_3$, $D_4$ for measurement of the values $d_k(3)$ and $d_k(4)$ of X-ray density correspond to the positions on said two X-ray projectional distributions $D_3$, $D_4$ which have X-ray density information to be obtained by passing the first m X-ray beams through said pseudo-tomographic plane based on the above-mentioned criteria, $\theta_3$ indicates the angle at which each X-ray beam of the first group crosses with the base of each picture element in the first part of a plane, and $\theta_3 = \tan^{-1} m$, and $\theta_4$ indicates the angle at which each X-ray beam of the second group crosses with the base of each picture element in the second part of a plane, and $\theta_4 = \tan^{-1} m$;

(c) calculating the X-ray absorption coefficients $\mu_1 \sim \mu_{2m}$ of m picture elements in the first part of a plane and m picture elements in the second part of a plane comprising the picture elements in the first and second columns of the pseudo-tomographic plane, in accordance with the following equations based on the values $d_k(3)$, $d_k(4)$ of X-ray density measured in step (b) and the length of the X-ray beams passing through each picture element in the first and second parts of a plane, (e) measuring each of the values $d_k(3)$ and $d_k(4)$ ($k(3)$, $k(4) = m/2+1$, $m/2+2$,..., $3m/2$) of X-ray density on the first and second X-ray projectional distributions $D_3$ and $D_4$ respectively at the positions numbering m spaced apart from each other from the

position from one end of said first and second X-ray projectional distributions $D_3$, $D_4$ toward the other end thereof, where said positions numbering m spaced apart from each other on each of said first X-ray projectional distribution $D_3$ and said second X-ray projectional distribution $D_4$ for measurement of the values $d_k(3)$, $d_k(4)$

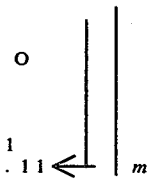

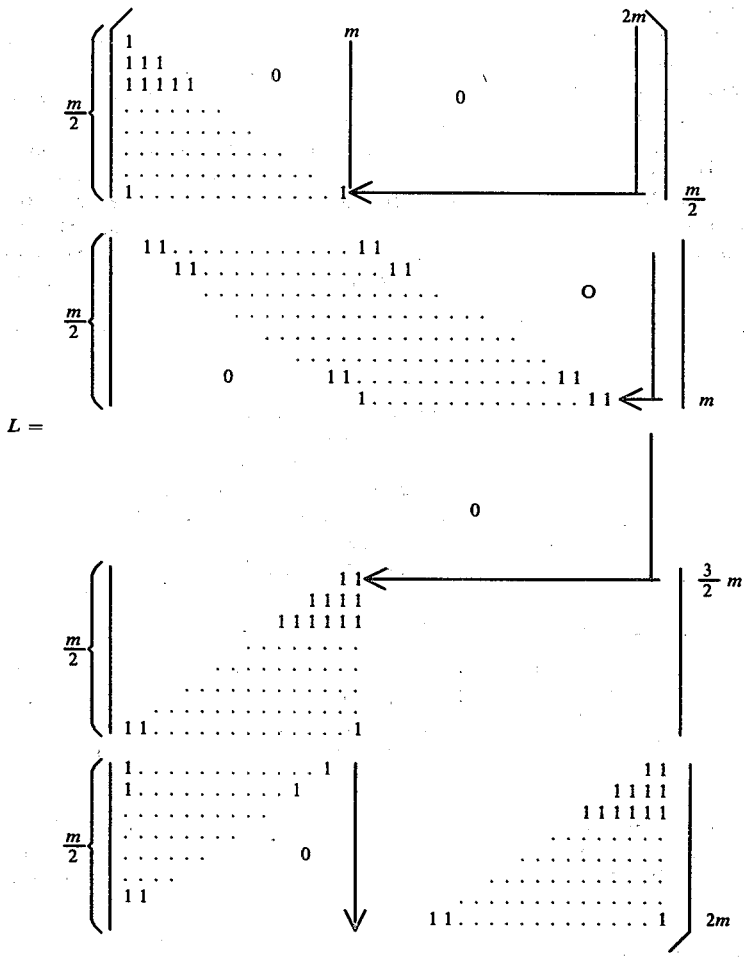

and where $\mu = (\mu_1, \mu_2, \mu_3, \ldots, \mu_{2m})^T$ $D = (d_1(3), d_2(3), \ldots, d_m(3), d_1(4), d_2(4), \ldots, d_m(4))^T/\alpha$ L is a square matrix of dimension $2m \times 2m$, T indicates a matrix transpose and $\alpha$ is a length of the X-ray beam passing through each picture element from directions of $\theta_3$, $\theta_4$;

(d) memorizing the X-ray absorption coefficients $\mu_1 \sim \mu_m$ comprising the first m of the X-ray absorption coefficients $\mu_1 \sim \mu_{2m}$ calculated in step (c);

($k(3)$, $d(4) = m/2+1$, $m/2+2$, ..., $3m/2$) of X-ray density are selected such that said positions numbering m spaced apart from each other on said first X-ray projectional distribution $D_3$ for measurement of the values $d_k(3)$ ($k(3) = m/2+1$, $m/2+2$, ..., $3m/2$) of X-ray density correspond to the positions on said first X-ray projectional distribution $D_3$ which have X-ray density information obtained as a result of the m X-ray beams passing through the left lower corner of each of the respective picture elements numbered (m+1) to 3m/2 and (2m+1) to 5m/2 passing through said first part of a plane based on the three assumptions in step (b), and said positions numbering m spaced apart from each other on said second X-ray projectional distribution $D_4$ for measurement of the values $d_k(4)$ ($k(4)=m/2+1$, $m/2+2, \ldots, 3m/2$) of X-ray density are selected such that said positions numbering m spaced apart from each other on said second X-ray projectional distribution $D_4$ for measurement of the values $d_k(4)$ ($k(4)=m/2+1$, $m/2+2, \ldots, 3m/2$) of X-ray density correspond to the positions on said second X-ray projectional distribution $D_4$ which have X-ray density information obtained as a result of the m X-ray beams passing through the left upper corner of each of the respective picture elements numbered $$\left( \frac{3m}{2} + 1 \right)$$

to 2m and $$\left( \frac{5m}{2} + 1 \right)$$

~3m passing through said second part of a plane based on the three assumptions in step (b);

(f) calculating the X-ray absorption coefficients $\mu_{m+1} \sim \mu_{3m/2}$ and $\mu_{2m+1} \sim \mu_{5m/2}$ based on the X-ray absorption coefficients $\mu_1 \sim \mu_{2m}$ calculated in step (c), the values $d_k(3)$ ($k(3)=m/2+1, m/2+2, \ldots, 3m/2$) of X-ray density measured in step (e), and the length of X-ray beams passing through the picture elements numbered (m+1) to 3m/2 and (2m+1)~5m/2 from the $\theta_3$ direction, and at the same time, calculating the X-ray absorption coefficients $\mu_{3m/2+1} \sim \mu_{2m}$ and $\mu_{5m/2} \sim \mu_{3m}$ based on the X-ray absorption coefficients $\mu_1 \sim \mu_{2m}$ calculated in step (c), the values $d_k(4)$ ($k(4)=m/2+1$, $m/2+2, \ldots, 3m/2$) of X-ray density measured in step (e), and the length of X-ray beams passing through the picture elements numbered $$\left( \frac{3m}{2} + 1 \right)$$

to 2m and $$\left( \frac{5m}{2} + 1 \right)$$

to 3m from the $\theta_4$ direction, where the method of calculating the X-ray absorption coefficients $\mu_{m+1} \sim \mu_{3m}$ is the same as in step (c) and the X-ray absorption coefficients $\mu_1 \sim \mu_{2m}$ calculated in step (c) are selectively used;

(g) memorizing the X-ray absorption coefficients $\mu_{m+1} \sim \mu_{2m}$ comprising the first m of the X-ray absorption coefficients $\mu_{m+1} \sim \mu_{3m}$ calculated in step (f);

(h) calculating the X-ray absorption coefficient $\mu_{2m+1} \sim \mu_{4m}$, $\mu_{3m+1} \sim \mu_{5m}, \ldots$, $\mu_{(n-1)m+1} \sim \mu_{(n+1)m}$ repeating substantially the same steps (e), (f) and (g) and memorizing the first m of the X-ray absorption coefficients $\mu_{2m+1} \sim \mu_{3m}, \mu_{3m+1} \sim \mu_{4m}, \ldots, \mu_{(n-1)m+1} \sim \mu_{mn}$;

(i) reconstructing the computed tomographic image of said tested tissue of a body based on the X-ray absorption coefficients $\mu_1 \sim \mu_m, \mu_{m+1} \sim \mu_{2m}, \ldots, \mu_{(n-1)m+1} \sim \mu_{mn}$ memorized in steps (f), (g) and (h), where the picture elements having respective X-ray absorption coefficients $\mu_1, \mu_2, \ldots, \mu_{mn}$ memorized in steps (f), (g) and (h) are positioned at the locations of said picture elements number 1, 2, ..., mn of the pseudo-tomographic plane and wherein the complete collection of picture elements located in the m×n array constitute the reconstructed compouted tomographic plane of the tested tissue of a body.

* * * * *